US011879360B2

(12) United States Patent
Feie et al.

(10) Patent No.: US 11,879,360 B2
(45) Date of Patent: Jan. 23, 2024

(54) FABRICATED CMC NOZZLE ASSEMBLIES FOR GAS TURBINE ENGINES

(71) Applicant: GENERAL ELECTRIC COMPANY, Schenectady, NY (US)

(72) Inventors: Brian Gregg Feie, Cincinnati, OH (US); Alexander Martin Sener, Santa Monica, CA (US); Mark Holleran, Cincinnati, OH (US); Douglas G. Decesare, Queensbury, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/084,818

(22) Filed: Oct. 30, 2020

(65) Prior Publication Data

US 2022/0136397 A1 May 5, 2022

(51) Int. Cl.
*F01D 9/04* (2006.01)

(52) U.S. Cl.
CPC .......... *F01D 9/04* (2013.01); *F05D 2240/128* (2013.01); *F05D 2260/30* (2013.01); *F05D 2300/6033* (2013.01)

(58) Field of Classification Search
CPC ........ F01D 9/04; F01D 9/041; F05D 2240/12; F05D 2240/128; F05D 2260/30
See application file for complete search history.

(56) References Cited

U.S. PATENT DOCUMENTS

| | | | | |
|---|---|---|---|---|
| 5,732,468 | A | 3/1998 | Galley et al. | |
| 6,409,472 | B1 | 6/2002 | McMahon et al. | |
| 6,464,456 | B2 | 10/2002 | Darolia et al. | |
| 6,648,597 | B1 * | 11/2003 | Widrig | F01D 9/044 415/200 |
| 7,761,990 | B2 | 7/2010 | Ellis et al. | |
| 8,987,629 | B2 | 3/2015 | Cui et al. | |
| 9,206,700 | B2 | 12/2015 | Lee et al. | |
| 9,624,786 | B2 | 4/2017 | Xu et al. | |
| 10,072,516 | B2 * | 9/2018 | Carr | F01D 9/041 |
| 2004/0244195 | A1 | 12/2004 | Gueldry et al. | |
| 2013/0251519 | A1 * | 9/2013 | Dunleavy | F04D 29/023 415/208.1 |
| 2013/0336782 | A1 * | 12/2013 | Ryczek | F01D 25/28 415/208.1 |
| 2016/0084096 | A1 * | 3/2016 | Carr | F02C 3/04 415/208.1 |

(Continued)

*Primary Examiner* — Courtney D Heinle
*Assistant Examiner* — Sang K Kim
(74) *Attorney, Agent, or Firm* — Dinsmore & Shohl LLP

(57) ABSTRACT

Nozzle segment assemblies for gas turbine engines include an outer band, inner band, and at least one airfoil body between the outer band and inner band. The airfoil body includes an outer end extending through the outer band and having an outer end reinforced wall portion engaging with the outer band and an inner end extending through the inner band and having an inner end reinforced wall portion engaging with the inner band. A thickness of the outer end and inner end reinforced wall portions are each greater than a thickness of a central wall portion of the airfoil body to reduce stresses in the airfoil body. The outer band, the inner band, and the airfoil bodies are ceramic matrix composite (CMC) materials. Direct mounting of the airfoil bodies to the inner and outer hangers of the nozzle further reduce stress.

20 Claims, 24 Drawing Sheets

(56) References Cited

U.S. PATENT DOCUMENTS

| | | | | |
|---|---|---|---|---|
| 2016/0153299 | A1* | 6/2016 | Tuertscher | F01D 9/044 415/115 |
| 2017/0074110 | A1* | 3/2017 | Fremont | F01D 9/041 |
| 2020/0182076 | A1* | 6/2020 | Lemaire | F01D 9/044 |
| 2020/0408100 | A1* | 12/2020 | Whittle | F01D 9/041 |
| 2021/0131353 | A1* | 5/2021 | O'Carroll | F01D 17/16 |
| 2021/0231024 | A1* | 7/2021 | Whittle | F01D 9/042 |

* cited by examiner

FABRICATED CMC NOZZLE ASSEMBLIES FOR GAS TURBINE ENGINES

BACKGROUND

Field

The present specification generally relates to nozzle assemblies for gas turbine engines, in particular, to airfoil assemblies comprising ceramic matrix composite (CMC) components and architectures for interfacing the CMC components to each other and to metal components.

Technical Background

At least some known gas turbine engines include a core having a high-pressure compressor, combustor, and high-pressure turbine (HPT) in serial flow relationship. The core engine is operable to generate a primary gas flow. The high-pressure turbine includes annular arrays ("rows") of stationary vanes or nozzles that direct the gases exiting the combustor into rotating blades or buckets. Collectively one row of nozzles and one row of blades make up a "stage." Typically, two or more stages are used in a serial flow relationship. These components operate in an extremely high temperature environment and may be cooled by airflow to ensure adequate service life.

HPT nozzles are often configured as an array of airfoil-shaped vanes extending between annular inner and outer bands, which define the primary flowpath through the nozzle. Due to operating temperatures within the gas turbine engine, materials having a low coefficient of thermal expansion are used. For example, to operate effectively in such adverse temperature and pressure conditions, ceramic matrix composite (CMC) materials may be used. These low coefficient of thermal expansion materials have higher temperature capability than similar metallic parts, so that, when operating at the higher operating temperatures, the engine is able to operate at a higher engine efficiency. However, such CMC materials have mechanical properties that must be considered during the design and application of the CMC. CMC materials have relatively low tensile ductility or low strain to failure when compared to metallic materials. Also, CMC materials have a coefficient of thermal expansion that differs significantly from metal alloys used as restraining supports or hangers for CMC type materials. Therefore, if a CMC component is restrained and cooled on one surface during operation, stress concentrations can develop leading to a shortened life of the segment.

To date, nozzles formed of CMC materials have experienced localized stresses that have exceeded the capabilities of the CMC materials, leading to a shortened life of the nozzle. The stresses have been found to be due to moment stresses imparted to the nozzle and associated attachment features, differential thermal growth between parts of differing material types, and loading in concentrated paths at the interface between the nozzle and the associated attachment features.

SUMMARY

Manufacture of CMC nozzle components has proven to be expensive, which may be partially due to complex geometries that are difficult to layup and compact, resulting in high touch times and low yield. Simpler preform designs can alleviate this problem; however, the complex geometry of the nozzle must be retained. One solution to this is to form an airfoil body and band sections (e.g., outer band and inner band) separately and then joining the airfoil body and the band sections in a bonding operation to form an airfoil assembly. When the airfoil body, the outer band, and the inner band are formed separately and assembled together to form the airfoil assembly, the interfaces between the airfoil body and the outer band and between the airfoil body and the inner band become major load carrying features in order to maintain fit and function of the airfoil assembly. During operation of the nozzle, localized stresses at the interface between the airfoil body and the outer band and the inner band can exceed the stress capabilities of the CMC materials, which may lead to shortened lifespan of the airfoil assemblies. Therefore, there is an ongoing need for designs of airfoil assemblies and nozzle segment assemblies that minimize the localized stresses on the airfoil bodies at the interfaces with the outer band and inner band and improve the lifespan of the airfoil assemblies.

The present disclosure meets these needs by providing an airfoil assembly having an outer band, and inner band, and one or a plurality of airfoil bodies, in which each of the airfoil bodies includes an outer end reinforced wall portion, an inner end reinforced wall portion, or both. The outer end reinforced wall portion and the inner end reinforced wall portion may be positioned at the interfaces of the airfoil body with the outer band and the inner band, respectively, and may each have greater thickness or wall thicknesses compared to the rest of the airfoil body. The greater thicknesses of the outer end reinforced wall portion and the inner end reinforced wall portion may reduce stresses at the interfaces between the airfoil body and the outer band and inner band and may prevent crack formation at the interfaces by transferring the stress concentration away from the interfaces.

Protrusion of the outer and inner ends of the airfoil bodies from the outer band and inner band may enable the airfoil bodies to be mounted to the turbine structural members directly through engagement with an outer hanger and an inner hanger. During operation, most of the stress is born by the airfoil body. Thus, mounting the airfoil body directly to the inner hanger and outer hanger may further reduce localized stresses at the interfaces between the airfoil body and the outer band and inner band compared to mounting the airfoil assembly to the turbine structural members through engagement of the outer band and inner band with the outer hanger and inner hanger, respectively.

According to one or more aspects disclosed herein, a nozzle segment assembly for a gas turbine engine comprises an airfoil assembly having an outer band, an inner band, and at least one airfoil body extending between the outer band and the inner band. The at least one airfoil body may comprise an outer end extending through the outer band and having an outer end reinforced wall portion protruding from an exterior surface of the at least one airfoil body into engagement with the outer band. The at least one airfoil body may further include an inner end extending through the inner band and having an inner end reinforced wall portion protruding from the exterior surface of the at least one airfoil body into engagement with the inner band. A thickness of the outer end reinforced wall portion and a thickness of the inner end reinforced wall portion may each be greater than a thickness of a central wall portion of the at least one airfoil body. The outer band, the inner band, and the at least one airfoil body may comprise a ceramic matrix composite (CMC) material.

According to one or more additional aspects disclosed herein, a nozzle segment assembly for a gas turbine engine may comprise an inner hanger, an outer hanger, and an airfoil assembly. The airfoil assembly may include an outer band comprising a radially-outward facing surface, an inner band comprising a radially-inward facing surface, and at least one airfoil body extending between the outer band and the inner band. The at least one airfoil body may include an outer end extending through the outer band and protruding outward from the radially outward facing surface of the outer band. The at least one airfoil body may further include an inner end extending through the inner band and protruding radially inward from the radially inward facing surface of the inner band. The outer hanger may be disposed radially outward from the outer band, and the inner hanger may be disposed radially inward from the inner band. The outer end of the at least one airfoil body may engage with the outer hanger and the inner end of the at least one airfoil body may engage with the inner hanger to position and constrain the airfoil assembly. The outer band, the inner band, and the at least one airfoil body may comprise a ceramic matrix composite (CMC) material.

It is to be understood that both the foregoing general description and the following detailed description describe various embodiments and are intended to provide an overview or framework for understanding the nature and character of the claimed subject matter.

BRIEF DESCRIPTION OF THE DRAWINGS

The accompanying drawings are included to provide a further understanding of the various embodiments, and are incorporated into and constitute a part of this specification. The drawings illustrate the various embodiments described herein, and together with the description serve to explain the principles and operations of the claimed subject matter.

Figure 1:
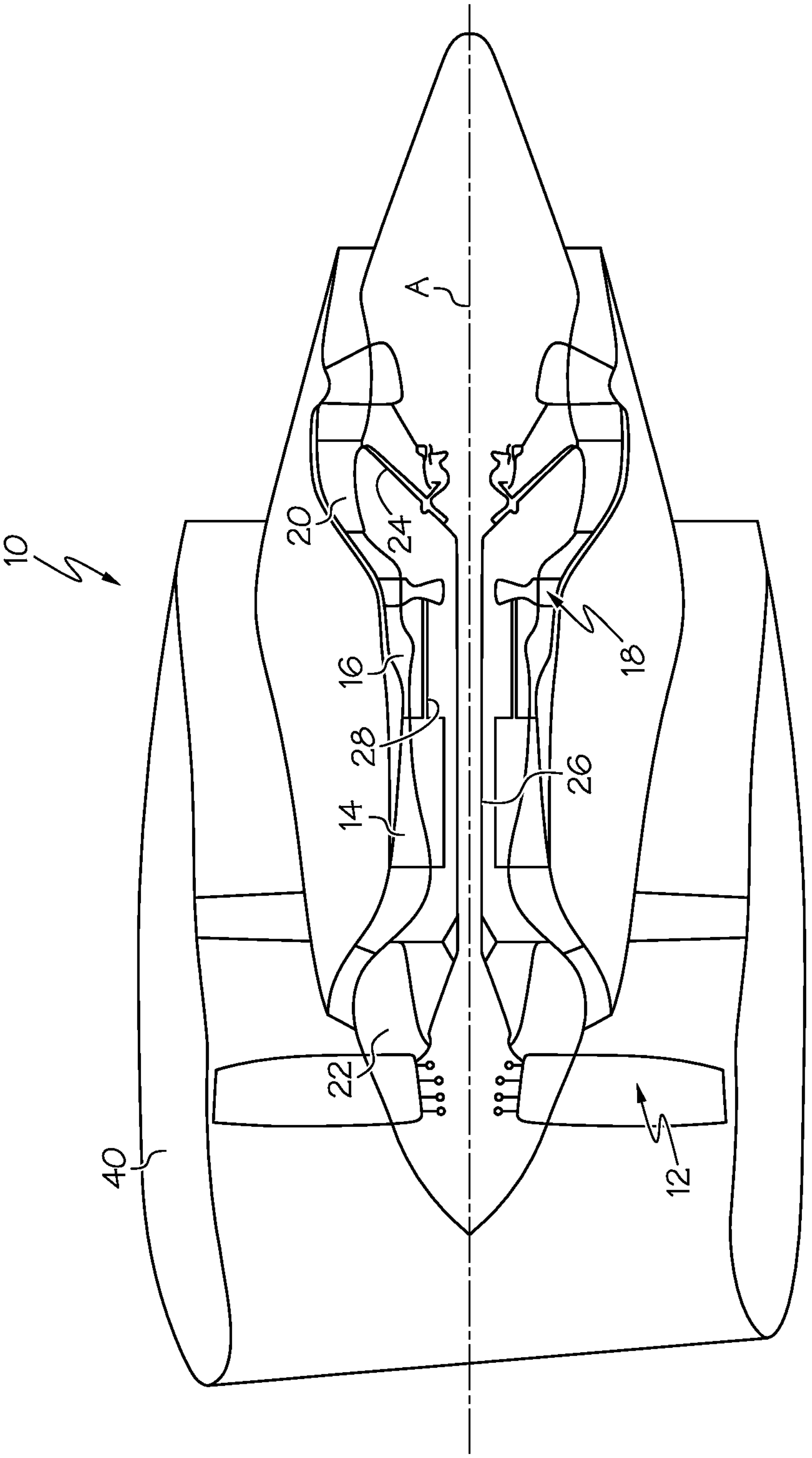
FIG. 1 schematically depicts a gas turbine engine, according to embodiments shown and described herein.

The drawings are not intended to be scale drawings and certain dimensions and proportions in the drawings may be exaggerated for purposes of illustration.

DETAILED DESCRIPTION

Figure 5:
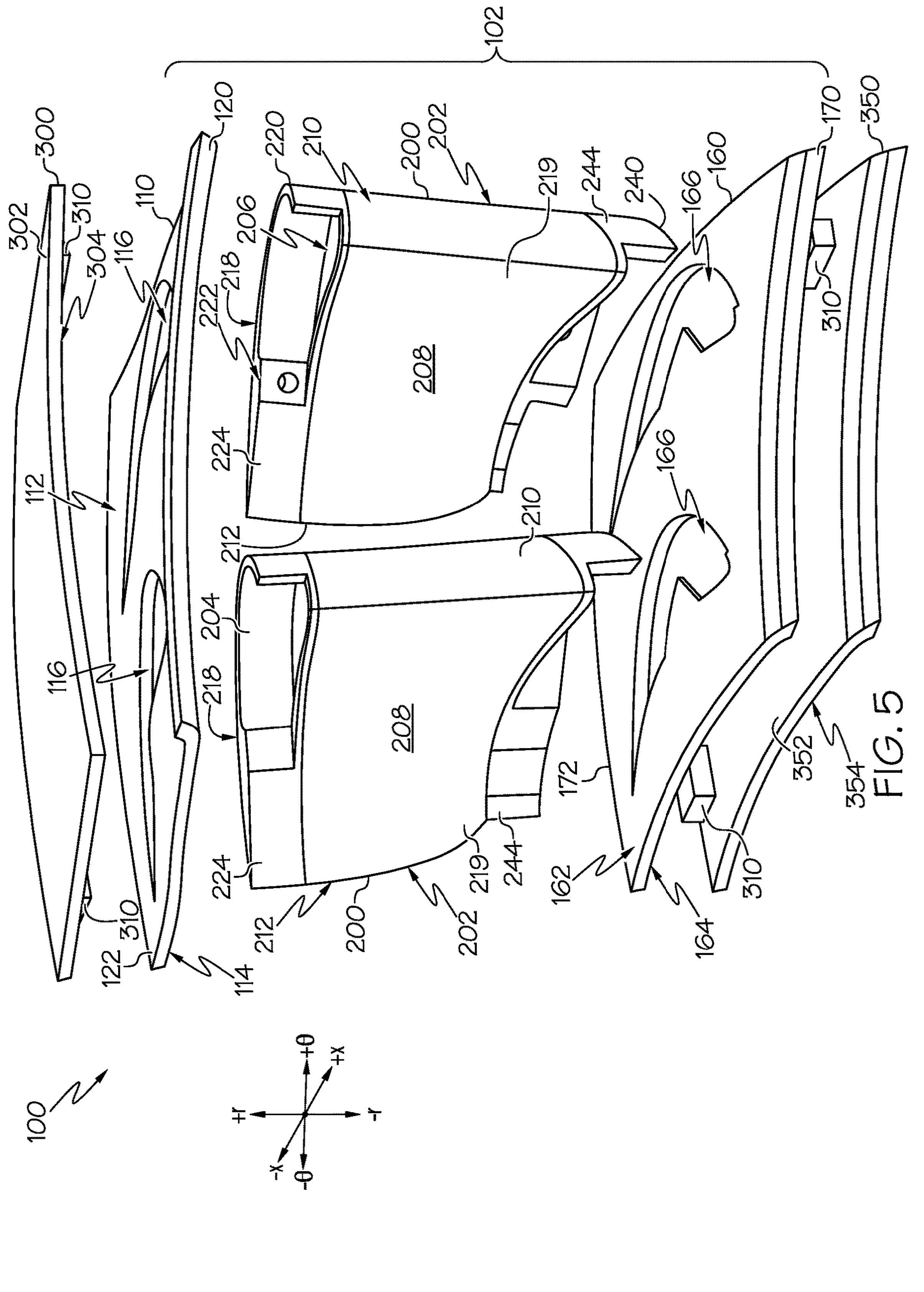
FIG. 5 schematically depicts an exploded perspective view of a nozzle segment assembly of the nozzle ring of FIG. 2, according to embodiments shown and described herein.
Figure 6A:
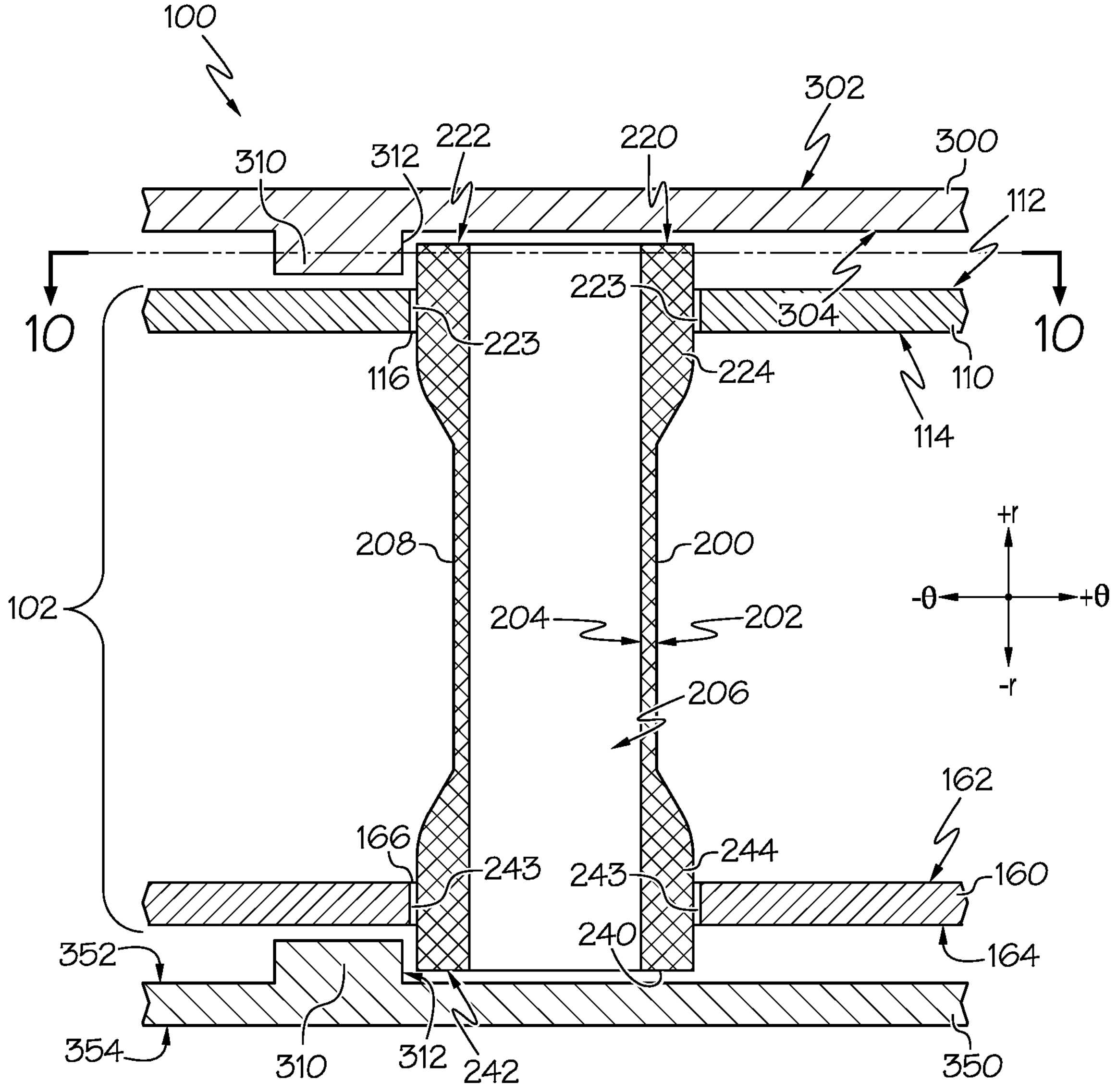
FIG. 6A schematically depicts a cross-sectional view of a portion of the nozzle segment assembly of FIG. 5, according to embodiments shown and described herein.

Reference will now be made in detail to embodiments of nozzle segment assemblies of nozzle rings for gas turbine engines according to the present disclosure. Whenever possible, the same reference numerals will be used throughout the drawings and the detailed description to refer to the same or like parts. Referring to FIGS. 5 and 6A, an embodiment of a nozzle segment assembly 100 for a nozzle ring of a gas turbine engine is schematically depicted. The nozzle segment assembly 100 may include an airfoil assembly 102 having an outer band 110 with a radially-outward facing surface 112, an inner band 160 with a radially-inward facing surface 164, and at least one airfoil body 200 extending between the outer band 110 and the inner band 160. The at least one airfoil body 200 may include an outer end 220 extending through the outer band 110 and having an outer end reinforced wall portion 224 protruding from an exterior surface 202 of the airfoil body 200 into engagement with the outer band 110. The airfoil body 200 may further include an inner end 240 extending through the inner band 160 and having an inner end reinforced wall portion 244 protruding from the exterior surface 202 of the airfoil body 200 into engagement with the inner band 160. A thickness of the outer end reinforced wall portion 224 and a thickness of the inner end reinforced wall portion 244 may be each greater than a thickness of a central wall portion 208 of the airfoil body 200. The outer band 110, the inner band 160, and the airfoil bodies 200 may be made from a ceramic matrix composite (CMC) material. The reinforced wall portions may reduce localized stress at the interfaces 223, 243 between the airfoil bodies 200 and the outer band 110 and the inner band 160, which may increase the stress capacity of the airfoil bodies 200 made from the CMC material and may improve the lifespan of the hollow airfoil bodies 200.

The nozzle segment assembly 100 may additionally include an outer hanger 300 and an inner hanger 350, each of which may include one or a plurality of mounting features 310. The mounting features 310 may enable mounting the airfoil bodies 200 directly to the outer hanger 300 and the inner hanger 350. Mounting the airfoil bodies 200 directly to the outer hanger 300 and the inner hanger 350 may further reduce localized stress in the airfoil bodies 200 compared to coupling the outer band 110 and the inner band 160 to the outer hanger 300 and inner hanger 350, respectively, and then transferring the forces between the engine and the airfoil bodies 200 through the interface 223 with the outer band 110, the interface 243 with the inner band 160, or both. Other benefits may be readily apparent to persons of ordinary skill in the art who are contemplating the information contained in the present disclosure.

Unless otherwise expressly stated, it is in no way intended that any method set forth herein be construed as requiring that its steps be performed in a specific order, nor that specific orientations be required with any apparatus. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

Directional terms as used herein—for example up, down, right, left, front, back, top, bottom—are made only with reference to the figures as drawn and the coordinate axis provided therewith and are not intended to imply absolute orientation.

As used herein, the singular forms “a,” “an” and “the” include plural referents unless the context clearly dictates otherwise. Thus, for example, reference to “a” component includes aspects having two or more such components, unless the context clearly indicates otherwise.

Unless limited otherwise, the terms “connected,” “coupled,” and “mounted,” and variations thereof herein are used broadly and encompass direct and indirect connections, couplings, and mountings. In addition, the terms “connected” and “coupled” and variations thereof are not restricted to physical or mechanical connections or couplings. When used as a noun, the term “mount” may refer to a structure operable to position and/or constrain one or more components within an assembly.

As used herein, the terms “axial” or “axially” refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the rear of the engine.

As used herein, the terms "radial" or "radially" refer to a dimension extending between a center longitudinal axis of the engine (i.e., center axis A of engine 10 in FIG. 1) and an outer engine circumference. The term "inward" may refer to a direction radially towards the center axis A of the engine 10 (FIG. 1), which is a direction in the −r direction of the cylindrical coordinate axis in the figures. The term "outward" may refer to a direction radially away from the center axis A of the engine 10, which is a direction in the +r direction of the cylindrical coordinate axis in the Figures.

As used herein, the terms "angular" or "angularly" refer to a dimension extending along a circumference of a circle centered on the center axis A (i.e., longitudinal axis or centerline) of the engine 10 (FIG. 1) and characterized by increasing or decreasing angle. As used herein, the term "tangential" may refer to a dimension extending along a line tangent to the circumference of a circle centered on the center axis A of the engine and passing through a portion of the nozzle segment assembly. Over the angular width represented by a single one of the nozzle segment assemblies 100, the differences between the tangential direction and angular direction may be small such that "tangential" and "angular" may be used interchangeably in the context of describing a single nozzle segment assembly 100 or airfoil assembly 102.

The following description refers to the accompanying drawings, in which, in the absence of a contrary representation, the same numbers in different drawings represent similar elements.

FIG. 1 is a schematic illustration of an exemplary gas turbine engine 10. Engine 10 includes a low-pressure compressor 12, a high-pressure compressor 14, and a combustor assembly 16. Engine 10 also includes a high-pressure turbine 18, and a low-pressure turbine 20 arranged in a serial, axial flow relationship on respective rotors 22 and 24. The compressor 12 and the turbine 20 may be coupled by a first shaft 26, and the compressor 14 and the turbine 18 may be coupled by a second shaft 28.

During operation, air flows along a central axis A of the engine 10, and compressed air is supplied to high-pressure compressor 14. The highly compressed air is delivered to combustor 16. Exhaust gas flow (not shown in FIG. 1) from combustor 16 drives turbines 18 and 20, and turbine 20 drives fan or low-pressure compressor 12 by way of shaft 26. Gas turbine engine 10 also includes a fan or low-pressure compressor containment case 40.

Figure 2:
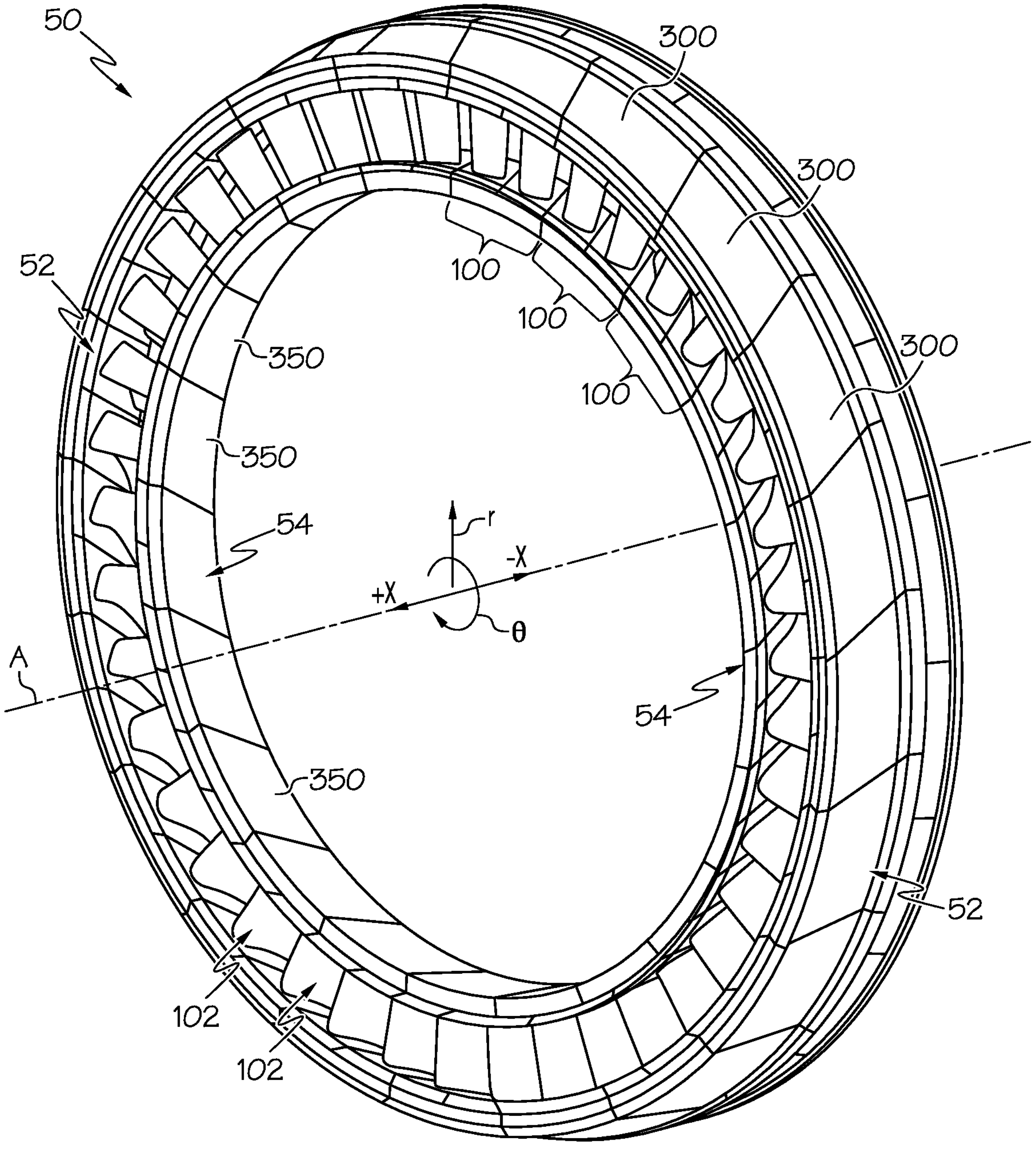
FIG. 2 schematically depicts a nozzle ring of the gas turbine engine of FIG. 1, according to embodiments shown and described herein.

FIG. 2 is a perspective view of a nozzle ring 50 in accordance with an example embodiment of the present disclosure. In the example embodiment, nozzle ring 50 may be located within high-pressure turbine 18 and/or low-pressure turbine 20 (shown in FIG. 1). Nozzle ring 50 is formed of one or more nozzle segment assemblies 100. Nozzle segment assemblies 100 direct combustion gases downstream through a subsequent row of rotor blades (not shown) extending radially outwardly from supporting rotor 22 or 24 (shown in FIG. 1). Nozzle ring 50 and plurality of nozzle segment assemblies 100 defining nozzle ring 50 facilitate extracting energy by rotor 22 or 24 (shown in FIG. 1). Additionally, nozzle ring 50 may be used in high-pressure compressor 14, which may be either of a high pressure or low-pressure compressor.

The nozzle ring 50 is formed of a plurality of nozzle segment assemblies 100. Each of the nozzle segment assemblies 100 may include at least one airfoil assembly 102, an outer hanger 300, and an inner hanger 350. In embodiments, the outer hanger 300, the inner hanger, or both may be a continuous ring. In some embodiments, the nozzle ring 50 may include an outer hanger 300 for each of the plurality of nozzle segment assemblies 100, and the plurality of outer hangers 300 of the plurality of nozzle segment assemblies 100 may cooperate to form an outer ring 52 of the nozzle ring 50. Similarly, in embodiments, the nozzle ring 50 may include an inner hanger 350 for each of the nozzle segment assemblies 100, and the plurality of inner hangers 350 of the plurality of nozzle segment assemblies 100 may cooperate to form an inner ring 54 of the nozzle ring 50. The outer ring 52 and the inner ring 54 extend circumferentially 360 degrees about the center axis A of the gas turbine engine 10. The plurality of airfoil assemblies 102 may be disposed radially between the outer hangers 300 of the outer ring 52 and the inner hangers 350 of the inner ring 54.

Figure 3:
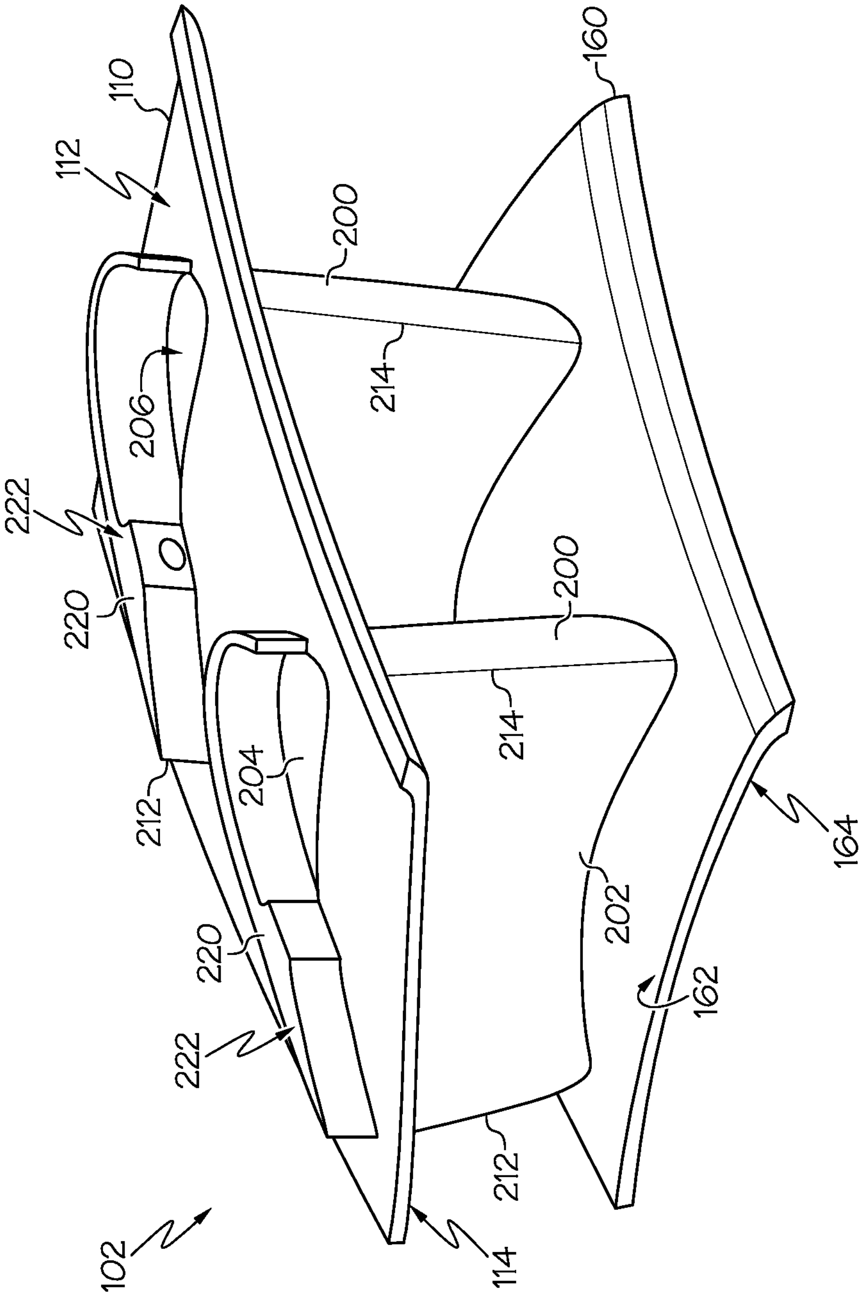
FIG. 3 schematically depicts a perspective view of an airfoil assembly of the nozzle ring of FIG. 2, according to embodiments shown and described herein.
Figure 4:
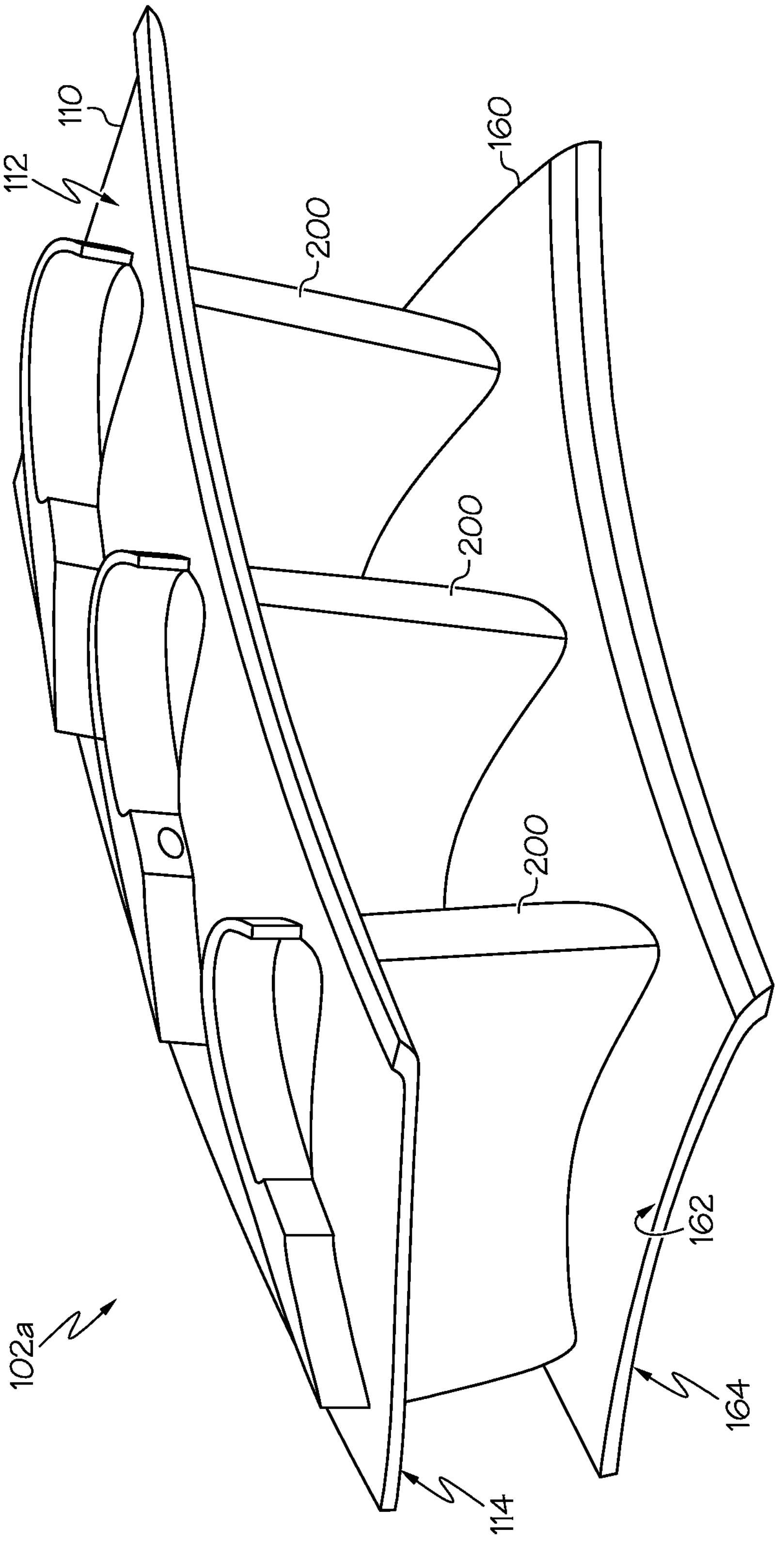
FIG. 4 schematically depicts a perspective view of another embodiment of an airfoil assembly of the nozzle ring of FIG. 2, according to embodiments shown and described herein.

Referring to FIG. 3, a perspective view of an airfoil assembly 102 according to the present disclosure is schematically depicted. The airfoil assembly 102 may include an outer band 110 having a radially outward facing surface 112, an inner band 160 having a radially inward facing surface 164, and at least one airfoil body 200 extending between the outer band 110 and the inner band 160. The airfoil assembly 102 may include one or a plurality of airfoil bodies 200, such as 1, 2, 3, 4, or more than 4 airfoil bodies 200. Referring to FIG. 2, in some embodiments, each of the plurality of airfoil assemblies 102 may be a singlet comprising a single airfoil body 200 extending between the outer band 110 and the inner band 160. As shown in FIG. 3, in embodiments, each of the plurality of airfoil assemblies 102 may be a doublet comprising 2 airfoil bodies 200 extending between the outer band 110 and the inner band 160. Referring to FIG. 4, in embodiments, each of the plurality of airfoil assemblies 102 may be a triplet comprising 3 airfoil bodies 200 extending between the outer band 110 and the inner band 160. Although not shown in the figures, in embodiments, each of the airfoil assemblies 102 may include 4 or more than 4 airfoil bodies 200. The various features of the present disclosure will be described herein in the context of an airfoil assembly 102 having two airfoil bodies 200, however, it is understood that the airfoil assembly 102 may have more or less than two airfoil bodies 200 without deviating from the scope of the present disclosure.

Referring again to FIG. 3, the outer band 110, the inner band 160, and the at least one airfoil body 200 may comprise a material having a low coefficient of thermal expansion. In embodiments, the outer band 110, the inner band 160, and the at least one airfoil body 200 may comprise a ceramic matrix composite (CMC) material. Other materials having low coefficients of thermal expansion are also contemplated.

Referring now to FIG. 5, an exploded view of a nozzle segment assembly 100 is schematically depicted. The outer band 110 may include a radially outward facing surface 112, a radially inward facing surface 114, and one or a plurality of openings 116 extending through the thickness of the outer band 110 from the radially outward facing surface 112 to the radially inward facing surface 114. The radially outward facing surface 112 may be a surface of the outer band 110 facing radially outward away from the center axis A (FIG. 2) of the engine 10 (i.e., in the +r direction of the cylindrical coordinate axis in FIG. 5). The radially inward facing surface 114 may be a surface of the outer band 110 facing radially inward towards the center axis A of the engine 10

(i.e., in the −r direction of the cylindrical coordinate axis of FIG. 5). The radially outward facing surface 112 and radially inward facing surface 114 may be curved in the angular direction (i.e., in the +/−Theta (θ) direction of the cylindrical coordinate axis in FIG. 5). Each of the openings 116 may be shaped to receive the outer end 220 of one of the airfoil bodies 200 so that at least a portion of the outer end 220 of the airfoil body 200 passes through the opening 116 and protrudes radially outward from the radially outward facing surface 112 of the outer band 110.

The outer band 110 may also have a forward edge 120 and an aft edge 122. The forward edge 120 may be an edge of the outer band 110 facing in the axial direction towards the engine inlet (i.e., in the +X direction of the cylindrical coordinate axis in FIG. 5). The aft edge 122 may be an edge of the outer band 110 facing in the axial direction towards the engine outlet (i.e., in the −X direction of the cylindrical coordinate axis in FIG. 5).

Referring again to FIG. 5, the inner band 160 may include a radially outward facing surface 162, a radially inward facing surface 164, and one or a plurality of openings 166 extending through the thickness of the inner band 160 from the radially outward facing surface 162 to the radially inward facing surface 164. The radially outward facing surface 162 may be a surface of the inner band 160 facing radially outward away from the center axis A (FIG. 2) of the engine 10 (i.e., in the +r direction of the cylindrical coordinate axis in FIG. 5). The radially inward facing surface 164 may be a surface of the inner band 160 facing radially inward towards the center axis A of the engine 10 (i.e., in the −r direction of the cylindrical coordinate axis of FIG. 5). The radially outward facing surface 162 and radially inward facing surface 164 may be curved in the angular direction (i.e., in the +/−Theta (θ) direction of the cylindrical coordinate axis in FIG. 5). Each of the openings 166 in the inner band 160 may be shaped to receive the inner end 240 of one of the airfoil bodies 200 so that at least a portion of the inner end 240 of the airfoil body 200 passes through the opening 166 and protrudes radially inward from the radially inward facing surface 164 of the inner band 160.

The inner band 160 may also have a forward edge 170 and an aft edge 172. The forward edge 170 may be an edge of the inner band 160 facing in the axial direction towards the engine inlet (i.e., in the +X direction of the cylindrical coordinate axis in FIG. 5). The aft edge 172 may be an edge of the inner band 160 facing in the axial direction towards the engine outlet (i.e., in the −X direction of the cylindrical coordinate axis in FIG. 5).

Referring again to FIG. 5, the airfoil bodies 200 may be hollow airfoil bodies or solid airfoil bodies. When the airfoil bodies 200 are hollow airfoil bodies, each of the airfoil bodies 200 may include an exterior surface 202 and an interior surface 204. The exterior surface 202 of the airfoil body 200 may be the surface of the airfoil body 200 facing away from the airfoil body 200 and may have an airfoil shape. The general airfoil shape of the exterior surface 202 of the airfoil body 200 is not particularly limited so long as each airfoil body 200 includes a suction side 218 and a pressure side 219. The interior surface 204 of the airfoil body 200 may be oriented facing inward and may define a cavity 206 extending through the airfoil body 200 from the outer end 220 to the inner end 240 of the airfoil body 200. Embodiments of the present disclosure will be described in the context of the airfoil bodies 200 being hollow airfoil bodies; however, it is understood that various features of the airfoil assemblies 102 may apply to solid airfoil bodies as well.

Each airfoil body 200 may have a forward edge 210 oriented in an axial direction towards the inlet of the engine 10 (i.e., in the +X direction of the cylindrical coordinate axis in FIG. 5) and an aft edge 212 oriented in an axial direction towards the outlet of the engine 10 (i.e., in the −X direction of the cylindrical coordinate axis in FIG. 5). Each airfoil body 200 includes the outer end 220 and the inner end 240. The outer end 220 of the airfoil body 200 may be shaped to engage with the outer band 110. In particular, the outer end 220 of the airfoil body 200 may be shaped so that the outer end 220 of the airfoil body 200 extends through one of the openings 116 in the outer band 110 and protrudes radially outward from the radially outward facing surface 112 of the outer band 110. In embodiments, at least a portion of the outer end 220 of the airfoil body 200 may provide an abutting surface that contacts the radially inward facing surface 114 of the outer band 110 to properly position the airfoil body 200 with respect to the outer band 110. The inner end 240 of the airfoil body 200 may be shaped to engage with the inner band 160. In particular, the inner end 240 of the airfoil body 200 may be shaped so that the inner end 240 of the airfoil body 200 extends through one of the openings 166 in the inner band 160 and protrudes radially inward from the radially inward facing surface 164 of the inner band 160. In embodiments, at least a portion of the inner end 240 of the airfoil body 200 may provide an abutting surface that contacts the radially outward facing surface 162 of the inner band 160 to properly position the airfoil body 200 with respect to the inner band 160.

Referring now to FIG. 6A, a cross-sectional view of the nozzle segment assembly 100 is schematically depicted. FIG. 6A is not intended to be to scale and the relative dimensions may be exaggerated for purposes of illustration. As schematically depicted in FIG. 6A, the outer end 220 of the airfoil body 200 may extend through one of the openings 116 in the outer band 110 so that at least a portion of the outer end 220 protrudes radially outward from radially outward facing surface 112 of the outer band 110, and the inner end 240 of the airfoil body 200 may extend through one of the openings 166 in the inner band 160 so that at least a portion of the inner end 240 protrudes radially inward from the radially inward facing surface 164 of the inner band 160. Thus, the outer end 220 of the airfoil body 200 may be available to interface with the outer hanger 300, and the inner end 240 of the airfoil body 200 may be available to interface with the inner hanger 350.

The airfoil body 200 may be rigidly and mechanically coupled to the outer band 110 at the interface 223 between the outer band 110 and the outer end 220 and rigidly and mechanically coupled to the inner band 160 at the interface 243 between the inner band 160 and the inner end 240. The airfoil body 200 may be rigidly coupled to the outer band 110 through bonding or adhering the exterior surface 202 of the airfoil body 200 to the outer band 110 at the opening 116. The airfoil body 200 may be bonded to the outer band 110 through sintering or brazing or by applying a cement to the airfoil body 200, the outer band 110, or both at the interface 223 and curing the cement. The airfoil body 200 may be adhered to the outer band 110 by applying an adhesive or glue to the exterior surface 202 of the airfoil body 200 at the interface 223 and then contacting the adhesive on the exterior surface 202 with the surface of the outer band 110 at the opening 116. Rigidly coupling the outer end 220 of the airfoil body 200 to the outer band 110 may prevent axial, radial, and/or angular movement of the airfoil body 200 relative to the outer band 110. The airfoil body 200 may also be rigidly and mechanically coupled to the inner band 160 at the interface 243 between the inner band 160 and the inner end 240 of the airfoil body 200. The airfoil body 200 may be rigidly coupled to the inner band 160 through bonding or adhering the external surface 202 of the airfoil body 200 to the inner band 160 at the opening 166, according to the methods described above for coupling the outer band 110 to the airfoil body 200. Rigidly and mechanically coupling the inner end 240 of the airfoil body 200 to the inner band 160 may prevent axial, radial, and angular movement of the airfoil body 200 relative to the inner band 160.

In embodiments, the airfoil body 200 may be mechanically decoupled from the outer band 110, the inner band 160, or both, which may enable the airfoil body 200 to move in the axial, radial, and/or angular directions relative to the outer band 110, the inner band 160, or both prior to assembly into the nozzle segment assembly 100. Mechanically decoupling the airfoil body 200 from the outer band 110 and/or the inner band 160 may open a leakage path between the airfoil body 200 and the outer band 110 and/or the inner band 160. The leakage path may be sealed to prevent leakage of gases between the airfoil body 200 and the outer band 110 and/or the inner band 160. Sealing may be accomplished using known sealing compounds or employing mechanical sealing techniques. When the airfoil body 200 is mechanically decoupled from the outer band 110 and/or the inner band 160, the airfoil body 200, outer band 110, and inner band 160 may all be individually mounted to the nozzle segment assembly 100, such as to the outer hanger 300 and/or the inner hanger 350.

Regardless of whether or not the airfoil body 200 is rigidly and mechanically coupled to the outer band 110, the inner band 160, or both, localized stresses at the outer interface 223 between the outer band 110 and the airfoil body 200 and/or at the inner interface 243 between the inner band 160 and the airfoil body 200 may exceed the stress capabilities of the CMC materials of the airfoil body 200, which may shorten the lifespan of the airfoil body 200. As previously discussed herein, localized stresses at the interface 223 between the airfoil body 200 and the outer band 110 and at the interface 243 between the airfoil body 200 and the inner band 160 may be reduced by providing the airfoil body 200 with reinforced wall portions at the interface 223 with the outer band 110 and the interface 243 with the inner band 160.

Figure 7B:
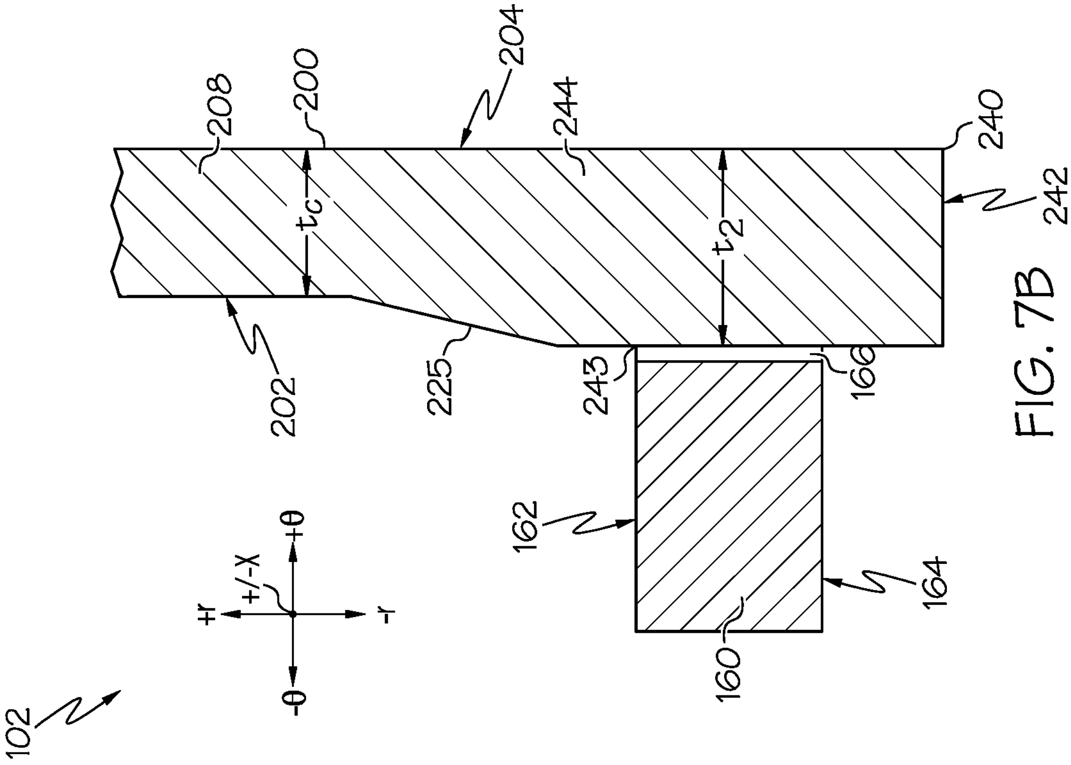
FIG. 7B schematically depicts a cross-sectional view of a portion of an interface between the airfoil body and inner band of the nozzle segment assembly of FIG. 5, according to embodiments shown and described herein.
Figure 7A:
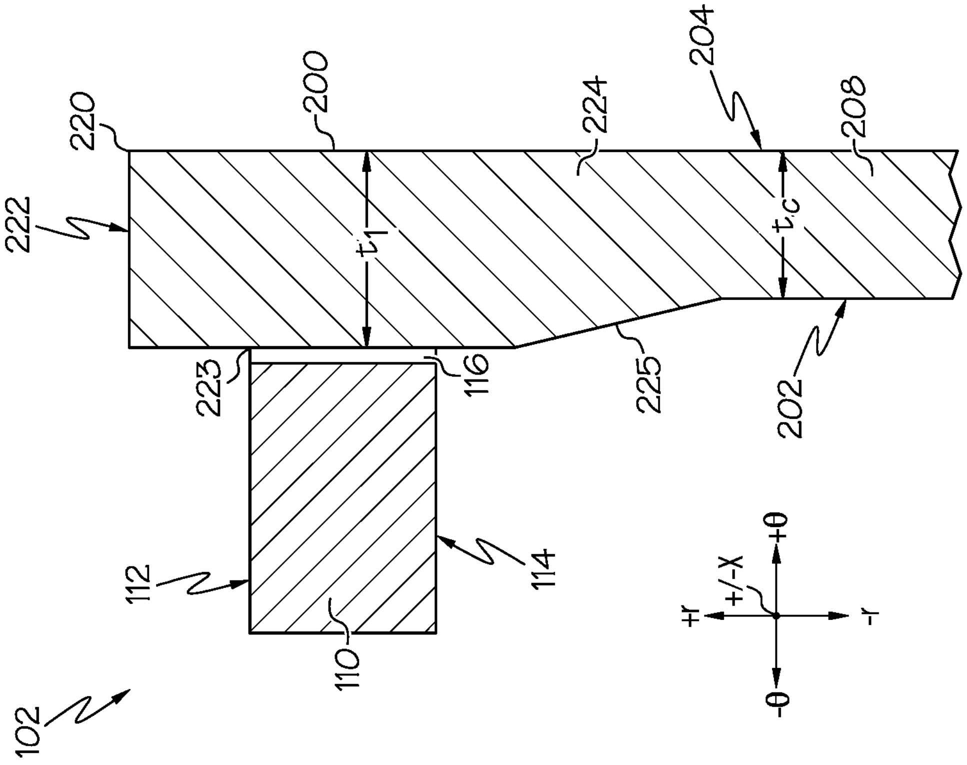
FIG. 7A schematically depicts a cross-sectional view of a portion of an interface between an airfoil body and an outer band of the nozzle segment assembly of FIG. 5, according to embodiments shown and described herein.

Referring now to FIG. 7A, a cross-section of a portion of the airfoil body 200 at the interface 223 with the outer band 110 is schematically depicted. The airfoil body 200 may have an outer end reinforced wall portion 224 disposed proximate the outer end 220 of the airfoil body 200 at the interface 223 between the airfoil body 200 and the outer band 110. The outer end reinforced wall portion 224 may protrude from the exterior surface 202 of the at least one airfoil body 200 into engagement with the outer band 110. The outer end reinforced wall portion 224 may protrude externally from the exterior surface 202 in the angular direction (e.g., in the +/−Theta direction of the coordinate axis of FIG. 7A), the axial direction (e.g., +/−X direction of the coordinate axis of FIG. 7A), or both. The outer end reinforced wall portion 224 may have a thickness $t_1$ greater than a thickness $t_c$ of a central wall region 208 of the airfoil body 200. The central wall region 208 may be a portion of the airfoil body 200 radially disposed between the outer end reinforced wall portion 224 at the outer end 220 of the outer end 220 and the inner end reinforced wall portion 244 (FIG. 7B) at the inner end 240 of the airfoil body 200. Referring again to FIG. 7A, the greater thickness $t_1$ of the outer end reinforced wall portion 224 compared to the central wall region 208 may increase the stress capabilities of the airfoil body 200 in the area of the interface 223 with the outer band 110. The outer end reinforced wall portion 224 may additionally include a fillet 225 where the thickness of the wall of the airfoil body 200 may decrease from the thickness $t_1$ of the outer end reinforced wall portion 224 to the lesser thickness $t_c$ of the central wall region 208. The fillet 225 may operate to distribute further the stress concentration across a larger area, effectively moving at least some of the stress away from the interface 223 and the joint between the outer end 220 and the outer band 110.

The inner end 240 of the airfoil body 200 may also have a reinforced wall portion. Referring now to FIG. 7B, a cross-section of a portion of the airfoil body 200 at the interface 243 with the inner band 160 is schematically depicted. The airfoil body 200 may have the inner end reinforced wall portion 244 disposed proximate the inner end 240 of the airfoil body 200 at the interface 243 between the airfoil body 200 and the inner band 160. The inner end reinforced wall portion 244 may protrude from the exterior surface 202 of the at least one airfoil body 200 into engagement with the inner band 160. The inner end reinforced wall portion 244 may protrude externally from the exterior surface 202 in the angular direction (e.g., in the +/−Theta direction of the coordinate axis of FIG. 7B), the axial direction (e.g., +/−X direction of the coordinate axis of FIG. 7B), or both. The inner end reinforced wall portion 244 may have a thickness $t_2$ greater than the thickness $t_c$ of the central wall region 208 of the airfoil body 200. The greater thickness $t_2$ of the inner end reinforced wall portion 244 compared to the central wall region 208 may increase the stress capabilities of the airfoil body 200 in the area of the interface 243 with the inner band 160. The thickness $t_2$ of the inner end reinforced wall portion 244 may be the same as or different than the thickness $t_1$ of the outer end reinforced wall portion 224. The inner end reinforced wall portion 244 may additionally include a fillet 225 where the thickness of the wall of the airfoil body 200 decreases from the thickness $t_2$ of the inner end reinforced wall portion 244 to the lesser thickness $t_c$ of the central wall region 208. The fillet 225 may operate to further distribute the stress concentration across a broader area, effectively moving at least some of the stress away from the interface 243.

Figure 8B:
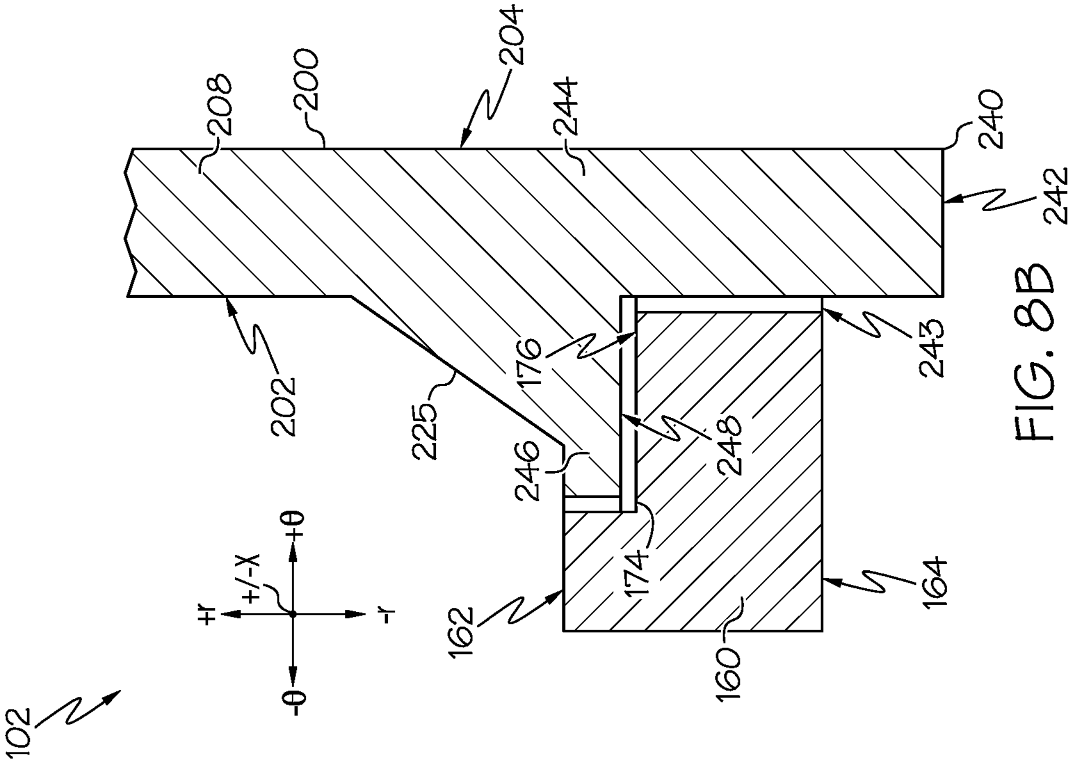
FIG. 8B schematically depicts a cross-sectional view of a portion of another embodiment of an interface between an airfoil body and an inner band of the nozzle segment assembly of FIG. 5, according to embodiments shown and described herein.
Figure 8A:
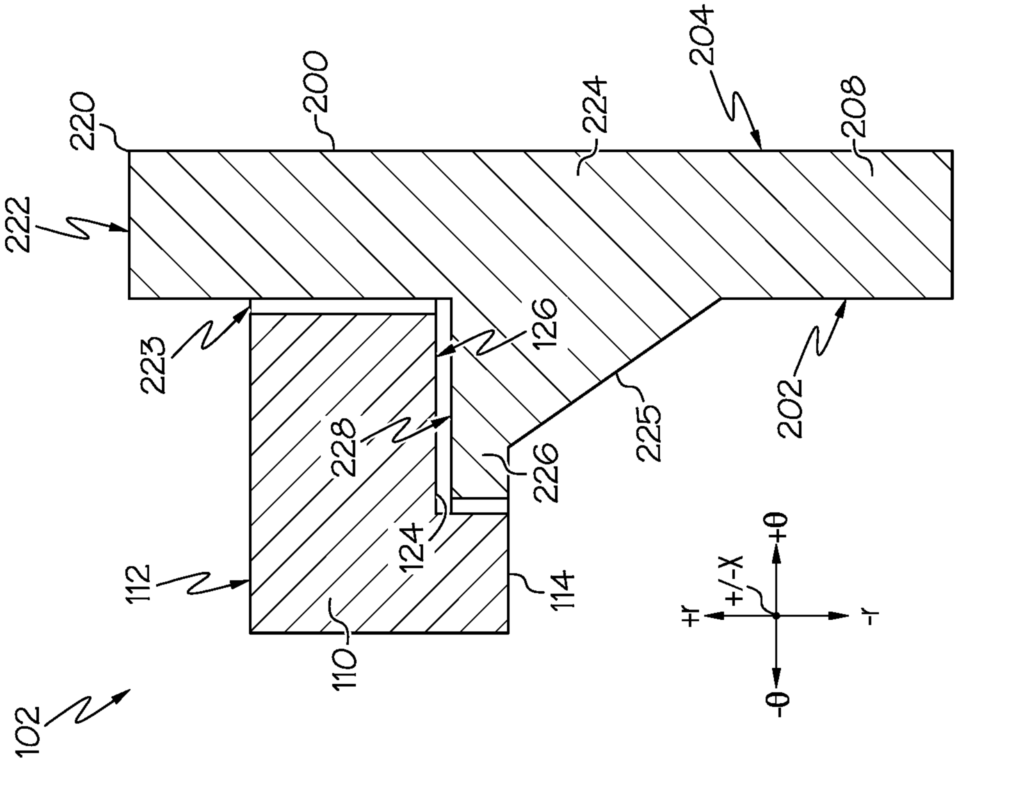
FIG. 8A schematically depicts a cross-sectional view of a portion of another embodiment of an interface between an airfoil body and an outer band of the nozzle segment assembly of FIG. 5, according to embodiments shown and described herein.

Referring now to FIG. 8A, another embodiment of the outer end reinforced wall portion 224 is schematically depicted. As shown in FIG. 8A, in embodiments, the outer end reinforced wall portion 224 may include a stepped configuration comprising an outer end flange 226 extending out from the exterior surface 202 at the outer end reinforced wall portion 224 of the airfoil body 200. The outer end reinforced wall portion 224 may additionally include the fillet 225 extending between the outer end flange 226 and the central wall region 208. As previously discussed, the fillet 225 at the outer end reinforced wall portion 224 may be characterized by a decreasing wall thickness in the −r direction of the coordinate axis of FIG. 8A, starting from a greatest thickness at the outer end flange 226 and ending at the thickness $t_c$ of the central wall region 208. The fillet 225 may operate to distribute localized stresses across a broader surface area to move stress away from the interface 223. The outer end flange 226 may include a radially outer surface 228 that may abut against a portion of the radially inward facing surface 114 of the outer band 110. The stepped configuration of the outer end flange 226 and abutment between the radially outer surface 228 of the outer end flange 226 and the radially inward facing surface 114 of the outer band 110 may reduce gas leakage between the airfoil body 200 and the outer band 110. Additionally, the stepped configuration may assist in properly positioning the outer band 110 relative to the airfoil body 200 during assembly and/or bonding. In some embodiments, the radially inward facing surface 114 of the outer band 110 may include a recess 124 that may provide a radial engagement surface 126 that may abut against the radially facing surface 228 of the outer end flange 226 when the airfoil assembly 102 is assembled, such as when the outer band 110 is engaged with the airfoil body 200. Abutting of the radially outer surface 228 of the outer end flange 226 against the radially inward facing surface 114 of the outer band 110 or against the radial engagement surface 126 of the recess 124 may restrict radial movement of the outer band 110 in a direction radially inward relative to the position of the airfoil body 200.

Referring now to FIG. 8B, the inner end reinforced wall portion 244 may also have stepped configuration comprising an inner end flange 246 extending out from the exterior surface 202 at the inner end reinforced wall portion 244 of the airfoil body 200. The inner end reinforced wall portion 244 may additionally include the fillet 225 extending between the inner end flange 246 and the central wall region 208. As previously discussed, the fillet 225 at the inner end reinforced wall portion 244 may be characterized by a decreasing wall thickness in the +r direction of the coordinate axis of FIG. 8B, starting from a greatest thickness at the inner end flange 246 and ending at the thickness $t_c$ of the central wall region 208. The fillet 225 may operate to distribute localized stresses across a broader surface area to move stress away from the interface 243. The inner end flange 246 may include a radially facing surface 248 that may abut against a portion of the radially outward facing surface 162 of the inner band 160. The stepped configuration of the inner end flange 246 and abutment between the radially facing surface 248 of the inner end flange 246 and the radially outward facing surface 162 of the inner band 160 may reduce or prevent gas leakage between the airfoil body 200 and the inner band 160. Additionally, the stepped configuration may assist in properly positioning the inner band 160 relative to the airfoil body 200 during assembly and/or bonding. In embodiments, the radially outward facing surface 162 of the inner band 160 may include a recess 174 that may provide a radial engagement surface 176 that may abut against the radially facing surface 248 of the inner end flange 246 when the airfoil assembly 102 is assembled, such as when the inner band 160 is engaged with the airfoil body 200. Abutting of the radially facing surface 248 of the outer end flange 226 against the radially outward facing surface 162 of the inner band 160 or against the radial engagement surface 176 of the recess 174 may restrict radial movement of the inner band 160 in a direction radially outward relative to the position of the airfoil body 200.

Figure 9A:
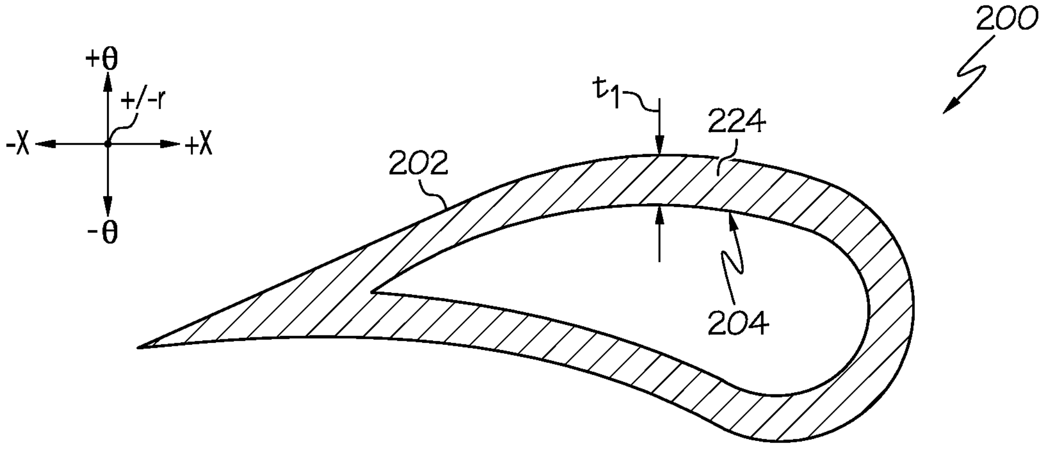
FIG. 9A schematically depicts a top view of an airfoil body of the nozzle segment assembly of FIG. 5, according to embodiments shown and described herein.
Figure 9B:
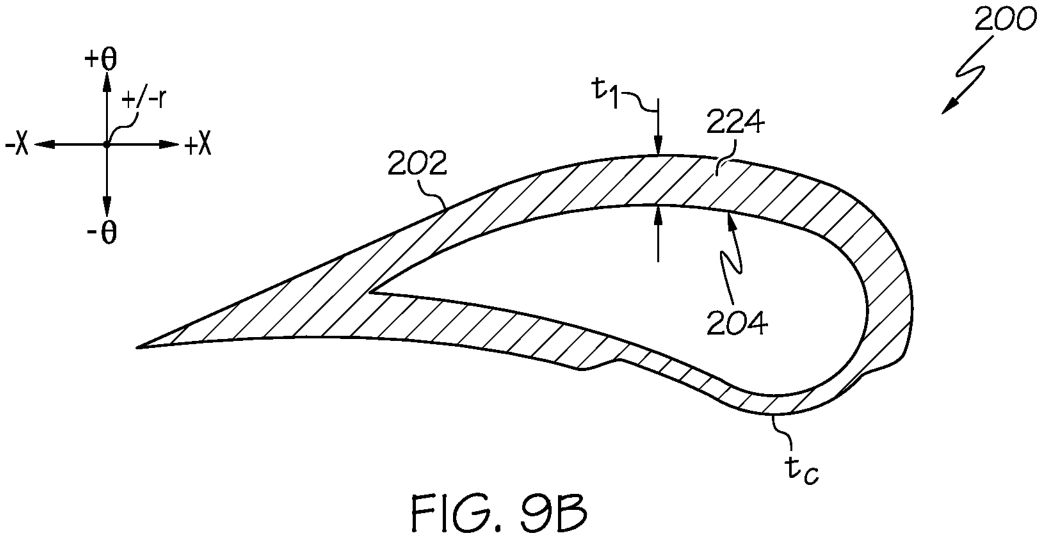
FIG. 9B schematically depicts a top view of another embodiment of an airfoil body of the nozzle segment assembly of FIG. 5, according to embodiments shown and described herein.

The outer end reinforced wall portion 224, the inner end reinforced wall portion 244, or both, may extend at least partially or fully around the exterior surface 202 of the at least one airfoil body 200 proximate the interfaces 223, 243 between the airfoil body 200 and the outer band 110, the inner band 160, or both, respectively. Referring now to FIGS. 9A and 9B, top cross-sectional views of embodiments of the airfoil body 200 taken with respect to a plane parallel to the central axis A of the engine 10 (FIG. 2) (e.g., a plane parallel to the +/−X direction and tangent to the +/−Theta direction of the coordinate axis in FIG. 9A) passing through the outer end reinforced wall portion 224 are depicted. As shown in FIG. 9A, in embodiments, the outer end reinforced wall portion 224 may extend all the way around a circumference of the exterior surface 202 of the airfoil body 200. Similar to the outer end reinforced wall portion 224, the inner end reinforced wall portion 244 may also extend all the way around the circumference of the external surface 202 of the airfoil body 200.

As shown in FIG. 9B, in other embodiments, the outer end reinforced wall portion 224 may extend around only a portion of the circumference of the exterior surface 202 of the airfoil body 200. In the remaining portion of the circumference of the exterior surface 202, the airfoil body 200 may have a wall thickness less than the thickness $t_1$ of the outer end reinforced wall portion 224. In some embodiments, the remaining portion of the circumference of the exterior surface 202, may have a thickness equal to the thickness $t_c$ of the central wall portion 208 of the airfoil body 200. Similar to the outer end reinforced wall portion 224 in FIG. 9B, the inner end reinforced wall portion 244 may also extend around only a portion of the circumference of the exterior surface 202 of the airfoil body 200.

Additionally or alternatively, the localized stresses at interface 223 and interface 243 may be further reduced by mounting the airfoil bodies 200 directly to the nozzle segment assembly 100 instead of mounting the outer band 110 and the inner band 160 to the nozzle segment assembly 100 and transferring force to or from the airfoil bodies 200 through the interfaces 223, 243 with the outer band 110 and inner band 160. By directly mounting the airfoil bodies 200 to the nozzle segment assembly 100, forces can be reacted directly between the engine and the airfoil bodies 200 instead of reacting forces with the outer band 110, the inner band 160, or both, through the interface 223 and the interface 243, which can lead to increased localized stresses in the airfoil bodies 200.

Referring again to FIGS. 5 and 6A, the nozzle segment assembly 100 may include the outer hanger 300 and the inner hanger 350, which may operate to position and at least partially constrain the airfoil assembly 102 within the nozzle segment assembly 100. The outer hanger 300, the inner hanger 350, or both, may each be a portion of a continuous ring centered on the center axis A of the engine 10. Alternatively or additionally, the outer hanger 300, the inner hanger 350, or both may each be a segment of a ring so that when a plurality of the nozzle segment assemblies 100 are assembled together, the plurality of outer hangers 300 form the outer ring 52 and the plurality of inner hangers 350 form the inner ring 54 (FIG. 2).

Referring again to FIGS. 5 and 6A, as previously discussed, the outer end 220 of the airfoil body 200 may pass through the opening 116 in the outer band 110 so that the outer end 220 may protrude radially outwardly (i.e., in the +r direction of the coordinate axis in FIGS. 5 and 6A) from the radially outward facing surface 112 of the outer band 110. Similarly, the inner end 240 of the airfoil body 200 may pass through the opening 166 of the inner band 160 so that the inner end 240 may protrude radially inwardly (i.e., in the −r direction of the coordinate axis in FIGS. 5 and 6A) from the radially inward facing surface 164 of the inner band 160. The outer hanger 300 may be configured to be engageable with at least the outer end 220 of the airfoil body 200, and the inner hanger 350 may be configured to be engageable with at least the inner end 240 of the airfoil body 200 to mount the airfoil body 200 in the nozzle segment assembly 100. Engagement of the outer end 220 and the inner end 240 of the airfoil body 200 with the outer hanger 300 and the inner hanger 350, respectively, may enable force to be transferred directly between the engine 10 and the airfoil bodies 200 rather than reacting the forces through the outer band 110 and the inner band 160. In embodiments, the outer hanger 300 may be engageable with both the outer end 220 of the at least one airfoil body 200 and the radially outward facing surface 112 of the outer band 110, such as when the airfoil bodies 200 are mechanically decoupled from the outer band 110. In embodiments, the inner hanger 350 may be engageable with both the inner end 240 of the at least one airfoil body 200 and the radially inward facing surface 164 of the inner band 160, such as when the airfoil bodies 200 are mechanically decoupled from the inner band 160.

Referring again to FIGS. 5 and 6A, the outer hanger 300 may have an outwardly facing surface 302 and an inwardly facing surface 304. The outer hanger 300 may be disposed radially outward (i.e., in the +r direction of the coordinate axis of FIGS. 5 and 6A) from the outer band 110 and the outer end 220 of the airfoil bodies 200 so that the inwardly facing surface 304 of the outer hanger 300 faces radially inward towards the outer end 220 of the airfoil body 200 and the radially outward facing surface 112 of the outer band 110. The inner hanger 350 may have an outwardly facing surface 352 and an inwardly facing surface 354. The inner hanger 350 may be disposed radially inward (i.e., in the −r direction of the coordinate axis of FIGS. 5 and 6A) from the inner band 160 and the inner end 240 of the airfoil bodies 200 so that the outwardly facing surface 352 of the inner hanger 350 faces radially outward towards the inner end 240 of the airfoil body 200 and the radially inward facing surface 164 of the inner band 160. The outer hanger 300 and the inner hanger 350 may be a material different from the CMC material of the outer band 110, the inner band 160, and the airfoil body 200. For example, the outer hanger 300, the inner hanger 350, or both may be a metal having a different coefficient of thermal expansion compared to the CMC material of the outer band 110, the inner band 160, and the airfoil body 200.

The outer hanger 300 may have one or a plurality of mounting features 310 protruding from the inwardly facing surface 304 in the radially inward direction towards the outer end 220 of the airfoil body 200 and the radially outward facing surface 112 of the outer band 110. Similarly, the inner hanger 350 may include one or a plurality of mounting features 310 protruding from the outwardly facing surface 352 in the radially outward direction towards the inner end 240 of the airfoil body 200 and the radially inward facing surface 164 of the inner band 160. Referring to FIG. 6A, each of the mounting features 310 may include a mounting surface 312 that may be oriented to contact a portion of the exterior surface 202 of the airfoil body 200 or a surface of the outer band 110 or inner band 160. Contact between the mounting surface 312 and the exterior surface 202 of the airfoil body 200 may operate to position the airfoil assembly 102 and at least partially restrict movement of the airfoil body 200, the outer band 110, the inner band 160, or combinations of these, in the axial direction, angular direction, or both (i.e., in the +/−X direction, +/−Theta direction, or both of the coordinate axis in FIGS. 5 and 6A) relative to the outer hanger 300, inner hanger 350, or both, while also transferring forces between the outer hanger 300, the inner hanger 350, or both, and the airfoil bodies 200. The inwardly facing surface 304 of the outer hanger 300 and the outwardly facing surface 352 of the inner hanger 350 may at least partially constrain movement of the airfoil assembly 102 in the radial direction (i.e., the +/−r direction of the coordinate axis of FIGS. 5 and 6A).

Figure 6B:
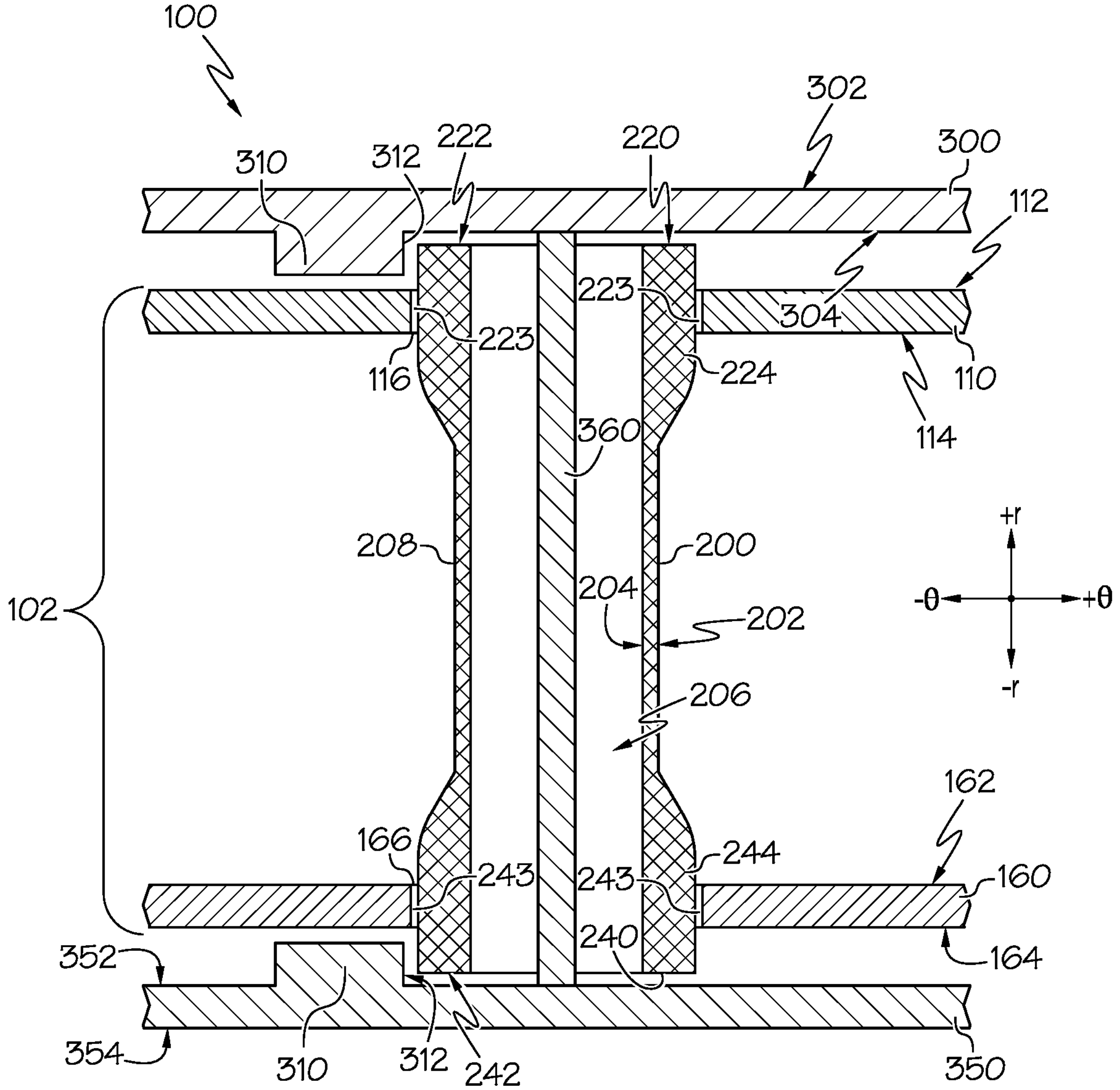
FIG. 6B schematically depicts a cross-sectional view of a portion of the nozzle segment assembly of FIG. 5 having a strut passing through an airfoil body of the nozzle segment assembly, according to embodiments shown and described herein.

Referring now to FIG. 6B, the nozzle segment assembly 100 may additionally include one or more struts 360 extending between the outer hanger 300 and the inner hanger 350. Each of the struts 360 may extend through the cavity 206 of one of the airfoil bodies 200 and may be mechanically coupled to the outer hanger 300, the inner hanger 350, or both.

Various configurations of the mounting features 310 for mounting the airfoil assembly 102 in the nozzle segment assembly 100 will now be described in further detail with reference to FIGS. 10A through 16B. FIGS. 10A, 10B, 11A, 11B, 12A, 12B, 13A, 13B, 14A, 14B, 15A, 15B, 16A, and 16B are cross-sectional views taken along reference line 10-10 in FIG. 6A. For ease of illustration, the cross-sectional views remove the body of the outer hanger 300 from the view to better illustrate the positioning of the mounting features 310 relative to the airfoil bodies 200. However, it should be understood that the various mounting features 310 are mechanically and rigidly coupled to the outer hanger 300. The various mounting configurations will be described in the context of engagement between the outer ends 220 of the airfoil bodies 200 and the outer hanger 300. However, it is understood that any of the described mounting configurations may be applied to engage the inner ends 240 of the airfoil bodies 200 with the inner hanger 350.

Figure 10A:
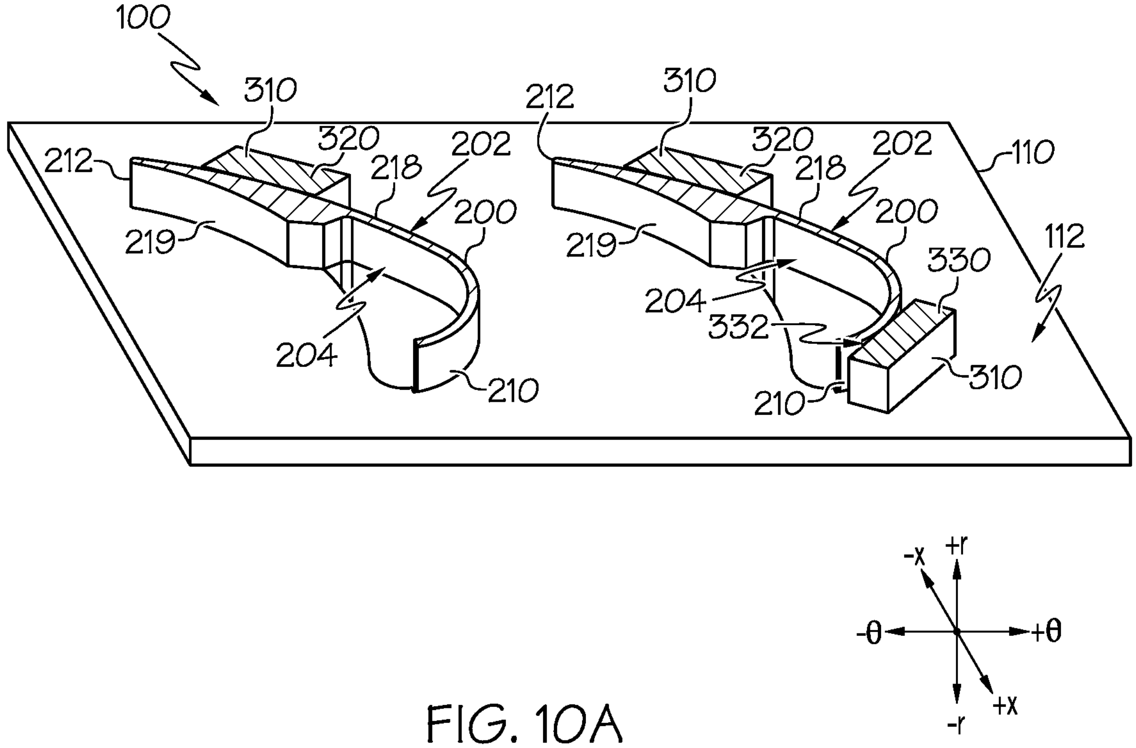
FIG. 10A schematically depicts a perspective cross-sectional view of an embodiment of the nozzle segment assembly of FIG. 5, according to embodiments shown and described herein.
Figure 10B:
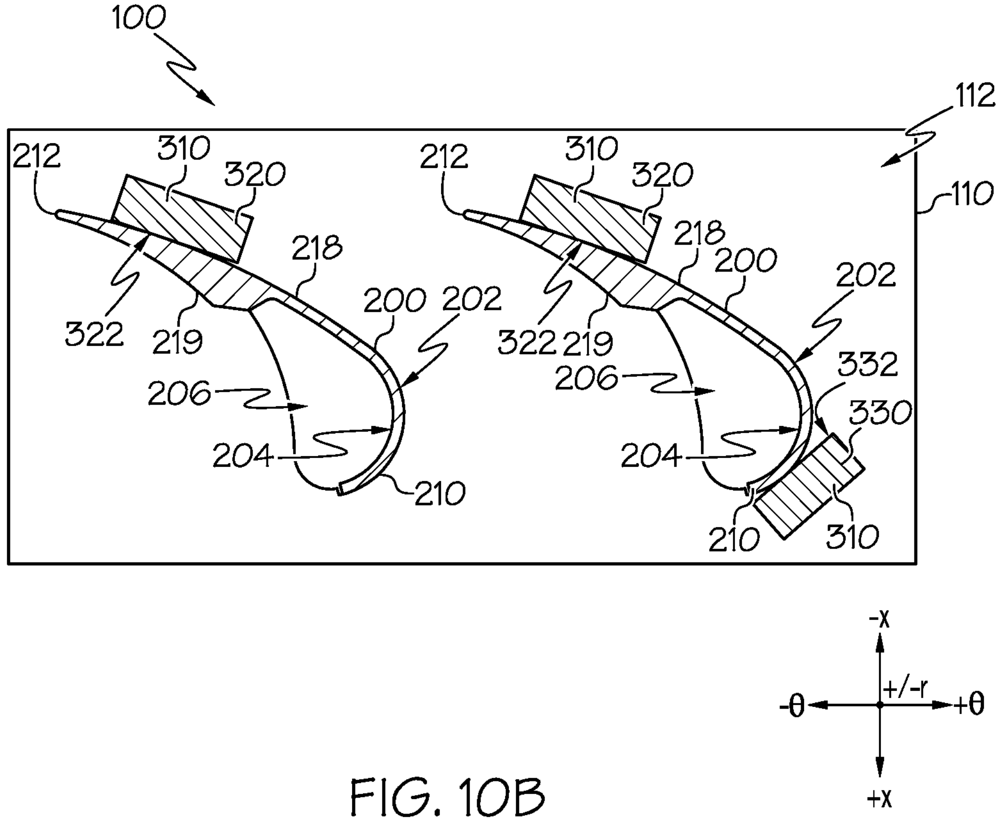
FIG. 10B schematically depicts a top cross-sectional view of the embodiment of the nozzle segment assembly of FIG. 10A, according to embodiments shown and described herein.

Referring now to FIGS. 10A and 10B, an embodiment of the nozzle segment assembly 100 is shown in cross-sectional views. The outer hanger 300, the inner hanger 350, or both (FIG. 6A), may have a plurality of mounting features 310. The mounting features 310 may include one or a plurality of axial mounts 320. Referring to FIG. 6A, axial mounts 320 coupled to the outer hanger 300 may extend radially inward (i.e., in the −r direction of the coordinate axis of FIG. 6A) from the inwardly facing surface 304 of the outer hanger 300. Axial mounts 320 coupled to the inner hanger 350 may extend radially outward (i.e., in the +r direction of the coordinate axis of FIG. 6A) from the outwardly facing surface 352 of the inner hanger 350. Referring again to FIGS. 10A and 10B, each of the axial mounts 320 may include an axial engagement surface 322 that engages with at least a portion of the exterior surface 202 or at least a portion of the interior surface 204 of the airfoil body 200. Engagement of the axial engagement surface 322 with the exterior surface 202 or interior surface 204 of the airfoil body 200 may at least partially restrict axial movement of the airfoil body 200 relative to the outer hanger 300 or the inner hanger 350. Engagement of the axial engagement surface 322 with the exterior surface 202 or interior surface 204 of the airfoil body 200 may at least partially constrain axial movement of the airfoil bodies 200 relative to the outer hanger 300 or inner hanger 350 while still allowing for axial expansion to accommodate for differences in thermal expansion between the CMC materials of the airfoil bodies 200 and the metal or other non-CMC materials of the outer hanger 300 and inner hanger 350.

As previously discussed, the nozzle segment assembly 100 may include a plurality of airfoil bodies 200. When the nozzle segment assembly 100 includes a plurality of airfoil bodies 200, the outer hanger 300, the inner hanger 350, or both may each include a plurality of axial mounts 320, and the axial engagement surface 322 of each of the plurality of axial mounts 320 may engage with the exterior surface 202 or the interior surface 204 of one of the airfoil bodies 200. In embodiments, the outer hanger 300, the inner hanger 350, or both may include at least one axial mount 320 for each of the airfoil bodies 200.

Referring to FIG. 10B, the axial engagement surface 322 of each of the axial mounts 320 may face at least partially in the axial direction (i.e., at least partially in the +/−X direction of the coordinate axis in FIG. 10B). A line normal to the plane of the axial engagement surface 322 of the axial mount 320 is not perpendicular to the axial direction (e.g., the line normal to the axial engagement surface 322 has a non-zero vector component in the +/−X direction). In other words, the line normal to the plane of the axial engagement surface 322 in not perpendicular to an axial line (i.e., a line parallel to the center axis A of the engine 10) passing through the point where the line normal to the plane of the axial engagement surface 322 passes through the plane of the axial engagement surface 322. In embodiments, the axial mount 320 may be oriented so that the axial engagement surface 322 of the at least one axial mount 320 may be aligned with a contour of a portion of the exterior surface 202 of the airfoil body 200. In embodiments, the line normal to the axial engagement surface 322 of the axial mount 320 may not be parallel to the axial direction (i.e., a line parallel to the center axis A of the engine 10) so that the axial engagement surface 322 forms an angle with the axial direction. In other words, the line normal to the plane of the axial engagement surface 322 may include a non-zero vector component in the radial direction (+/−r direction) and/or in the tangential direction (i.e., along a line tangent to a circle centered on the center axis A of the engine 10 and passing through the point at which the normal line intersects the plane of the axial engagement surface 322). Referring to FIGS. 10A and 10B, in embodiments, the axial mounts 320 may be positioned to engage the exterior surfaces 202 of the airfoil bodies 200 at the suction side 218 of the airfoil bodies 200.

Referring again to FIGS. 10A and 10B, the mounting features 310 may include one or a plurality of tangential mounts 330. As shown in FIGS. 10A and 10B, the outer hanger 300, the inner hanger 350, or both, may include at least one tangential mount 330. Tangential mounts 330 coupled to the outer hanger 300 may extend radially inward (i.e., in the −r direction of the coordinate axis of FIGS. 10A and 10B) from the inwardly facing surface 304 of the outer hanger 300. Tangential mounts 330 coupled to the inner hanger 350 may extend radially outward (i.e., in the +r direction of the coordinate axis of FIGS. 10A and 10B) from the outwardly facing surface 352 of the inner hanger 350. Each of the tangential mounts 330 may include a tangential engagement surface 332 that may engage with at least a portion of the exterior surface 202 or the interior surface 204 of at least one of the airfoil bodies 200. Engagement of the tangential engagement surface 332 of the tangential mount 330 with the exterior surface 202 or interior surface 204 of the airfoil body 200 may at least partially restrict tangential or angular movement of the airfoil body 200 relative to the outer hanger 300 or the inner hanger 350. Engagement of the tangential engagement surface 332 with the exterior surface 202 or interior surface 204 of the airfoil body 200 may at least partially constrain tangential or angular movement of the airfoil bodies 200 relative to the outer hanger 300 or inner hanger 350 while still allowing for axial expansion to accommodate for differences in thermal expansion between the CMC materials of the airfoil bodies 200 and the metal or other non-CMC materials of the outer hanger 300 and inner hanger 350.

In embodiments, each nozzle segment assembly 100 may include a single tangential mount 330 coupled to the outer hanger 300 and a single tangential mount 330 coupled to the inner hanger 350. When the nozzle segment assembly 100 includes a plurality of airfoil bodies 200, the single 330 on the outer hanger 300 and the single 330 on the inner hanger 350 may be sufficient to constrain tangential or angular movement of the airfoil assembly 102 relative to the outer hanger 300 and the inner hanger 350, respectively. When each nozzle segment assembly 100 includes a plurality of airfoil bodies 200, including the tangential mount 330 for each of the airfoil bodies 200 on both the outer hanger 300 and the inner hanger 350 may overly constrain the airfoil assembly 102.

The tangential engagement surface 332 of the tangential mount 330 may face at least partially in the tangential direction (e.g., in the +/−Theta direction of the coordinate axis in FIGS. 10A and 10B). The tangential direction may be a direction along a tangent line to a circle centered on the center axis A of the engine 10 (FIG. 1) and passing through the tangential engagement surface 332. In other words, a line normal to the tangential engagement surface 332 may have a non-zero vector component in the tangential and/or angular direction. In embodiments, the at least one tangential mount 330 may be positioned to engage the exterior surface 202 of the at least one airfoil body 200 proximate to the forward edge 210 at the suction side 218 of the at least one airfoil body 200.

In embodiments, the outer hanger 300 may include at least one tangential mount 330 extending radially inward from the inwardly facing surface 304 of the outer hanger 300. In embodiments, the inner hanger 350 may include at least one tangential mount 330 extending radially outward from the outwardly facing surface 352 of the inner hanger 350. As shown in FIGS. 10A and 10B, the combination of axial mounts 320 and tangential mounts 330 may cooperate to constrain the airfoil assembly 102 in the axial and angular directions relative to the outer hanger 300 and inner hanger 350.

Figure 11A:
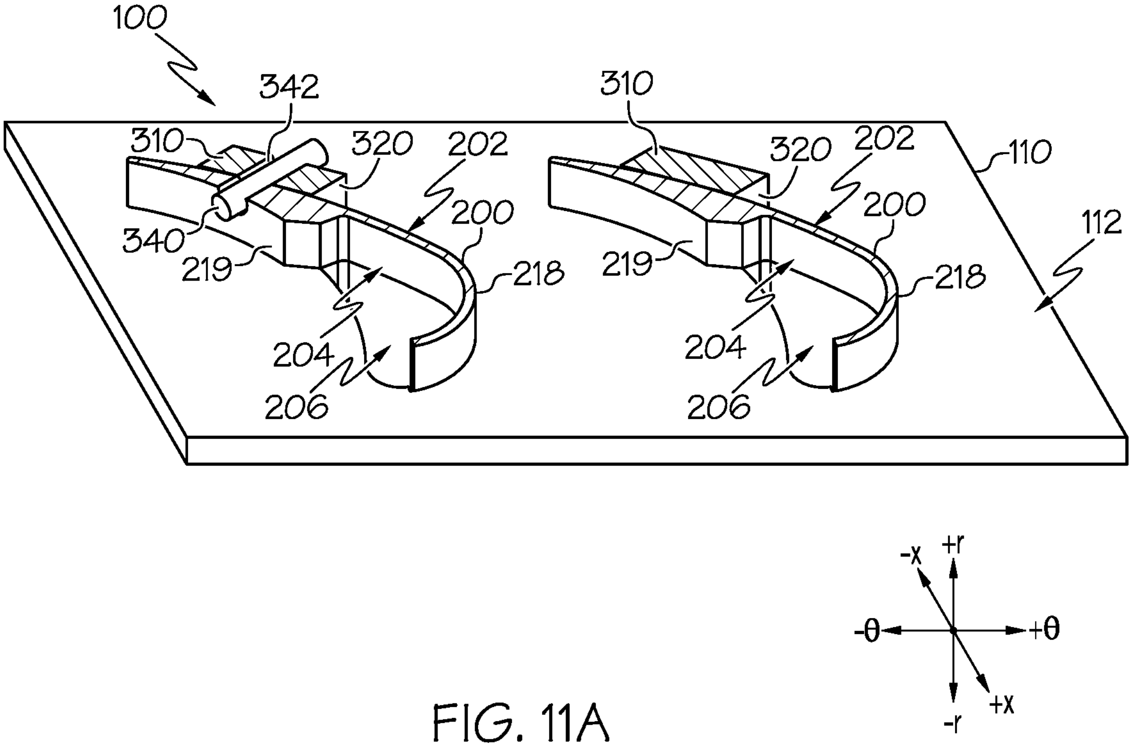
FIG. 11A schematically depicts a perspective cross-sectional view of another embodiment of the nozzle segment assembly of FIG. 5, according to embodiments shown and described herein.
Figure 11B:
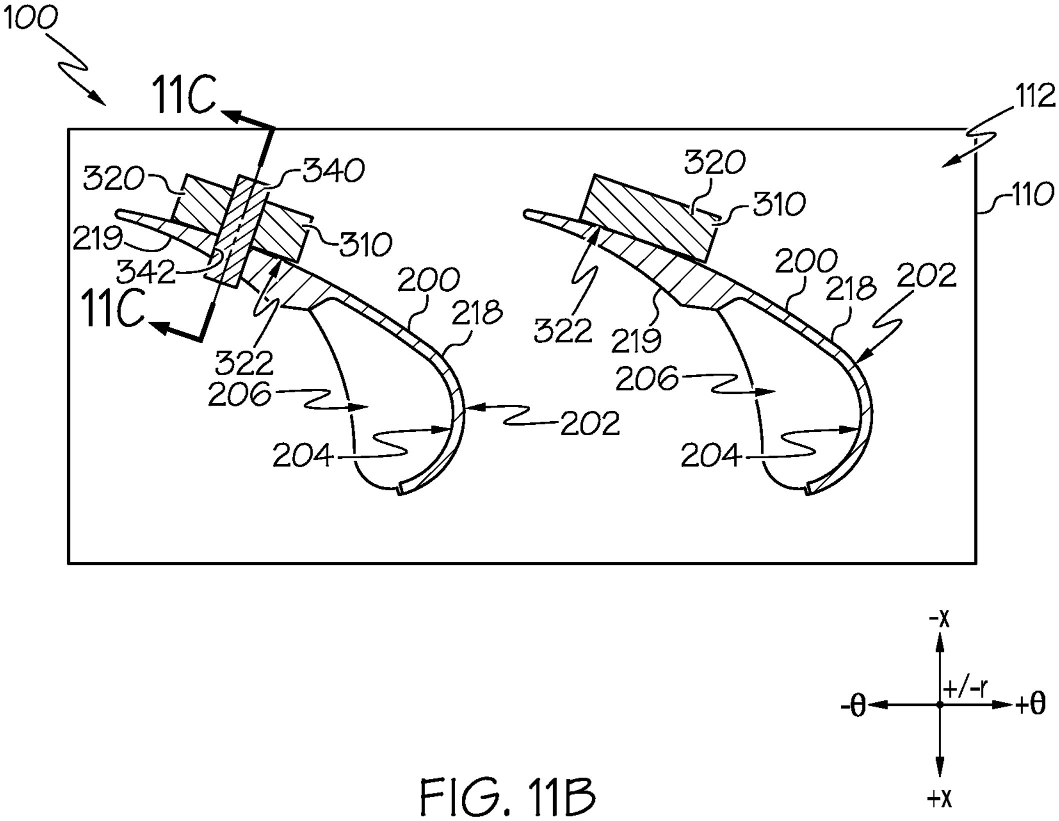
FIG. 11B schematically depicts a top cross-sectional view of the embodiment of the nozzle segment assembly of FIG. 11A, according to embodiments shown and described herein.

Referring now to FIGS. 11A and 11B, the outer hanger 300, the inner hanger 350, or both may not include the tangential mount 330. Instead, the nozzle segment assembly 100 may include a pin 340 that may be inserted through a borehole 342 that extends through one of the axial mounts 320 and through at least a portion of one of the airfoil bodies 200. The pin 340 may be operable to engage with the airfoil body 200 and the axial mount 320 to at least partially constrain the airfoil body 200, and the airfoil assembly 102, of which the airfoil body 200 is a part, in the angular direction (i.e., in the +/−Theta direction of the cylindrical coordinate axis of FIGS. 11A and 11B). In other words, engagement of the pin 340 with the one airfoil body 200 and the one axial mount 320 may restrict movement of the one airfoil body 200 and the airfoil assembly 102 in an angular or tangential direction relative to the outer hanger 300 or the inner hanger 350.

When the pin 340 is used to constrain the airfoil assembly 102 in the angular/tangential direction, the axial mount 320 through which the pin 340 is inserted may have an axial engagement surface 322 that is angled relative to the axial direction (i.e., the +/−X direction of the cylindrical coordinate axis in FIG. 11A). In other words, the axial mount 320 may be angled relative to the axial direction such that, the line normal to the axial engagement surface 322 of the axial mount 320 may not be parallel to the axial direction (i.e., a line parallel to the center axis A of the engine 10). In embodiments, the line normal to the plane of the axial engagement surface 322 may include a non-zero vector component in at least the tangential direction (i.e., along a line tangent to a circle centered on the center axis A of the engine 10 and passing through the point at which the normal line intersects the plane of the axial engagement surface 322).

Figure 11C:
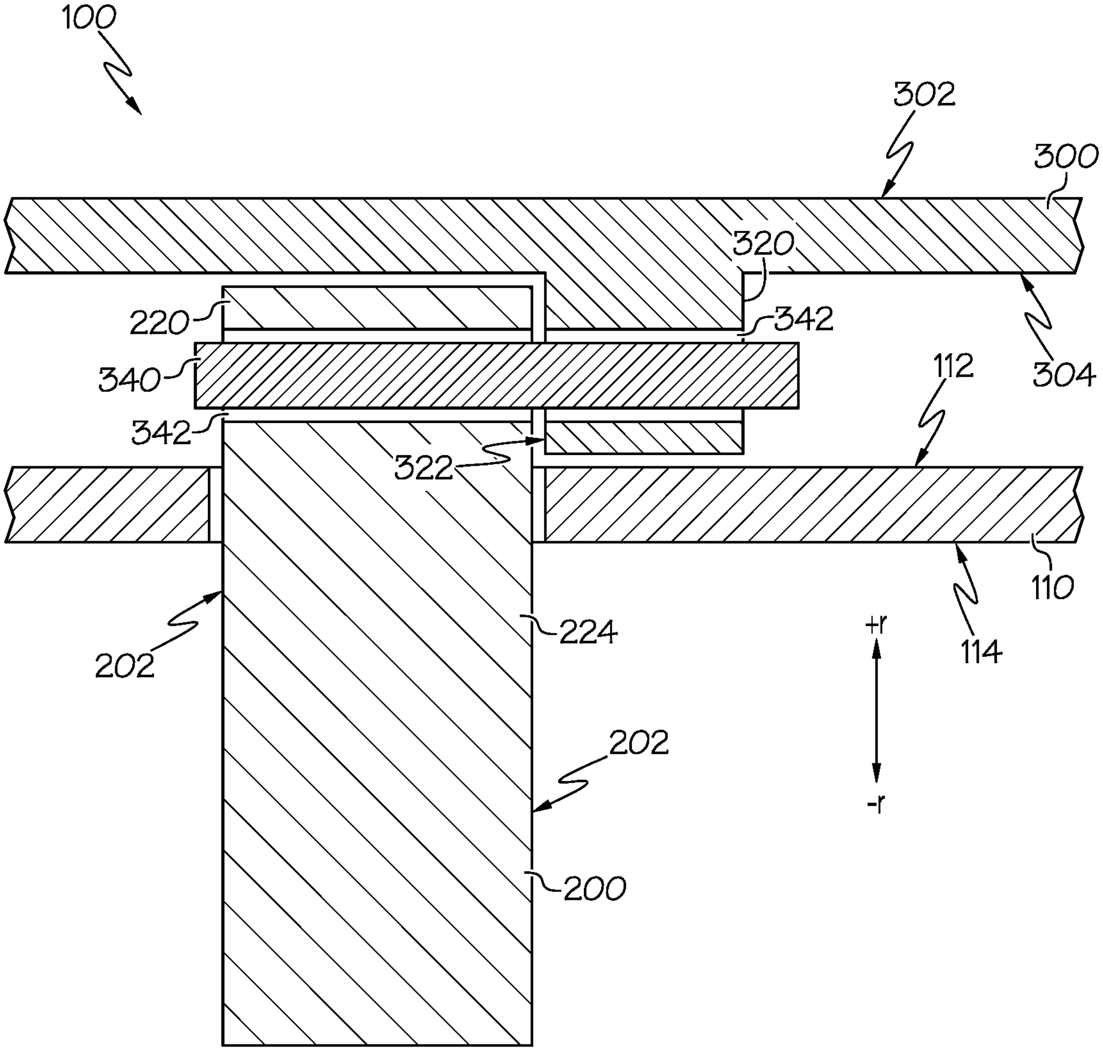
FIG. 11C schematically depicts a side cross-sectional view of the embodiment of the nozzle segment assembly of FIG. 11B taken along reference plane 11C-11C in FIG. 11B, according to embodiments shown and described herein.

Referring now to FIG. 11C, a cross-section of the nozzle segment assembly 100 of FIG. 11B is taken along reference line 11C-11C in FIG. 11B. As shown in 11C, the pin 340 may extend through the borehole 342 that extends through both the portion of the airfoil body 200 and the axial mount 320, thereby at least partially constraining the airfoil body 200 in the tangential/angular direction relative to the outer hanger 300 in FIG. 11C. Although not shown, the pin 340 may be secured or retained within the borehole 342 through any means known in the art for such purposes and the method of securing the pin 340 in the borehole 342 is not particularly limited. Non-limiting examples may include incorporating flanges on one or both ends of the pin 340 as with a rivet or using fasteners, such as snap rings, cotter pins, clips, or the like, at one or both ends of the pin 340. In embodiments, one end of the pin 340 may be press fit or friction fit into the portion of borehole 342 in the axial mount 320, and the other end of the pin 340 may be inserted into the other portion of the borehole in the airfoil body 200 but not mechanically and rigidly coupled to the airfoil body 200. Other methods of securing the pin 340 in the borehole 342 would be apparent to one of ordinary skill in the art.

When the nozzle segment assembly 100 comprises a plurality of airfoil bodies 200, the nozzle segment assembly 100 may include only a single pin 340 for the outer hanger 300, the single pin 340 engaging a single airfoil body 200 and a single axial mount 320. The outer hanger 300 may include a plurality of axial mounts 320, but only one pin 340 may be incorporated. Likewise, the inner hanger 350 may also include a single pin 340 engaging a single one of the airfoil bodies 200 and a single one of the axial mounts 320 coupled to the inner hanger 350. Multiple pins 340 used on either the outer hanger 300 or the inner hanger 350 may result in over-constraining the airfoil assembly 102 relative to the outer hanger 300 and/or the inner hanger 350.

Figure 12A:
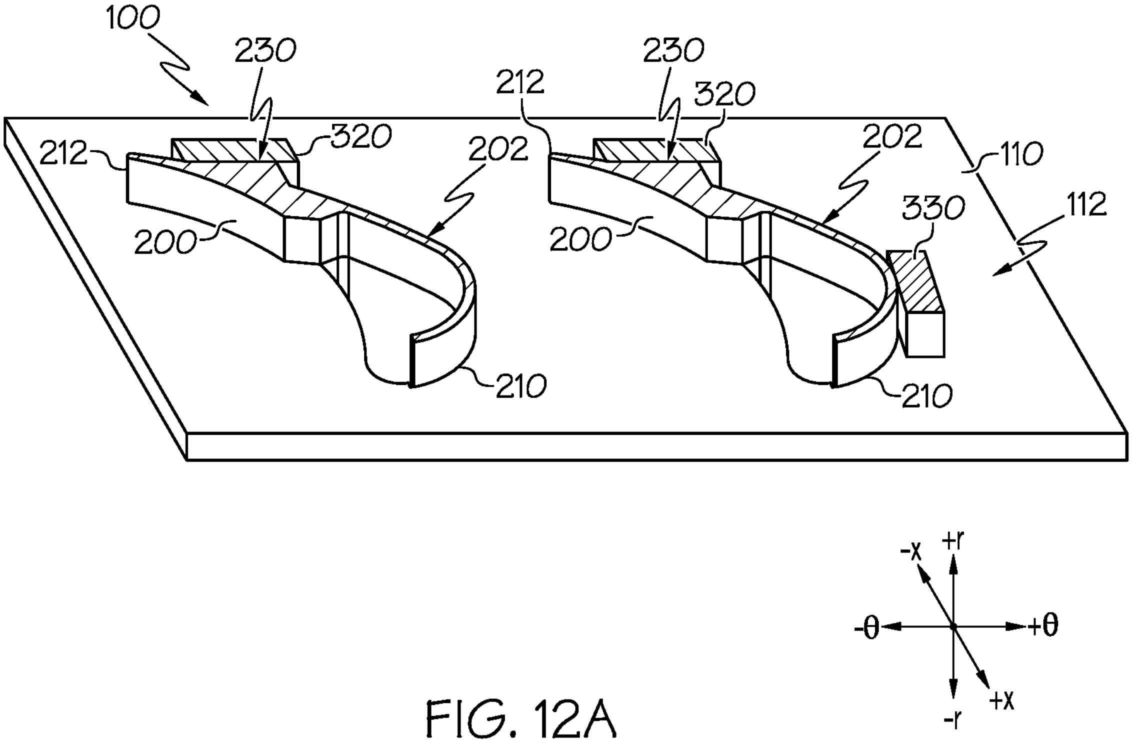
FIG. 12A schematically depicts a perspective cross-sectional view of still another embodiment of the nozzle segment assembly of FIG. 5, according to embodiments shown and described herein.
Figure 12B:
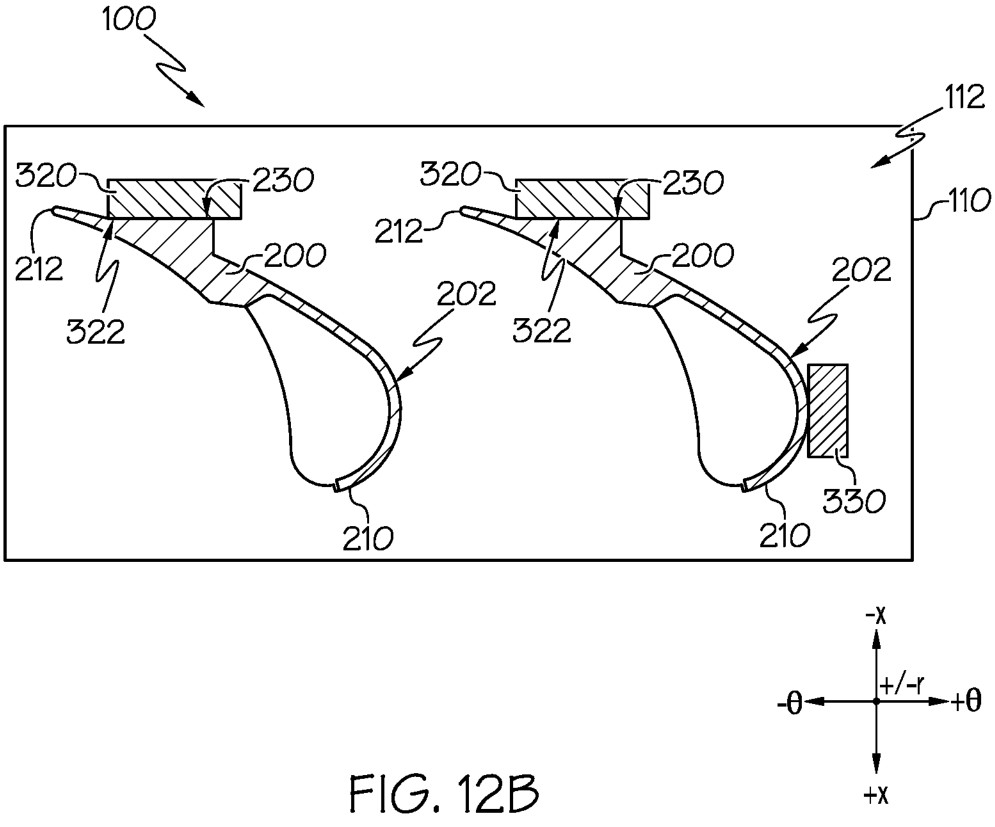
FIG. 12B schematically depicts a top cross-sectional view of the embodiment of the nozzle segment assembly of FIG. 12A, according to embodiments shown and described herein.

Referring now to FIGS. 12A and 12B, another mounting configuration for mounting the airfoil bodies 200 directly to the outer hanger 300 and/or the inner hanger 350 is schematically depicted. As shown in FIGS. 12A and 12B, in embodiments, one or more of the axial mounts 320 may be oriented so that the axial engagement surface 322 faces in the axial direction (i.e., in the +/−X direction of the cylindrical coordinate axis of FIGS. 12A and 12B). In embodiments, the plane of the axial engagement surface 322 may be perpendicular to the axial direction. In embodiments, a line normal to the axial engagement surface 322 may be parallel to a plane formed by the axial direction (+/−X direction) and the radial direction (+/−r direction) at the axial engagement surface 322. In embodiments, the axial engagement surface 322 may be parallel to the tangential direction (i.e., parallel to a line tangent to a circle centered on the center axis A of the engine and passing through the axial engagement surface 322). In embodiments, the line normal to the axial engagement surface 322 may have a vector component in the tangential direction that is substantially equal to zero. However, in embodiments, the line normal to the axial engagement surface 322 may have a non-zero vector component in the radial direction.

At least one of the airfoil bodies 200 may include an axially-facing exterior surface 230 at the outer end 220, the inner end 240, or both, of the airfoil body 200. The axially facing exterior surface 230 may be oriented to engage with the axial engagement surface 322 of the axial mount 320. Engagement of the axially facing exterior surface 230 with the axial engagement surface 322 of the axial mount 320 may at least partially constrain the airfoil body 200 in the axial direction. Engagement between the axially facing exterior surface 230 and the axial engagement surface 322 may provide a more determinant and stable axial constraint on the airfoil body 200 compared to axial mounts 320 having axial engagement surfaces 322 that are angled relative to the axial direction, such as the embodiments represented by FIGS. 10A and 10B.

Referring again to FIGS. 12A and 12B, the axially facing exterior surface 230 of the airfoil body 200 may be a surface of a protrusion 232 extending from the exterior surface 202 of the airfoil body 200 at the outer end 220, the inner end 240, or both. The protrusion 232 may be formed integrally as part of the airfoil body 200 or may be formed separately and bonded to the airfoil body 200. In embodiments, the protrusion 232 may be formed on or bonded to the airfoil body 200 proximate to the aft edge 212 of the airfoil body 200. The protrusion 232 may additionally provide a radially facing surface that may provide a secondary retention feature than may be used to at least partially constrain the airfoil bodies 200 in the radially outward direction.

In embodiments, the nozzle segment assembly 100 may include a plurality of airfoil bodies 200, each of which having an axially facing exterior surface 230, and the outer hanger 300, the inner hanger 350, or both may each include a plurality of axial mounts 320 that may be oriented so that the axial engagement surface 322 faces in the axial direction (i.e., in the +/−X direction of the cylindrical coordinate axis of FIGS. 12A and 12B) and engages with the axially facing exterior surface 230 of one of the airfoil bodies 200. The outer hanger 300, the inner hanger 350, or both, may additionally include at least one tangential mount 330 that may be operable to constrain the airfoil assembly 102 in the tangential/angular direction (e.g., in the +/−Theta direction of the coordinate axis in FIGS. 12A and 12B.

Figure 13A:
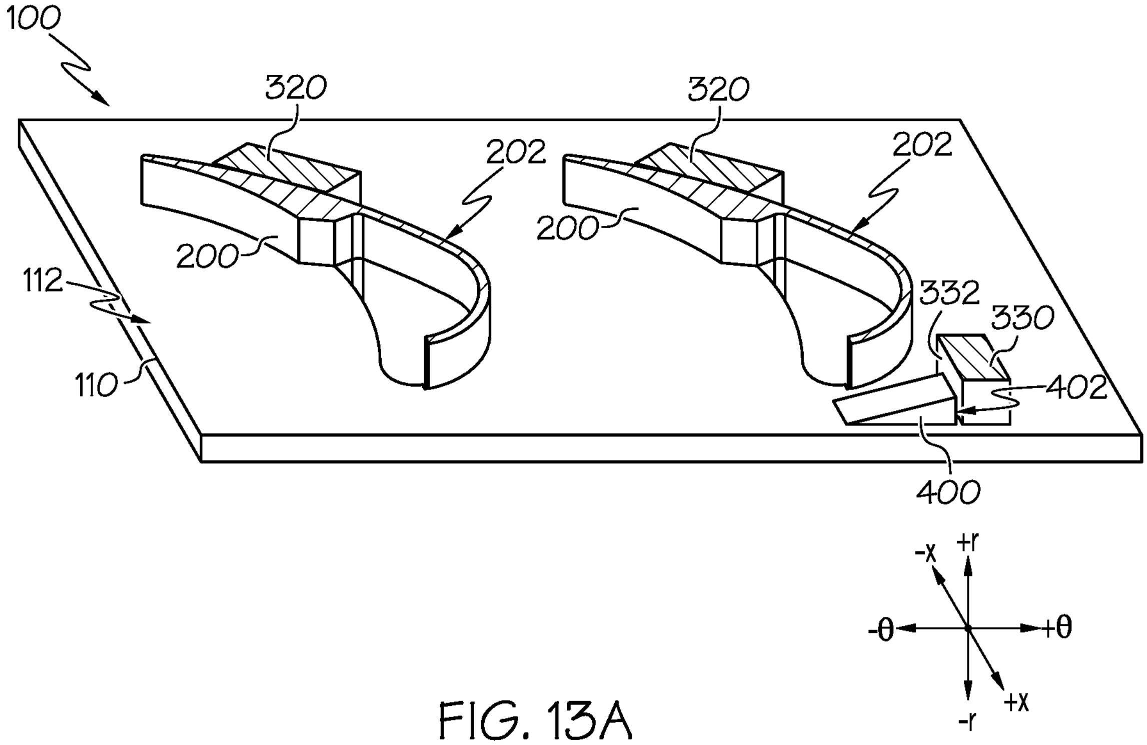
FIG. 13A schematically depicts a perspective cross-sectional view of still another embodiment of the nozzle segment assembly of FIG. 5, according to embodiments shown and described herein.
Figure 13B:
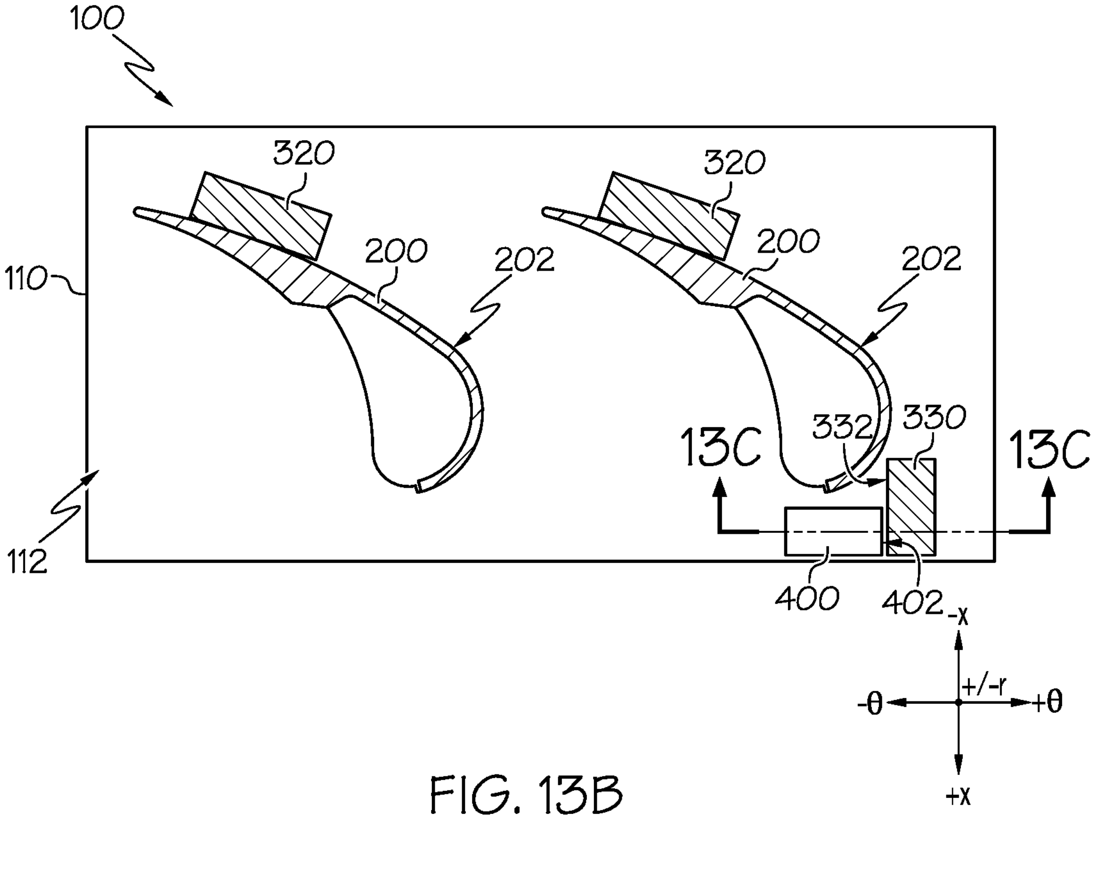
FIG. 13B schematically depicts a top cross-sectional view of the embodiment of the nozzle segment assembly of FIG. 13A, according to embodiments shown and described herein.

Referring now to FIGS. 13A and 13B, in embodiments, the tangential mount 330 of the outer hanger 300 and/or the inner hanger 350 may engage with a tangentially facing surface 402 of a ridge 400 extending from the outer band 110, the inner band 160, or both. Engagement between the tangentially facing surface 402 of the ridge 400 and the tangential mount 330 may at least partially constrain the airfoil assembly 102 in the tangential and/or angular direction relative to the outer hanger 300, the inner hanger 350, or both. In these embodiments, the airfoil assembly 102 may be constrained in the tangential and/or angular direction through engagement between the tangential mount 330 and the outer band 110, the inner band 160, or both instead of engagement of the tangential mount 330 with one of the airfoil bodies 200 directly.

Figure 13C:
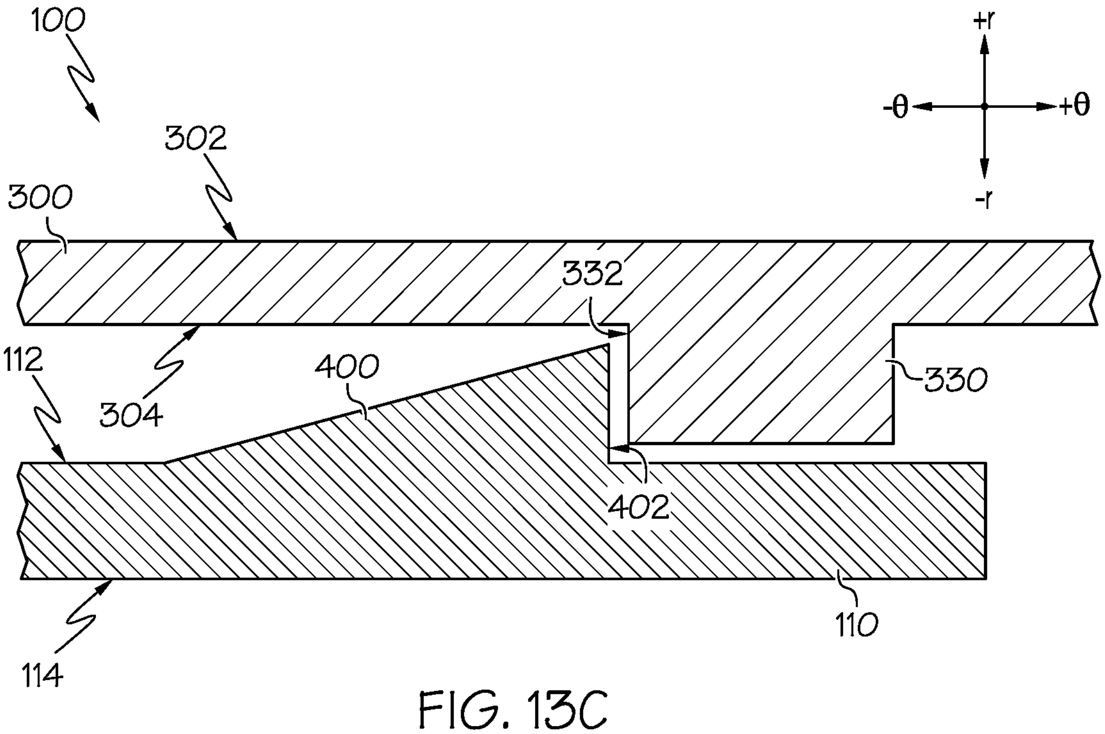
FIG. 13C schematically depicts a side cross-sectional view of the embodiment of the nozzle segment assembly of FIG. 13B taken along reference plane 13C-13C in FIG. 13B, according to embodiments shown and described herein.

The outer band 110 may have the ridge 400 extending radially outward from the radially outward facing surface 112 of the outer band 110. The ridge 400 may include the tangentially facing surface 402, which may face generally in the tangential direction (e.g., in the +/−Theta direction of the cylindrical coordinates of FIGS. 13A and 13B). The ridge 400 may be formed integrally with the outer band 110 or may be formed separately and bonded to the radially outward facing surface 112 of the outer band 110. The outer hanger 300 may include the tangential mount 330 having the tangential engagement surface 332 that may be generally parallel to the axial direction (e.g., parallel to the center axis A of the engine 10 in FIG. 1). The tangential mount 330 may be positioned on the outer hanger 300 so that the tangential engagement surface 332 can engage with the tangentially facing surface 402 of the ridge 400 when the nozzle segment assembly 100 is assembled. FIG. 13C schematically depicts a cross-sectional view of a portion of the nozzle segment assembly 100 taken along reference line 13C-13C in FIG. 13B. FIG. 13C schematically illustrates interaction between the tangential mount 330 and the ridge 400 to constrain the airfoil assembly 102 in the tangential and/or angular direction.

Although not depicted in FIGS. 13A-13C, alternatively or additionally, the radially inward facing surface 164 of the inner band 160 may also include a ridge 400 extending radially inward from the radially inward facing surface 164 of the inner band 160. The ridge 400 may include the tangentially facing surface 402, which may face generally in the tangential direction. The ridge 400 may be formed integrally with the inner band 160 or may be formed separately and bonded to the radially inward facing surface 164 of the inner band 160. The inner hanger 350 may include a tangential mount 330 having a tangential engagement surface 332 that is generally parallel to the axial direction (e.g., parallel to the center axis A of the engine 10 in FIG. 1). The tangential mount 330 may be positioned on the inner hanger 350 so that the tangential engagement surface 332 can engage with the tangentially facing surface 402 of the ridge 400 on the inner band 160 when the nozzle segment assembly 100 is assembled. The embodiments represented in FIGS. 13A and 13B may have any of the axially mounting configurations disclosed herein.

Figure 14A:
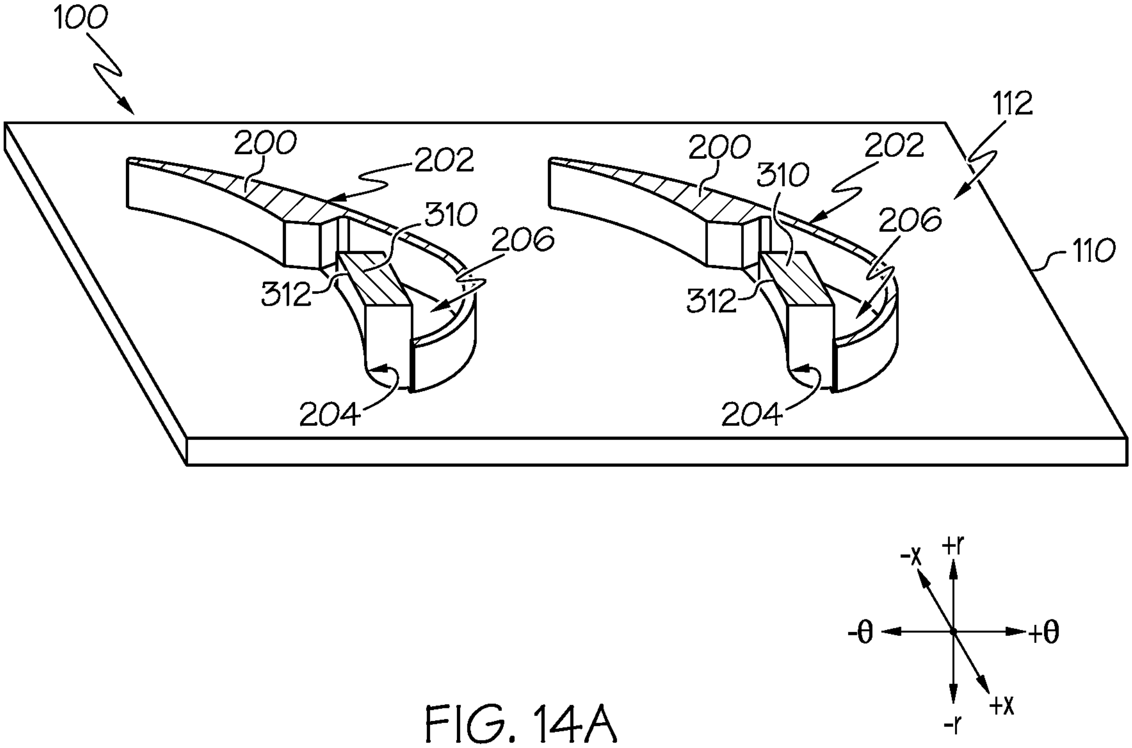
FIG. 14A schematically depicts a perspective cross-sectional view of still another embodiment of the nozzle segment assembly of FIG. 5, according to embodiments shown and described herein.
Figure 14B:
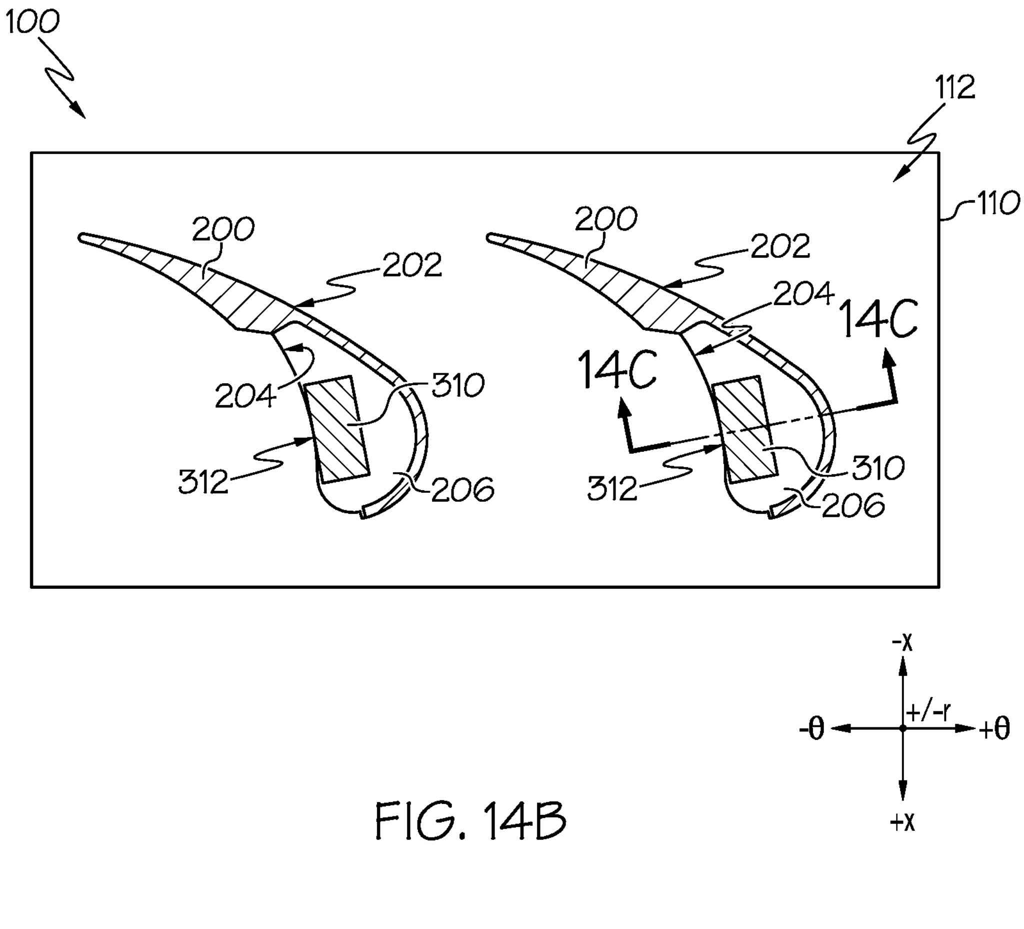
FIG. 14B schematically depicts a top cross-sectional view of the embodiment of the nozzle segment assembly of FIG. 14A, according to embodiments shown and described herein.
Figure 14C:
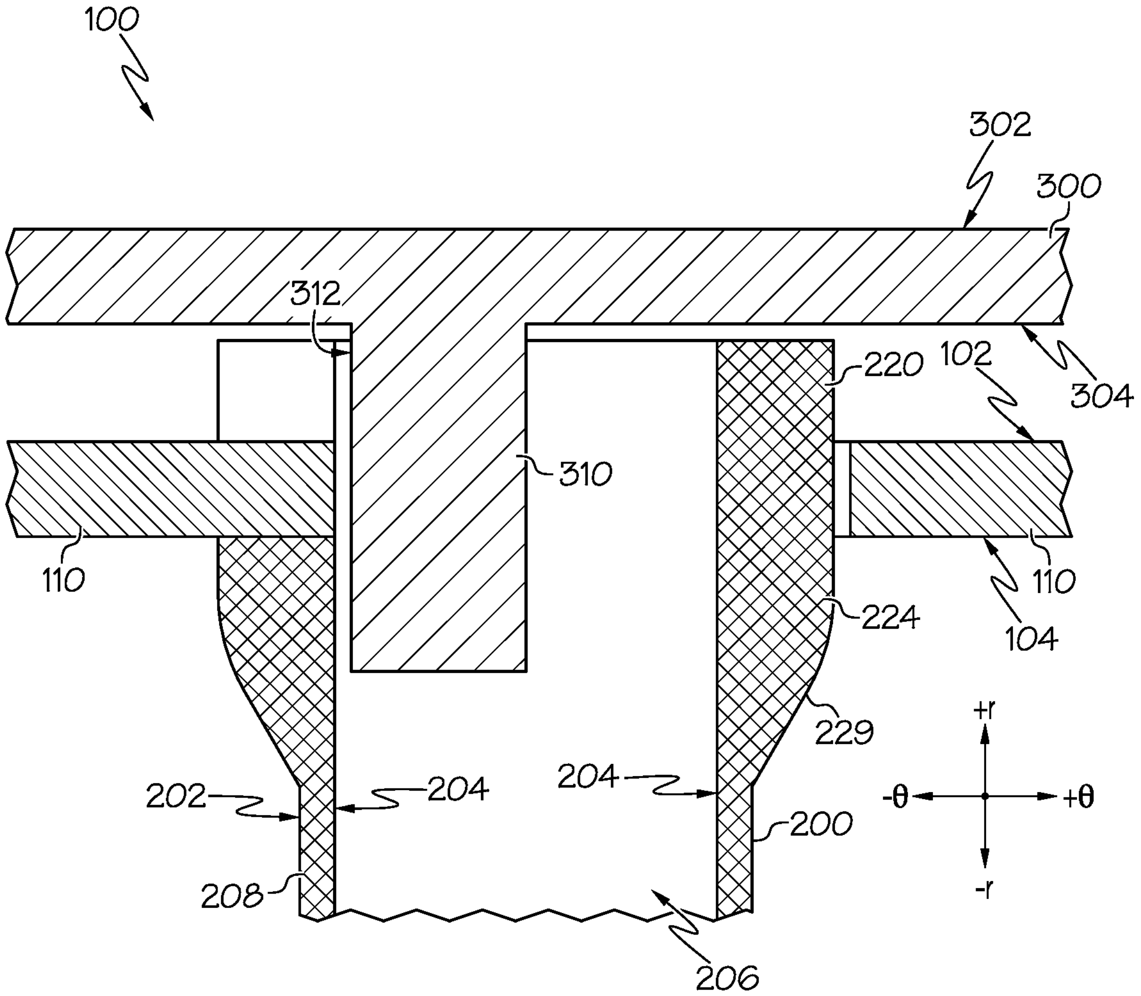
FIG. 14C schematically depicts a side cross-sectional view of the embodiment of the nozzle segment assembly of FIG. 14B taken along reference plane 14C-14C in FIG. 14B, according to embodiments shown and described herein.

Referring now to FIGS. 14A through 14C, in embodiments, the airfoil body 200 may be a hollow airfoil body having the cavity 206 defined by the interior surface 204 of the airfoil body 200. One or more of the mounting features 310 may be positioned to extend into the cavity 206 defined by the interior surface 204 of the airfoil body 200 such that the mounting surface 312 of the at least one mounting feature 310 can engage with at least a portion of the interior surface 204 of the airfoil body 200. Engagement of the mounting surface 312 of the mounting feature 310 with the interior surface 204 of the airfoil body 200 may at least partially constrain the airfoil body 200 and the airfoil assembly 102 at least in the axial direction. Depending on the positioning of the mounting feature 310 within the cavity 206 of the airfoil body 200, the mounting feature 310 may additionally constrain the airfoil body 200 and the airfoil assembly 102 in the tangential and/or angular direction. The mounting feature 310 may be an axial mount 320, a tangential mount 330, or both, depending on the orientation of the mounting surface 312 relative to the interior surface 204 of the airfoil body 200. In some embodiments, the mounting feature 310 may be a strut, such as strut 360 depicted in FIG. 6B, that extends all the way through the cavity 206 and that is coupled to both the outer hanger 300 and the inner hanger 350. Referring again to FIGS. 14A-14C, the outer hanger 300, the inner hanger 350, or both may each include one or a plurality of the mounting features 310 extending into the cavity 206 of one of the airfoil bodies 200. Axially constraining the airfoil assembly 102 relative to the outer hanger 300, the inner hanger 350, or both by incorporating mounting features 310 extending into the cavities 206 of the airfoil bodies 200 to engage with the interior surfaces 204 of the airfoil bodies 200 may be used in combination with any of tangential and/or angular constraining methods disclosed herein, such as but not limited to engaging the tangential mount 330 with the exterior surface 202 of one of the airfoil bodies 200 or with a ridge on the outer band 110, the inner band 160, or both.

Figure 15A:
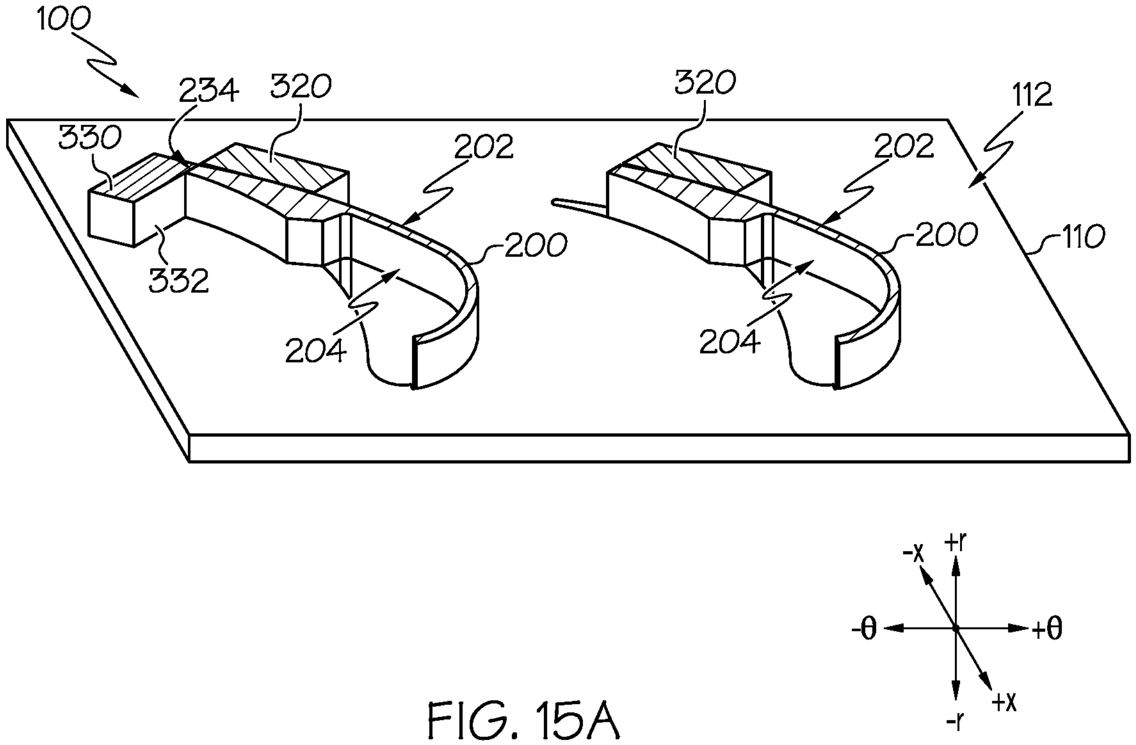
FIG. 15A schematically depicts a perspective cross-sectional view of still another embodiment of the nozzle segment assembly of FIG. 5, according to embodiments shown and described herein.
Figure 15B:
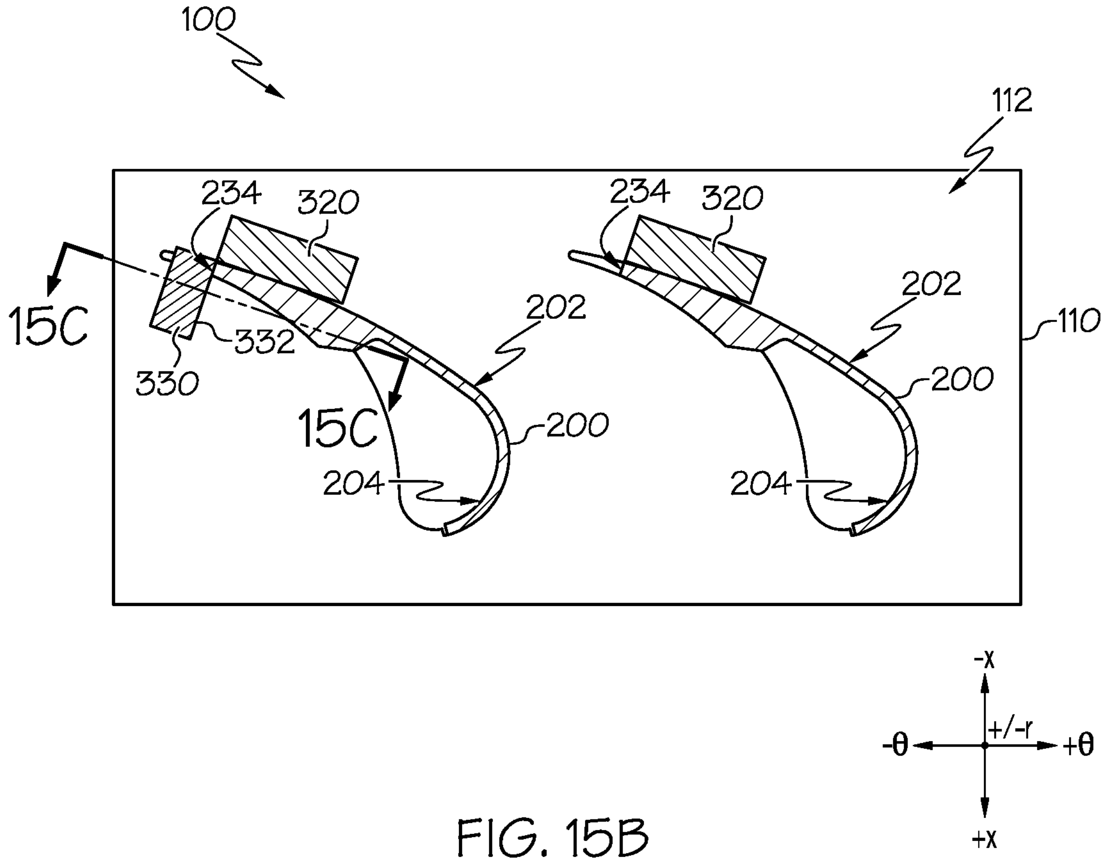
FIG. 15B schematically depicts a top cross-sectional view of the embodiment of the nozzle segment assembly of FIG. 15A, according to embodiments shown and described herein.
Figure 15C:
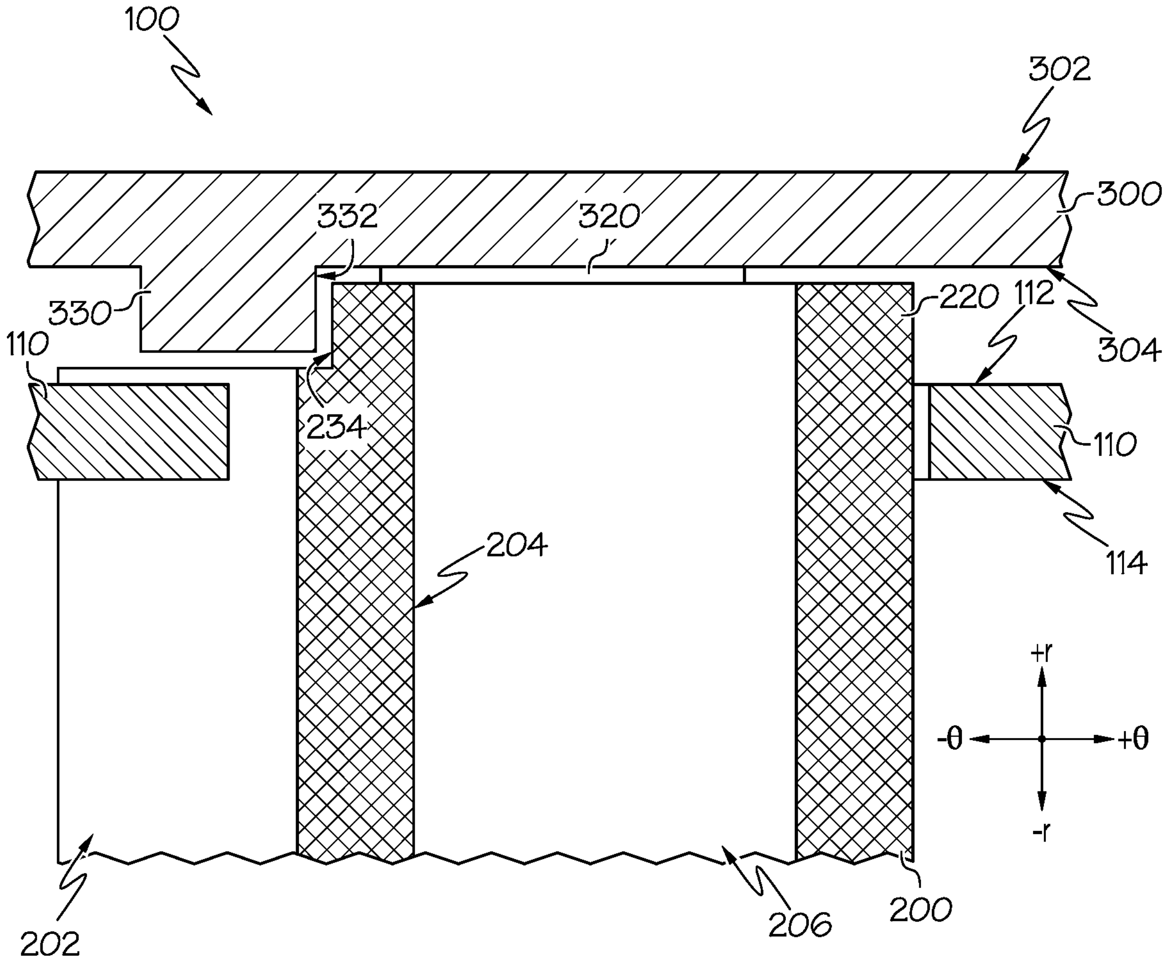
FIG. 15C schematically depicts a side cross-sectional view of the embodiment of the nozzle segment assembly of FIG. 15B taken along reference plane 15C-15C in FIG. 15B, according to embodiments shown and described herein.

Referring now to FIGS. 15A-15C, in embodiments, the tangential mount 330 of the outer hanger 300, the inner hanger 350, or both, may be positioned to engage with the aft edge 212 of the airfoil body 200 at the outer end 220 or the inner end 240 of the airfoil body, respectively. The outer hanger 300, the inner hanger 350, or both, may include at least one tangential mount 330 comprising a tangential engagement surface 332 that engages with at least a portion of the exterior surface 202 at the aft edge 212 of at least one of the airfoil bodies 200. Engagement of the tangential mount 330 with the exterior surface 202 at the aft edge 212 of the airfoil body 200 may at least partially constrain movement of the at least one airfoil body 200 and the airfoil assembly 102 in the tangential and/or angular direction relative to the outer hanger 300, the inner hanger 350, or both.

At least one of the airfoil bodies 200 may include a tangentially-facing surface 234 disposed proximate to the aft edge 212 of the airfoil body 200. The tangentially-facing surface 234 may face at least partially in the tangential direction (e.g., generally in the +/−Theta direction of the cylindrical coordinate axis of FIGS. 15A-15C). However, in embodiments, a line normal to the tangentially-facing surface 234 of the airfoil body 200 may have non-zero vector components in the radial direction (+/−r direction), the axial direction (+/−X direction), or both. The outer end 220, the inner end 240, or both, of the airfoil body 200 may each include a tangentially-facing surface 234 positioned to engage the tangential engagement surface 332 of the tangential mount 330 on the outer hanger 300, the inner hanger 350, or both, respectively. Positioning of the tangential mount 330 to engage with the exterior surface 202 of the airfoil body 200 at the forward edge 210 or the aft edge 212 may be determined by the shape of the exterior surface 202 of the airfoil body 200, which may influence the direction of the load pushing on the airfoil body 200.

Figure 16A:
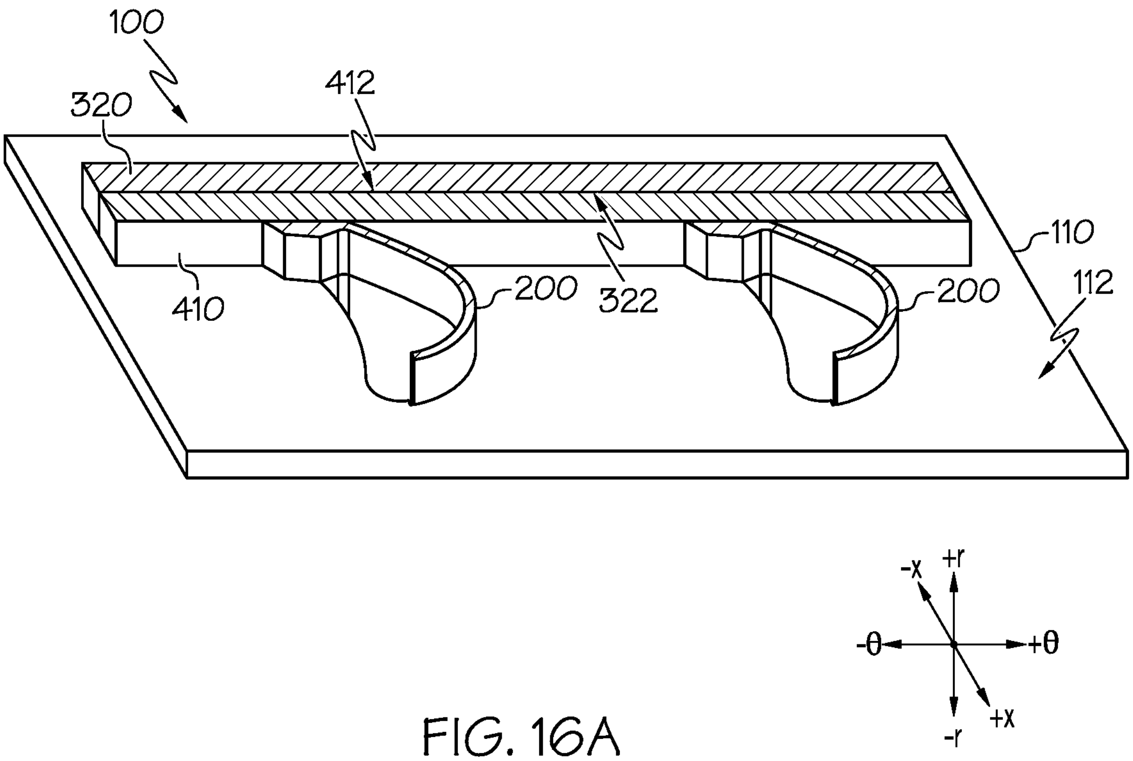
FIG. 16A schematically depicts a perspective cross-sectional view of still another embodiment of the nozzle segment assembly of FIG. 5, according to embodiments shown and described herein.
Figure 16B:
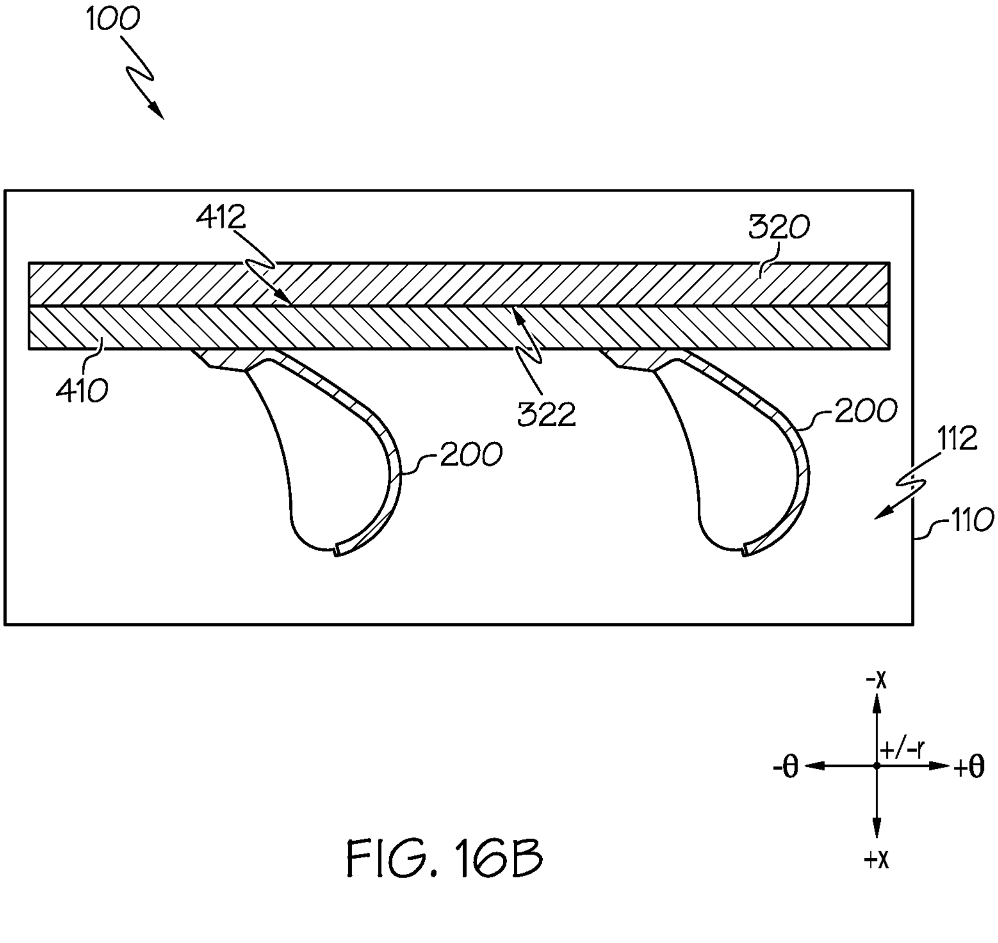
FIG. 16B schematically depicts a top cross-sectional view of the embodiment of the nozzle segment assembly of FIG. 16A, according to embodiments shown and described herein.

Referring now to FIGS. 16A and 16B, another configuration for mounting and/or constraining the airfoil assembly 102 in the nozzle segment assembly 100 is schematically depicted. As shown in FIGS. 16A and 16B, in embodiments, the nozzle segment assembly 100 may include a plurality of airfoil bodies 200. The nozzle segment assembly 100 may additionally include a mounting bar 410 that may be mechanically coupled and/or bonded to the outer ends 220 of all of the plurality of airfoil bodies 200 of the nozzle segment assembly 100 or to the inner ends 220 of all of the plurality of airfoil bodies 200 of the nozzle segment assembly 100. The nozzle segment assembly 100 may have two mounting bars 410: one mounting bar 410 coupled to the outer ends 220 of the airfoil bodies 200 and the second mounting bar 410 coupled to the inner ends 240 of the airfoil bodies 200. Alternatively or additionally, in embodiments, the mounting bar 410 may be bonded to the radially outward facing surface 112 of the outer band 110 or to the radially inward facing surface 164 of the inner band 160. In embodiment, each mounting bar 410 may conform to the slightly curved contour of the radially outward facing surface 112 of the outer band 110 or the radially inward facing surface 164 of the inner band 160. The mounting bar 410 may extend the entire angular length of the nozzle segment assembly 100 so that the mounting bar 410 may create a seal between band component (outer band 110 or inner band 160) and the adjacent hanger (outer hanger 300 or inner hanger 350, respectively).

Each mounting bar 410 may include a mounting bar axial surface 412 that may face at least partially in the axial direction. In embodiments, the mounting bar axial surface 412 may face directly in the axial direction (e.g., a line normal to the mounting bar axial surface 412 may have zero vector in at least the +/−Theta direction of the cylindrical coordinate axis in FIGS. 16A and 16B). The mounting bar axial surface 412 may engage with the axial engagement surface 322 of one or more axial mounts 320. Engagement of the mounting bar axial surface 412 with the axial engagement surface 322 of one or more axial mounts 320 may at least partially constrain movement of the airfoil bodies 200 and the airfoil assembly 102 at least in the axial direction (i.e., the +/−X direction of the coordinate axis in FIGS. 16A and 16B, which is parallel to the center axis A of the engine 10).

Figure 17:
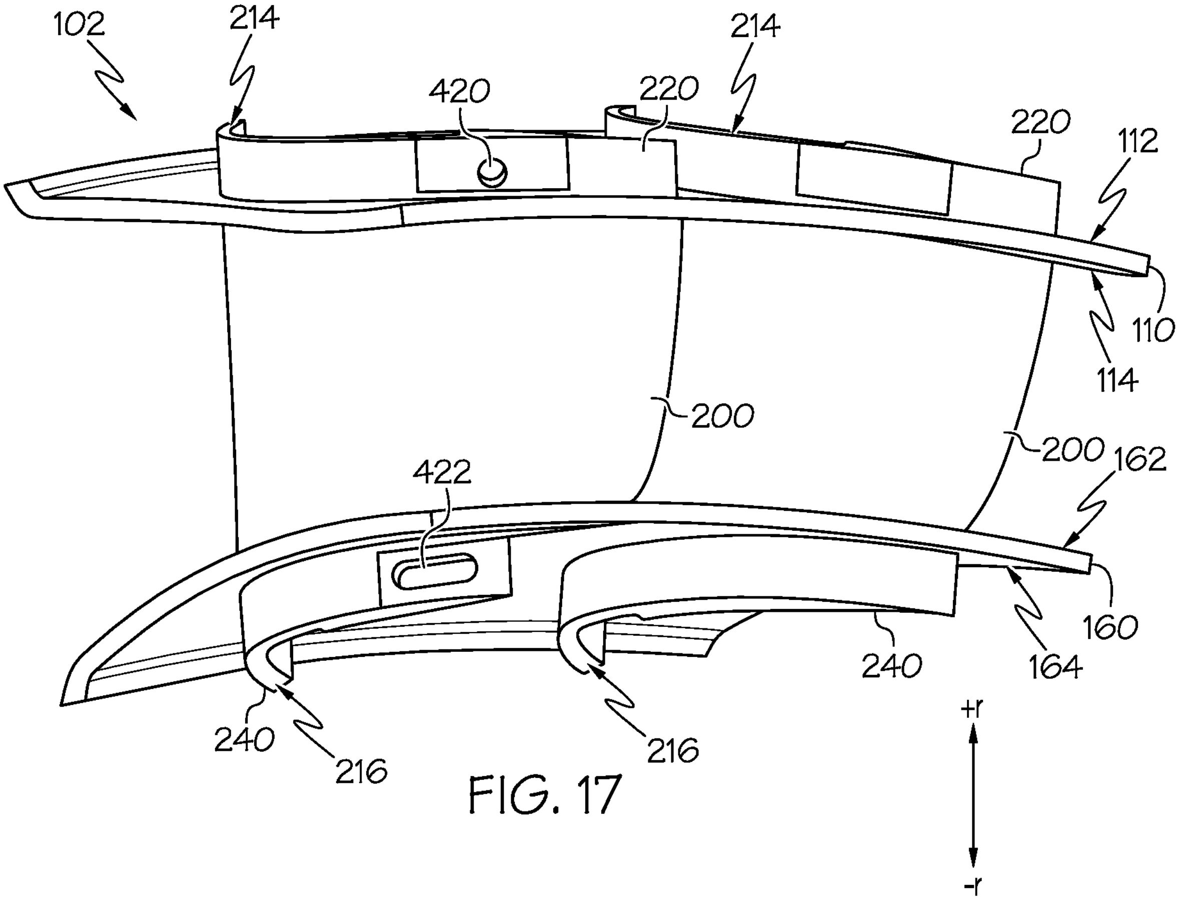
FIG. 17 schematically depicts a side perspective view illustrating radial mounting of an airfoil assembly of the nozzle segment assembly of FIG. 5, according to embodiments shown and described herein.

Referring now to FIG. 17, each of the plurality of airfoil bodies 200 may be additionally constrained in the radial direction (i.e., in the +/−r direction of the cylindrical coordinates in FIG. 17). In embodiments, the airfoil bodies 200 may be constrained in the radial direction through contact between an outer end surface 214 of the airfoil body 200 and the inwardly facing surface 304 of the outer hanger 300 and/or between an inner end surface 216 of the airfoil body 200 and the outwardly facing surface 352 of the inner hanger 350. The outer end surface 214 may be a radially outward facing surface at the outer end 220 of the airfoil body 200. The inner end surface 216 may be a radially inward facing surface at the inner end 240 of the airfoil body 200.

Referring again to FIG. 17, in embodiments, at least one of the airfoil bodies 200 may include a pinhole 420 in the exterior surface 202 of the airfoil body 200 proximate one of the outer end 220 or the inner end 240 and a slot 422 in the exterior surface 202 of the airfoil body 200 proximate the other one of the outer end 220 or the inner end 240. Each of the pinhole 420 and the slot 422 may be shaped to receive a locating pin (not shown) coupled to the outer hanger 300 or the inner hanger 350. Engagement of locating pins (not shown) with the pinhole 420 and the slot 422 may operate to properly position the airfoil assembly 102 relative to the outer hanger 300 and inner hanger 350 and may at least partially constrain the airfoil assembly 102 in at least the radial direction. The slot 422 may enable movement of one end of the airfoil body 200 in the axial and/or angular direction to prevent over-constraining the airfoil assembly 102. FIG. 17 shows the outer end 220 of the airfoil body 200 having the pinhole 420 and the inner end 240 having the slot 422. However, it is understood that the inner end 240 of the airfoil body 200 may have the pinhole 420 and the outer end 220 of the airfoil body 200 may have the slot 422. In some embodiments, each nozzle segment assembly 100 may include a plurality of airfoil bodies 200. In these embodiments, only one of the airfoil bodies 200 may include the pinhole 420 and the slot 422. Any of these mounting configurations can be used to mount airfoil assemblies 102 having 1, 2, 3, 4, or more than 4 airfoil bodies 200.

As previously discussed, each of the airfoil bodies 200 may be mechanically and rigidly coupled to the outer band 110 and the inner band 160. When the airfoil bodies 200 are mechanically and rigidly coupled to the outer band 110 and the inner band 160, mounting and constraining the airfoil bodies 200 through interaction of the outer ends 220 and inner ends 240 with the outer hanger 300 and the inner hanger 350, respectively, may be sufficient to constrain the outer band 110 and the inner band 160. In other words, engagement of the outer hanger 300 with the outer ends 220 of the airfoil bodies 200 and the inner hanger 350 with the inner ends 240 of the airfoil bodies 200 may enable forces to be transferred between the engine 10 and the airfoil bodies 200, in which case, the outer band 110 and the inner band 160 are positioned and carried along with the airfoil bodies 200 through being mechanically coupled to the airfoil bodies 200.

However, when the airfoil bodies 200 are mechanically decoupled from the outer band 110 and the inner band 160, additional structures may be employed to properly position and constrain the outer band 110 and the inner band 160 relative to the airfoil bodies 200, the outer hanger 300, and the inner hanger 350.

Figure 18A:
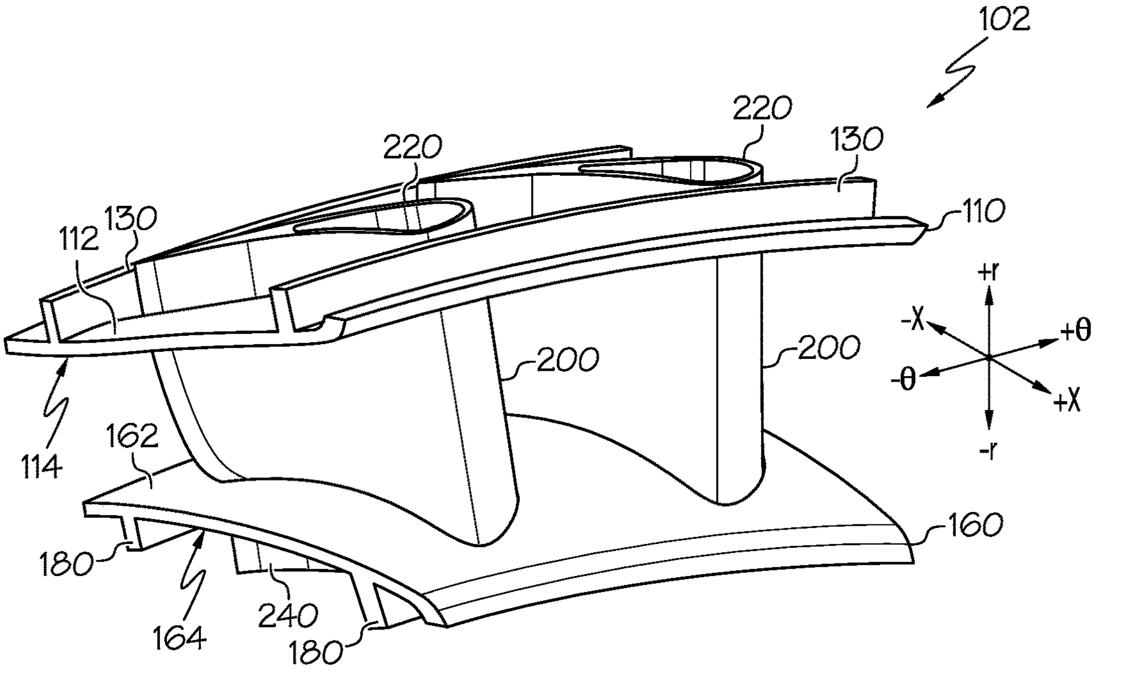
FIG. 18A schematically depicts another embodiment of an airfoil assembly of the nozzle segment assembly of FIG. 5 in which airfoil bodies are decoupled from an outer band and an inner band, according to embodiments shown and described herein.
Figure 18B:
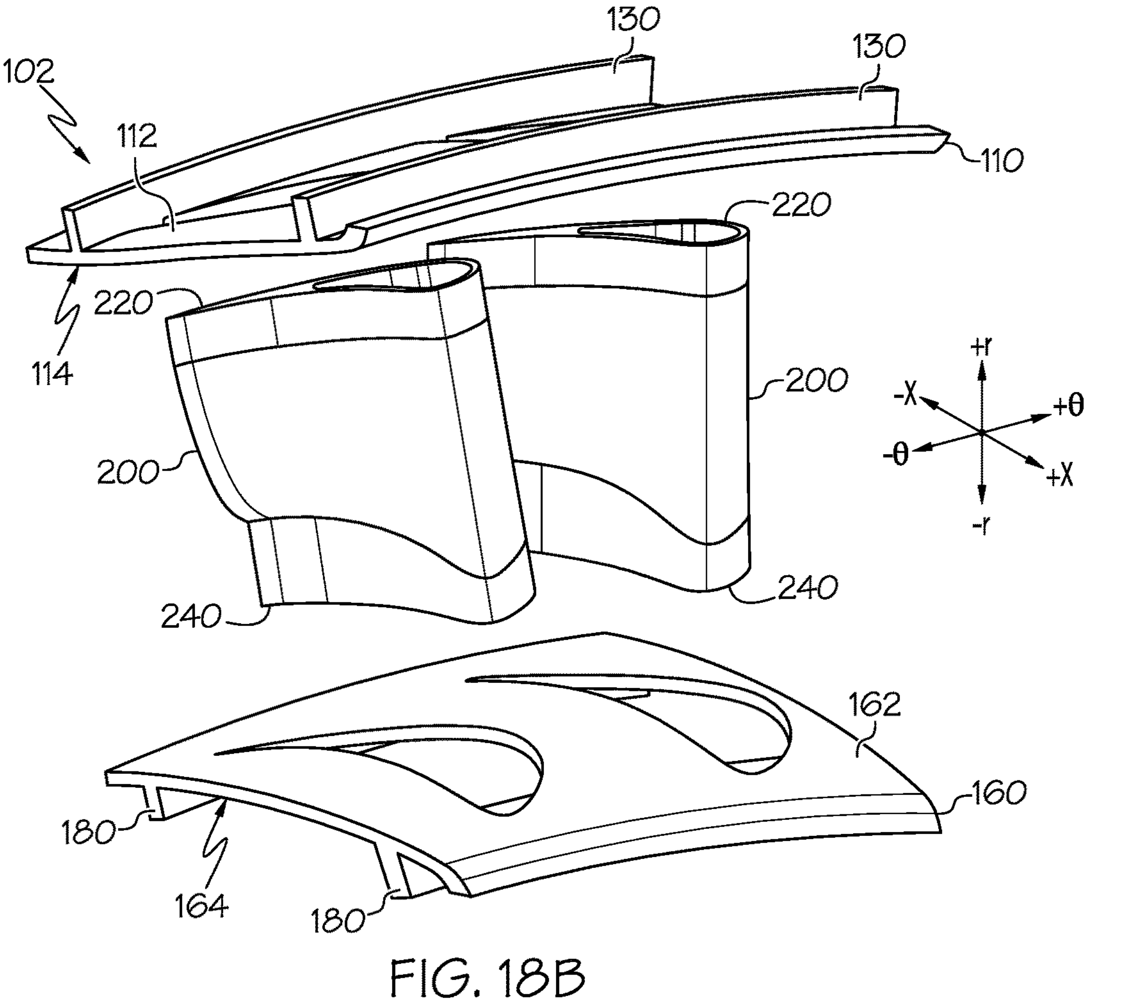
FIG. 18B schematically depicts an exploded perspective view of the airfoil assembly of FIG. 18A, according to embodiments shown and described herein.

Referring now to FIGS. 18A and 18B, the airfoil bodies 200 may be mechanically decoupled from the outer band 110, the inner band 160, or both. In other words, the outer band 110, the inner band 160, or both may be capable of moving in at least one of the radial, axial, or angular directions relative to the airfoil bodies 200, at least prior to mounting the airfoil assembly 102 to the outer hanger 300 and inner hanger 350 to form the nozzle segment assembly 100. The outer band 110 may include at least one outer band flange 130 protruding radially outward from the radially outward facing surface 112. At least one of the outer band flanges 130 may be positioned to engage at least one axial mount 320 coupled to the outer hanger 300. Engagement between the outer band flange 130 and the axial mount 320 coupled to the outer hanger 300 may at least partially constrain axial movement of the outer band 110 relative to the outer hanger 300. Additionally, the inner band 160 may include at least one inner band flange 180 protruding radially inward from the radially inward facing surface 164 of the inner band 160. At least one of the inner band flanges 180 may be positioned to engage at least one axial mount 320 coupled to the inner hanger 350. Engagement between the inner band flange 180 and an axial mount 320 coupled to the inner hanger 350 may at least partially constrain axial movement of the inner band 160 relative to the inner hanger 350.

Figure 19A:
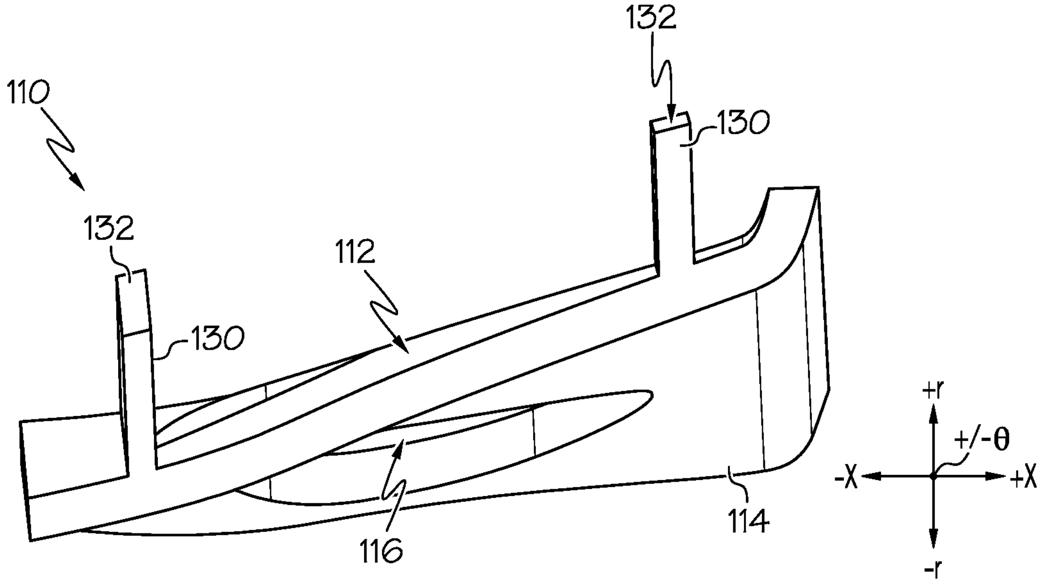
FIG. 19A schematically depicts a perspective view of an outer band of the airfoil assembly of FIG. 18A, according to embodiments shown and described herein.
Figure 19B:
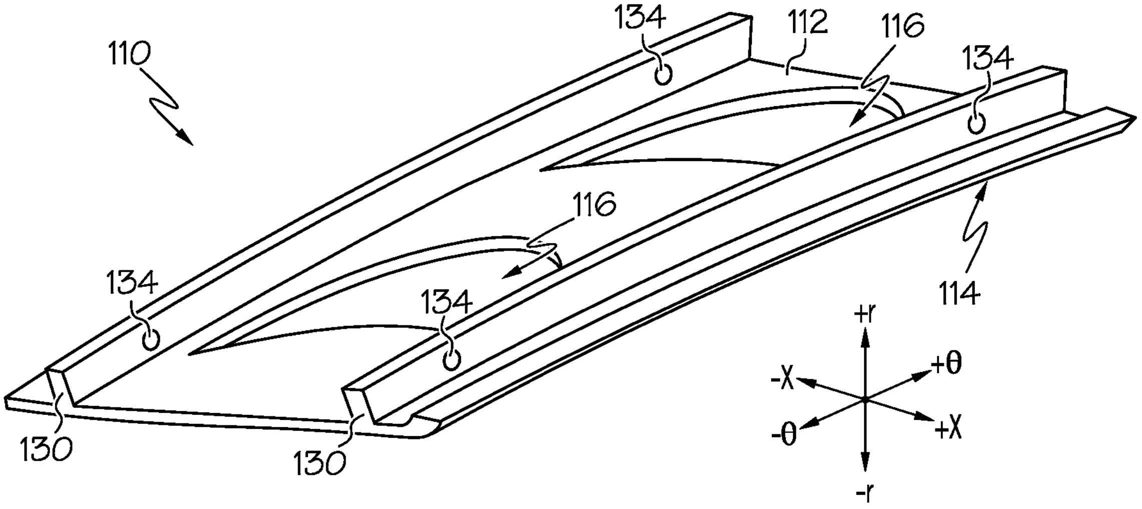
FIG. 19B schematically depicts another perspective view of the outer band of FIG. 19A, according to embodiments shown and described herein.

Referring now to FIGS. 19A and 19B, two perspective views of the outer band 110 are schematically depicted. Referring to FIG. 19A, in embodiments, the outer band flange 130 may have a radially facing surface 132 that may engage with the inwardly facing surface 304 of the outer hanger 300. Engagement of the radially facing surface 132 of the outer band flange 130 with the inwardly facing surface 304 of the outer hanger 300 may at least partially constrain movement of the outer band 110 in the radial outward direction relative to the outer hanger 300. Referring to FIG. 19B, alternatively or additionally, in embodiments, the outer band flange 130 may include one or a plurality of outer band flange pinholes 134 extending at least partially through the outer band flange 130. The outer band flange pinholes 134 may be shaped to receive a metal pin (not shown). The metal pin may be coupled to a mounting feature 310 (FIG. 6A), such as but not limited to an axial mount 320, and a portion of the metal pin may be received in the outer band flange pinhole 134 of the outer band flange 130. Engagement of the metal pin in the outer band flange pinhole 134 of the outer band flange 130 may at least partially constrain movement of the outer band 110 in the radial direction relative to the outer hanger 300. Engagement of the metal pin in the pinhole 134 of the outer band flange 130 may also at least partially constrain movement of the outer band 110 in the tangential/angular direction (e.g., in the +/−Theta direction of the coordinate axis in FIG. 19B) relative to the outer hanger 300.

Although not depicted in the Figures, it is understood that the inner band flange 180 of the inner band 160 may also include a radially facing surface that may engage the outwardly facing surface 352 of the inner hanger 350 to at least partially constrain movement of the inner band 160 in the radial inward direction relative to the inner hanger 350. The inner band flange 180 may also include one or a plurality of inner band flange pinholes (not shown) extending at least partially through one or more of the inner band flanges 180. The inner band flange pinholes may be shaped to receive a metal pin (not shown). The metal pin may be coupled to a mounting feature 310 (FIG. 6A), such as but not limited to an axial mount 320, and a portion of the metal pin may be received in the inner band flange pinhole of the inner band flange 180. Engagement of the metal pin in the inner band flange pinhole of the inner band flange 180 may at least partially constrain movement of the inner band 160 in the radial direction relative to the inner hanger 350. Engagement of the metal pin in the inner band flange pinhole of the inner band flange 180 may also at least partially constrain movement of the inner band 160 in the tangential/angular direction relative to the inner hanger 350.

The methods and structures for mounting the outer band 110, the inner band 160, or both in the nozzle segment assembly 100 when the outer band 110, the inner band 160, or both are decoupled from the airfoil bodies 200 may be used in conjunction with any one or more of the configurations for mounting the airfoil bodies 200 to the outer hanger 300, the inner hanger 350, or both previously described herein.

A first aspect of the present disclosure may include a nozzle segment assembly for a gas turbine engine. The nozzle segment assembly may comprise an airfoil assembly having an outer band, an inner band, and at least one airfoil body extending between the outer band and the inner band. The at least one airfoil body may comprise an outer end extending through the outer band and having an outer end reinforced wall portion protruding from an exterior surface of the at least one airfoil body into engagement with the outer band. The at least one airfoil body may further comprise an inner end extending through the inner band and having an inner end reinforced wall portion protruding from the exterior surface of the at least one airfoil body into engagement with the inner band. A thickness of the outer end reinforced wall portion and a thickness of the inner end reinforced wall portion may be each greater than a thickness of a central wall portion of the at least one airfoil body, and the outer band, the inner band, and the at least one airfoil body may comprise a ceramic matrix composite (CMC) material.

A second aspect of the present disclosure may include the first aspect, wherein the at least one airfoil body may comprise a plurality of airfoil bodies.

A third aspect of the present disclosure may include either one of the first or second aspects, wherein the outer end reinforced wall portion, the inner end reinforced wall portion, or both, may extend all the way around the exterior surface of the at least one airfoil body at an interface between the at least one airfoil body and the outer band, the inner band, or both, respectively.

A fourth aspect of the present disclosure may include any one of the first through third aspects, wherein the outer end reinforced wall portion of the at least one airfoil body may comprise an outer end flange extending out from the exterior surface at the outer end reinforced wall portion, the outer end flange comprising a radially outer surface abutting against a portion of a radially inward facing surface of the outer band, or the inner end reinforced wall portion of the at least one airfoil body may comprise an inner end flange extending out from the exterior surface at the inner end reinforced wall portion, the inner end flange comprising a radially inner surface abutting against a portion of a radially outward facing surface of the inner band.

A fifth aspect of the present disclosure may include the fourth aspect, wherein the radially inward facing surface of the outer band may comprise a recess providing a radial engagement surface that abuts against the radially outer surface of the outer end flange of the at least one airfoil body, or the radially outward facing surface of the inner band comprises a recess providing a radial engagement surface that abuts against the radially inner surface of the inner end flange of the at least one airfoil body.

A sixth aspect of the present disclosure may include any one of the fourth through fifth aspects, wherein abutting of the radially outer surface of the outer end flange against the radially inward facing surface of the outer band may restrict radial movement of the outer band in a direction radially inward relative to the position of the at least one airfoil body, or abutting of the radially inner surface of the inner end flange against the radially outward facing surface of the inner band may restrict radial movement of the inner band in a direction radially outward relative to the position of the at least one airfoil body.

A seventh aspect of the present disclosure may include any one of the first through sixth aspects, wherein the outer band may be mechanically coupled directly to the exterior surface of the at least one airfoil body at the outer end reinforced wall portion, and the inner band may be mechanically coupled directly to the exterior surface of the at least one airfoil body at the inner end reinforced wall portion.

An eighth aspect of the present disclosure may include any one of the first through sixth aspects, further comprising an inner hanger, an outer hanger, or both, wherein the inner hanger may be engageable with at least the inner end of the at least one airfoil body and the outer hanger may be engageable with at least the outer end of the at least one airfoil body.

A ninth aspect of the present disclosure may include any one of the first through eighth aspects, wherein at least a portion of the outer end of the at least one airfoil body may protrude radially outward from the radially outward facing surface of the outer band and/or at least a portion of the inner end of the at least one airfoil body may protrude radially inward from the radially inward facing surface of the inner band.

A tenth aspect of the present disclosure may include either of the eighth or ninth aspects, wherein the inner hanger may be engageable with the inner end of the at least one airfoil body and a radially inward facing surface of the inner band and/or the outer hanger may be engageable with the outer end of the at least one airfoil body and a radially outward facing surface of the outer band.

An eleventh aspect of the present disclosure may include any one of the eighth through tenth aspects, in which the inner hanger, the outer hanger, or both, may comprise at least one axial mount having an axial engagement surface that engages with at least a portion of the exterior surface or at least a portion of an interior surface of the at least one airfoil body, the engagement restricting axial movement of the at least one airfoil body relative to the inner hanger, the outer hanger, or both.

A twelfth aspect of the present disclosure may include the eleventh aspect wherein the outer hanger may comprise the at least one axial mount extending radially inward from a radially inward facing surface of the outer hanger.

A thirteenth aspect of the present disclosure may include either of the eleventh or twelfth aspects, wherein the inner hanger may comprise the at least one axial mount extending radially outward from a radially outward facing surface of the inner hanger.

A fourteenth aspect of the present disclosure may include any one of the eleventh through thirteenth aspects, wherein the axial engagement surface of the at least one axial mount may face at least partially in the axial direction, or a line normal to a plane of the axial engagement surface of the axial mount is not perpendicular to the axial direction.

A fifteenth aspect of the present disclosure may include any one of the eleventh through fourteenth aspects, comprising a plurality of airfoil bodies, wherein the inner hanger, the outer hanger, or both may comprise a plurality of axial mounts and the axial engagement surface of each of the plurality of axial mounts engages with the exterior surface or the interior surface of one of the plurality of airfoil bodies.

A sixteenth aspect of the present disclosure may include any one of the eleventh through fifteenth aspects, wherein the at least one axial mount may be oriented so that the axial engagement surface of the at least one axial mount may be aligned with a contour of a portion of the exterior surface or a portion of the interior surface of the at least one airfoil body at the outer end or the inner end.

A seventeenth aspect of the present disclosure may include any one of the eleventh through sixteenth aspects, wherein a line normal to the axial engagement surface of the at least one axial mount may be not parallel to the axial direction.

An eighteenth aspect of the present disclosure may include any one of the eleventh through sixteenth aspects, wherein a line normal to the axial engagement surface of the at least one axial mount may be parallel to a plane formed by the radial direction and the axial direction.

A nineteenth aspect of the present disclosure may include the eighteenth aspect, wherein the at least one airfoil body may comprise an axially-facing exterior surface at the outer end, the inner end, or both, of the at least one airfoil body, the axially-facing exterior surface oriented to engage with the axial engagement surface of the at least one axial mount.

A twentieth aspect of the present disclosure may include the nineteenth aspect, wherein the axially-facing exterior surface may comprise a surface of a protrusion extending from the exterior surface of the at least one airfoil body at the outer end, the inner end, or both.

A twenty-first aspect of the present disclosure may include the eighteenth aspect, comprising a plurality of airfoil bodies and at least one mounting bar mechanically coupled to the outer ends of all of the plurality of airfoil bodies or to the inner ends of all of the plurality of airfoil bodies. The mounting bar may comprise a mounting bar axial surface positioned to engage with the axial engagement surface of the at least one axial mount, engagement of the mounting bar axial surface with the axial engagement surface of the at least one axial mount at least partially constrains axial movement of the plurality of airfoil bodies relative to the outer hanger or the inner hanger.

A twenty-second aspect of the present disclosure may include any one of the eleventh through seventeenth aspects, wherein the at least one of the axial mounts may extend into a cavity defined by the interior surface of the at least one airfoil body such that the axial engagement surface of the at least one axial mount may engage with at least a portion of the interior surface of the at least one airfoil body.

A twenty-third aspect of the present disclosure may include any one of the eleventh through twenty-second aspects, further comprising at least one pin extending through at least a portion of the outer end or the inner end of the at least one airfoil body and the at least one axial mount. Engagement of the at least one pin with the portion of the outer end or the inner end of the at least one airfoil body and the at least one axial mount may at least partially constrain movement of the at least one airfoil body in a tangential direction relative to the outer hanger or the inner hanger, respectively.

A twenty-fourth aspect of the present disclosure may include any one of the eighth through twenty-third aspects, wherein the outer hanger, the inner hanger, or both, may further comprise at least one tangential mount comprising a tangential engagement surface that engages with at least a portion of the exterior surface or at least a portion of the interior surface of the at least one airfoil body, the engagement at least partially constraining tangential movement of the at least one airfoil body relative to the outer hanger, the inner hanger, or both, respectively.

A twenty-fifth aspect of the present disclosure may include the twenty-fourth aspect, wherein the outer hanger may comprise at least one tangential mount extending radially inward from a radially inward facing surface of the outer hanger.

A twenty-sixth aspect of the present disclosure may include either one of the twenty-fourth or twenty-fifth aspects, wherein the inner hanger may comprise at least one tangential mount extending radially outward from a radially outward facing surface of the inner hanger.

A twenty-seventh aspect of the present disclosure may include any one of the twenty-fourth through twenty-sixth aspects, wherein the at least one tangential mount may be positioned to engage the exterior surface of the at least one airfoil body proximate to a forward edge of the at least one airfoil body.

A twenty-eighth aspect of the present disclosure may include any one of the twenty fourth through twenty-sixth aspects, wherein the at least one tangential mount may be positioned to engage the exterior surface of the at least one airfoil body proximate to an aft edge of the at least one airfoil body.

A twenty-ninth aspect of the present disclosure may include the twenty-eighth aspect, wherein the at least one airfoil body comprises a tangentially-facing surface proximate to the aft edge of the at least one airfoil body, the tangential engagement surface engaging with the tangentially-facing surface to at least partially constrain tangential movement of the at least one airfoil body relative to the outer hanger, the inner hanger, or both.

A thirtieth aspect of the present disclosure may include any one of the eleventh through twenty-third aspects, wherein the outer band may comprise a ridge extending radially outward from the radially outward facing surface, the ridge comprising a tangentially-facing surface. The outer hanger may comprise at least one tangential mount extending radially inward from the radially inward facing surface of the outer hanger, wherein the tangential mount may comprise a tangential engagement surface. The tangential engagement surface of the tangential mount may engage with the tangentially-facing surface of the ridge to restrict tangential movement of the outer band relative to the outer hanger.

A thirty-first aspect of the present disclosure may include any one of the first through twenty-third or thirtieth aspects, wherein the inner band may comprise a ridge extending radially inward from the radially inward facing surface, the ridge comprising a tangentially-facing surface. The inner hanger may comprise at least one tangential mount extending radially outward from the radially outward facing surface of the inner hanger, wherein the tangential mount may comprise a tangential engagement surface. The tangential engagement surface of the tangential mount may engage with the tangentially-facing surface of the ridge to restrict tangential movement of the inner band relative to the inner hanger.

A thirty-second aspect of the present disclosure may include any one of the eighth through thirty-first aspects, wherein one of the inner end or outer end of the at least one airfoil body may comprise a locating pinhole, the other one of the inner end or outer end may comprise a locating slot, and the locating pinhole and the locating slot may be operable to position the at least one airfoil body within the nozzle segment assembly, constrain the at least one airfoil body in a radial direction, or both.

A thirty-third aspect of the present disclosure may include any one of the eighth through thirty-second aspects, wherein an outer end surface and an inner end surface of the at least one airfoil body may engage with the outer hanger and the inner hanger, respectively, to constrain the at least one airfoil body in a radial direction.

A thirty-fourth aspect of the present disclosure may include any one of the first through sixth aspects or eighth through thirty-third aspects, wherein the exterior surface of the at least one airfoil body may be mechanically coupled directly to the outer band, the inner band, or both, at the outer end reinforced wall portion, the inner end reinforced wall portion, or both, respectively.

A thirty-fifth aspect of the present disclosure may include any one of the first through sixth aspects or eighth through thirty-third aspects, wherein the at least one airfoil body may be mechanically decoupled from the outer band, the inner band, or both, or wherein the outer band, the inner band, or both are capable of moving in at least one of a radial, axial, or angular direction relative to the at least one airfoil body.

A thirty-sixth aspect of the present disclosure may include the thirty-fourth aspect, wherein the outer band may comprise at least one outer band flange protruding radially outward from the radially outward facing surface, the at least one outer band flange positioned to engage at least one of an axial mount, a tangential mount, or both, coupled to the outer hanger, and/or the inner band may comprise at least one inner band flange protruding radially inward from the radially inward facing surface, the at least one inner band flange positioned to engage at least one of an axial mount, a tangential mount, or both, coupled to the inner hanger.

A thirty-seventh aspect of the present disclosure may include any one of the first through twenty-first aspects or twenty-third through thirty-sixth aspects, wherein the at least one airfoil body may be a hollow airfoil body.

A thirty-eighth aspect of the present disclosure may include any one of the first through thirty-sixth aspects, wherein the at least one airfoil body may be a solid airfoil body.

A thirty-ninth aspect of the present disclosure may include a nozzle segment assembly for a gas turbine engine. The nozzle segment assembly may comprise an inner hanger, an outer hanger, and an airfoil assembly. The airfoil assembly may comprise an outer band comprising a radially-outward facing surface, an inner band comprising a radially-inward facing surface, and at least one airfoil body extending between the outer band and the inner band. The at least one airfoil body may comprise an outer end extending through the outer band and protruding outward from the radially outward facing surface of the outer band and an inner end extending through the inner band and protruding radially inward from the radially inward facing surface of the inner band. The outer hanger may disposed radially outward from the outer band and the inner hanger may be disposed radially inward from the inner band. The outer end of the at least one airfoil body may engage with the outer hanger, and the inner end of the at least one airfoil body may engage with the inner hanger to position and constrain the airfoil assembly. The outer band, the inner band, and the at least one airfoil body may comprise a ceramic matrix composite (CMC) material.

A fortieth aspect of the present disclosure may include the thirty-ninth aspect, in which the inner hanger, the outer hanger, or both may comprise at least one axial mount having an axial engagement surface that engages with at least a portion of the exterior surface or at least a portion of an interior surface of the at least one airfoil body. The engagement may restrict axial movement of the at least one airfoil body relative to the inner hanger, the outer hanger, or both.

A forty-first aspect of the present disclosure may include either one of the thirty-ninth or fortieth aspects, wherein the outer hanger may comprise the at least one axial mount extending radially inward from a radially inward facing surface of the outer hanger.

A forty-second aspect of the present disclosure may include either one of the thirty-ninth or fortieth aspects, wherein the inner hanger may comprise the at least one axial mount extending radially outward from a radially outward facing surface of the inner hanger.

A forty-third aspect of the present disclosure may include any one of the fortieth through forty-second aspects, wherein the axial engagement surface of the at least one axial mount may face at least partially in the axial direction, or a line normal to a plane of the axial engagement surface of the axial mount is not perpendicular to the axial direction.

A forty-fourth aspect of the present disclosure may include any one of the thirty-ninth through forty-third aspects, comprising a plurality of airfoil bodies, wherein the inner hanger, the outer hanger, or both may comprise a plurality of axial mounts and the axial engagement surface of each of the plurality of axial mounts may engage with the exterior surface or the interior surface of one of the plurality of airfoil bodies.

A forty-fifth aspect of the present disclosure may include any one of the fortieth through forty-fourth aspects, wherein the at least one axial mount may be oriented so that the axial engagement surface of the at least one axial mount may be aligned with a contour of a portion of the exterior surface of the at least one airfoil body at the outer end or inner end.

A forty-sixth aspect of the present disclosure may include any one of the fortieth through forty-fifth aspects, wherein a line normal to the axial engagement surface of the at least one axial mount may be not parallel to the axial direction.

A forty-seventh aspect of the present disclosure may include any one of the fortieth through forty-fifth aspects, wherein a line normal to the axial engagement surface of the at least one axial mount is parallel to a plane formed by the radial direction and the axial direction.

A forty-eighth aspect of the present disclosure may include the forty-seventh aspect, wherein the at least one airfoil body may comprise an axially-facing exterior surface at the outer end, the inner end, or both, of the at least one airfoil body, the axially-facing exterior surface oriented to engage with the axial engagement surface of the at least one axial mount.

A forty-ninth aspect of the present disclosure may include the forty-eighth aspect, wherein the axially-facing exterior surface may comprise a surface of a protrusion extending from the exterior surface of the at least one airfoil body at the outer end, the inner end, or both.

A fiftieth aspect of the present disclosure may include any one of the fortieth through forty-seventh aspects, comprising a plurality of airfoil bodies and at least one mounting bar mechanically coupled to the outer ends of all of the plurality of airfoil bodies or to the inner ends of all of the plurality of airfoil bodies. The mounting bar may comprise a mounting bar axial surface positioned to engage with the axial engagement surface of the at least one axial mount. Engagement of the mounting bar axial surface with the axial engagement surface of the at least one axial mount may at least partially constrain axial movement of the plurality of airfoil bodies relative to the outer hanger or the inner hanger.

A fifty-first aspect of the present disclosure may include any one of the fortieth through forty-seventh aspects, wherein the at least one of the axial mounts may extend into a cavity defined by the interior surface of one of the at least one airfoil body such that the axial engagement surface of the at least one axial mount may engage with at least a portion of the interior surface of the at least one airfoil body.

A fifty-second aspect of the present disclosure may include any one of the fortieth through fifty-first aspects, further comprising at least one pin extending through at least a portion of the outer end or the inner end of the at least one airfoil body and the at least one axial mount, wherein engagement of the at least one pin with the portion of the outer end or the inner end of the at least one airfoil body and the at least one axial mount may restrict movement of the at least one airfoil body in an angular direction relative to the outer hanger or inner hanger, respectively.

A fifty-third aspect of the present disclosure may include any one of the thirty-ninth through fifty-second aspects, wherein the outer hanger, the inner hanger, or both, may further comprise at least one tangential mount comprising a tangential engagement surface that may engage with at least a portion of the exterior surface or at least a portion of the interior surface of the at least one airfoil body, the engagement restricting angular movement of the at least one airfoil body relative to the outer hanger, the inner hanger, or both.

A fifty-fourth aspect of the present disclosure may include the thirty-ninth through fifty-second aspects, wherein the outer hanger may comprise at least one tangential mount extending radially inward from a radially inward facing surface of the outer hanger.

A fifty-fifth aspect of the present disclosure may include the thirty-ninth through fifty-second aspects, wherein the inner hanger may comprise at least one tangential mount extending radially outward from a radially outward facing surface of the inner hanger.

A fifty-sixth aspect of the present disclosure may include any one of the fifty-third through fifty-fifth aspects, wherein the at least one tangential mount may be positioned to engage the exterior surface of the at least one airfoil body proximate to a forward edge of the at least one airfoil body.

A fifty-seventh aspect of the present disclosure may include any one of the fifty-third through fifty-fifth aspects, wherein the at least one tangential mount may be positioned to engage the exterior surface of the at least one airfoil body proximate to an aft edge of the at least one airfoil body.

A fifty-eighth aspect of the present disclosure may include the fifty-seventh, wherein the at least one airfoil body may comprise a tangentially-facing surface proximate to the aft edge of the at least one airfoil body, the tangential engagement surface engaging with the tangentially-facing surface to restrict tangential movement of the at least one airfoil body relative to the outer hanger or the inner hanger.

A fifty-ninth aspect of the present disclosure may include any one of the fortieth through fifty-fifth aspects, wherein the outer band may comprise a ridge extending radially outward from the radially outward facing surface, the ridge comprising a tangentially-facing surface. The outer hanger may further comprise at least one tangential mount extending radially inward from the radially inward facing surface of the outer hanger, wherein the tangential mount may comprise a tangential engagement surface. The tangential engagement surface of the tangential mount may engage with the tangentially-facing surface of the ridge to restrict tangential movement of the outer band relative to the outer hanger.

A sixtieth aspect of the present disclosure may include any one of the fortieth through fifty-fifth aspects or the fifth-ninth aspect, wherein the inner band may comprise a ridge extending radially inward from the radially inward facing surface, the ridge comprising a tangentially-facing surface. The inner hanger may comprise at least one tangential mount extending radially outward from the radially outward facing surface of the inner hanger, wherein the tangential mount may comprise a tangential engagement surface. The tangential engagement surface of the tangential mount may engage with the tangentially-facing surface of the ridge to restrict tangential movement of the inner band relative to the inner hanger.

A sixty-first aspect of the present disclosure may include any one of the thirty-ninth through sixtieth aspects, wherein one of the inner end or outer end of the at least one airfoil body may comprise a locating pinhole, the other one of the inner end or outer end may comprise a locating slot, and the locating pinhole and locating slot may be operable to position the at least one airfoil body within the nozzle segment assembly, constrain the at least one airfoil body in a radial direction, or both.

A sixty-second aspect of the present disclosure may include any one of the thirty-ninth through sixty-first aspects, wherein an outer end surface and an inner end surface of the at least one airfoil body may engage with the outer hanger and the inner hanger, respectively, to constrain the at least one airfoil body in a radial direction.

A sixty-third aspect of the present disclosure may include any one of the thirty-ninth through sixty-second aspects, wherein the exterior surface of the at least one airfoil body may be mechanically coupled directly to the outer band, the inner band, or both, at the outer end reinforced wall portion, the inner end reinforced wall portion, or both, respectively.

A sixty-fourth aspect of the present disclosure may include any one of the thirty-ninth through sixty-second aspects, wherein the at least one airfoil body may be mechanically decoupled from the outer band, the inner band, or both, or wherein the at least one airfoil body may be capable of moving in at least one of a radial, axial, or angular direction relative to the outer band, the inner band, or both.

A sixty-fifth aspect of the present disclosure may include the sixty-fourth aspect, wherein the outer band may comprise at least one outer band flange protruding radially outward from the radially outward facing surface, the at least one outer band flange positioned to engage at least one of an axial mount, a tangential mount, or both, coupled to the outer hanger, and/or the inner band may comprise at least one inner band flange protruding radially inward from the radially inward facing surface, the at least one inner band flange positioned to engage at least one of an axial mount, a tangential mount, or both, coupled to the inner hanger.

A sixty-sixth aspect of the present disclosure may include any one of the thirty-ninth through sixty-fifth aspects, wherein the at least one airfoil body may be a hollow airfoil body.

A sixty-seventh aspect of the present disclosure may include any one of the thirty-ninth through fiftieth aspects or fifty-second through sixty-fifth aspects, wherein the at least one airfoil body may be a solid airfoil body.

While various embodiments of the dilution device and cleaner systems comprising the dilution device have been described herein, it should be understood that it is contemplated that each of these embodiments and techniques may be used separately or in conjunction with one or more embodiments and techniques. It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A nozzle segment assembly for a gas turbine engine, the nozzle segment assembly comprising an inner hanger, an outer hanger, and an airfoil assembly, the airfoil assembly comprising:

- an outer band comprising a radially-outward facing surface;
- an inner band comprising a radially-inward facing surface;
- at least one airfoil body extending between the outer band and the inner band, the at least one airfoil body comprising:
  - an outer end extending through the outer band and protruding outward from the radially-outward facing surface of the outer band; and
  - an inner end extending through the inner band and protruding radially inward from the radially-inward facing surface of the inner band;
- wherein:
  - the outer hanger is disposed radially outward from the outer band and the outer end of the at least one airfoil body;
  - an inwardly facing surface of the outer hanger faces radially inward towards the outer end of the at least one airfoil body;
  - the inner hanger is disposed radially inward from the inner band and the inner end of the at least one airfoil body;
  - an outwardly facing surface of the inner hanger faces radially outward towards the inner end of the at least one airfoil body;
  - the outer end of the at least one airfoil body engages with the outer hanger and the inner end of the at least one airfoil body engages with the inner hanger to position and constrain the airfoil assembly;
  - the inner hanger, the outer hanger, or both comprise at least one axial mount comprising an axial engagement surface that is planar, wherein each axial mount and the axial engagement surface thereof extends either radially inward from the inwardly facing surface of the outer hanger or radially outward from an outwardly facing surface of the inner hanger;
  - the axial engagement surface is in contact with only a portion of an exterior surface or an interior surface of the at least one airfoil body; and
  - the outer band, the inner band, and the at least one airfoil body comprise a ceramic matrix composite (CMC) material.

2. The nozzle segment assembly of claim 1, wherein the engagement of the axial engagement surface with the portion of the exterior surface or the interior surface of the at least one airfoil body restricts axial movement of the at least one airfoil body relative to the inner hanger, the outer hanger, or both.

3. The nozzle segment assembly of claim 1, wherein the axial engagement surface of the at least one axial mount faces at least partially in an axial direction, or a line normal to a plane of the axial engagement surface of the at least one axial mount is not perpendicular to the axial direction.

4. The nozzle segment assembly of claim 1, wherein the at least one axial mount is oriented so that the axial engagement surface of the at least one axial mount is aligned with a contour of a portion of the exterior surface of the at least one airfoil body at the outer end or the inner end.

5. The nozzle segment assembly of claim 1, wherein:

- a line normal to the axial engagement surface of the at least one axial mount is parallel to a plane formed by a radial direction and an axial direction; and
- the at least one airfoil body comprises an axially-facing exterior surface at the outer end, the inner end, or both, of the at least one airfoil body, the axially-facing exterior surface oriented to engage with the axial engagement surface of the at least one axial mount.

6. The nozzle segment assembly of claim 5, wherein the axially-facing exterior surface comprises a surface of a protrusion extending from the exterior surface of the at least one airfoil body at the outer end, the inner end, or both.

7. The nozzle segment assembly of claim 1, comprising:

- a plurality of airfoil bodies; and
- at least one mounting bar mechanically coupled to the outer ends of all of the plurality of airfoil bodies or to the inner ends of all of the plurality of airfoil bodies, wherein the at least one mounting bar comprises a mounting bar axial surface positioned to engage with the axial engagement surface of the at least one axial mount to at least partially constrain axial movement of the plurality of airfoil bodies relative to the outer hanger or the inner hanger.

8. The nozzle segment assembly of claim 1, wherein the at least one of the axial mounts extends into a cavity defined by the interior surface of one of the at least one airfoil body such that the axial engagement surface of the at least one axial mount engages with at least a portion of the interior surface of the at least one airfoil body.

9. The nozzle segment assembly of claim 1, further comprising at least one pin extending through at least a portion of the outer end or the inner end of the at least one airfoil body and the at least one axial mount to restrict movement of the at least one airfoil body in an angular direction relative to the outer hanger or the inner hanger, respectively.

10. The nozzle segment assembly of claim 1, wherein the outer hanger, the inner hanger, or both, further comprises at least one tangential mount comprising a tangential engagement surface that engages with another portion of the exterior surface or another portion of the interior surface of the at least one airfoil body, the tangential engagement restricting angular movement of the at least one airfoil body relative to the outer hanger, the inner hanger, or both.

11. The nozzle segment assembly of claim 10, wherein the at least one tangential mount is positioned to engage the exterior surface of the at least one airfoil body proximate to a forward edge of the at least one airfoil body or proximate to an aft edge of the at least one airfoil body.

12. The nozzle segment assembly of claim 1, wherein:

- the outer band comprises a ridge, wherein:

the ridge extends radially outward from the radially-outward facing surface, the ridge comprising a tangentially-facing surface;

the outer hanger comprises at least one tangential mount extending radially inward from the inwardly facing surface of the outer hanger, wherein the tangential mount comprises a tangential engagement surface; and the tangential engagement surface of the tangential mount engages with the tangentially-facing surface of the ridge to restrict tangential movement of the outer band relative to the outer hanger; or the inner band comprises a ridge, wherein:

the ridge extends radially inward from the radially-inward facing surface, the ridge comprising a tangentially-facing surface;

the inner hanger comprises at least one tangential mount extending radially outward from the outwardly facing surface of the inner hanger, wherein the tangential mount comprises a tangential engagement surface; and the tangential engagement surface of the tangential mount engages with the tangentially-facing surface of the ridge to restrict tangential movement of the inner band relative to the inner hanger.

13. The nozzle segment assembly of claim 1, wherein:

one of the inner end or the outer end of the at least one airfoil body comprises a locating pinhole;

the other one of the inner end or the outer end comprises a locating slot; and the locating pinhole and the locating slot are operable to position the at least one airfoil body within the nozzle segment assembly, constrain the at least one airfoil body in a radial direction, or both.

14. The nozzle segment assembly of claim 1, wherein an outer end surface and an inner end surface of the at least one airfoil body engage with the outer hanger and the inner hanger, respectively, to constrain the at least one airfoil body in a radial direction.

15. The nozzle segment assembly of claim 1, wherein:

the at least one airfoil body is mechanically decoupled from the outer band, the inner band, or both, or the at least one airfoil body is capable of moving in at least one of a radial, axial, or angular direction relative to the outer band, the inner band, or both; and the outer band comprises at least one outer band flange protruding radially outward from the radially-outward facing surface, the at least one outer band flange positioned to engage the at least one axial mount, a tangential mount, or both, coupled to the outer hanger, or the inner band comprises at least one inner band flange protruding radially inward from the radially-inward facing surface, the at least one inner band flange positioned to engage the at least one axial mount, a tangential mount, or both, coupled to the inner hanger.

16. The nozzle segment assembly of claim 1, wherein the outer hanger is spaced apart from the outer band in a radial outward direction, and the inner hanger is spaced apart from the inner band in a radial inward direction.

17. The nozzle segment assembly of claim 1, comprising a plurality of airfoil bodies, wherein:

the inner hanger, the outer hanger, or both comprises at least one axial mount for each one of the plurality of airfoil bodies; and the inner hanger, the outer hanger, or both comprise a single tangential mount comprising a tangential engagement surface that engages with a portion of an exterior surface of one of the plurality of airfoil bodies.

18. The nozzle segment assembly of claim 1, comprising a plurality of airfoil bodies, wherein:

the outer hanger comprises a plurality of axial mounts coupled to the inwardly facing surface of the outer hanger;

each of the plurality of axial mounts comprises an axial engagement surface that engages with the exterior surface or the interior surface of one of the plurality of airfoil bodies;

the inner hanger comprises a plurality of axial mounts coupled to the outwardly facing surface of the inner hanger; and each of the plurality of axial mounts comprises an axial engagement surface that engages with the exterior surface or the interior surface of one of the plurality of airfoil bodies.

19. The nozzle segment assembly of claim 1, wherein:

the at least one airfoil body comprises an outer end reinforced wall portion and an inner end reinforced wall portion; and a thickness of the outer end reinforced wall portion and a thickness of the inner end reinforced wall portion are each greater than a thickness of a central wall portion of the at least one airfoil body.

20. The nozzle segment assembly of claim 1, comprising a plurality of airfoil bodies engaged with the inner band and the outer band, wherein:

the inner band comprises a single inner band and the outer band comprises a single outer band;

the plurality of airfoil bodies comprises a first airfoil body and a second airfoil body; and the second airfoil body is constrained differently from the first airfoil body.

* * * * *